United States Patent
McRae et al.

(10) Patent No.: US 10,453,144 B1
(45) Date of Patent: Oct. 22, 2019

(54) SYSTEM AND METHOD FOR BEST-PRACTICE-BASED BUDGETING

(71) Applicant: Lecorpio, LLC, Fremont, CA (US)

(72) Inventors: Xuan (Sunny) McRae, Fremont, CA (US); Emadeddin O El-Quran, Belmont, CA (US); Andreas Brake, Fremont, CA (US); Linto Lucas, Mountain View, CA (US); Kalpesh Mohanbhai Rathod, Fremont, CA (US)

(73) Assignee: LECORPIO, LLC, Fremont, CA (US)

( * ) Notice: Subject to any disclaimer, the term of this patent is extended or adjusted under 35 U.S.C. 154(b) by 594 days.

(21) Appl. No.: 15/221,599

(22) Filed: Jul. 28, 2016

Related U.S. Application Data

(60) Provisional application No. 62/207,386, filed on Aug. 20, 2015, provisional application No. 62/198,102, filed on Jul. 28, 2015.

(51) Int. Cl.
*G06Q 40/06* (2012.01)
*G06N 20/00* (2019.01)
*G06N 7/00* (2006.01)

(52) U.S. Cl.
CPC .............. *G06Q 40/06* (2013.01); *G06N 7/005* (2013.01); *G06N 20/00* (2019.01)

(58) Field of Classification Search
CPC .......... G06Q 40/06; G06N 20/00; G06N 7/005
See application file for complete search history.

(56) References Cited

U.S. PATENT DOCUMENTS

| | | | |
|---|---|---|---|
| 2005/0210008 A1* | 9/2005 | Tran | G06F 16/951 |
| 2005/0210009 A1* | 9/2005 | Tran | G06Q 10/10 |
| 2009/0063427 A1* | 3/2009 | Zuta | G06F 17/2795 |
| 2012/0191502 A1* | 7/2012 | Gross | G06Q 10/0633 |
| | | | 705/7.27 |
| 2013/0013519 A1* | 1/2013 | Lee | G06Q 10/06 |
| | | | 705/310 |
| 2014/0279748 A1* | 9/2014 | Harik | G06N 20/00 |
| | | | 706/12 |
| 2015/0121185 A1* | 4/2015 | Holt | G06F 17/211 |
| | | | 715/212 |
| 2016/0162779 A1* | 6/2016 | Marcus | G06N 20/00 |
| | | | 706/12 |

* cited by examiner

*Primary Examiner* — Sujay Koneru
(74) *Attorney, Agent, or Firm* — Fenwick & West LLP

(57) ABSTRACT

A system and method for best practice based budgeting is described. In a preferred embodiment, adaptive financial information model is created out of transaction data, best practice data, and payment history data. A combination of workflow information, client defined strategies, and client past transaction and payment history is utilized in determining the model.

13 Claims, 48 Drawing Sheets

| Automation audit FHA type name | Category | Automation Enabled* | FHA audit probability* | Modified by | Modification Date |
|---|---|---|---|---|---|
| 312 Amendment | Patent | Yes | 50 | sunny | 4/28/2015 6:45:03 PM |
| 92bis Change | Patent | Yes | 50 | lecorpio (for lecorpio) | 4/7/2015 4:55:40 PM |
| Abandonment | Patent | Yes | 50 | lecorpio (for lecorpio) | 4/7/2015 4:54:55 PM |
| Abstract Comments | Patent | Yes | 50 | lecorpio (for lecorpio) | 4/7/2015 4:55:26 PM |
| Accelerate/Expedite Exam (& Decision) | Patent | Yes | 50 | lecorpio (for lecorpio) | 4/7/2015 4:57:39 PM |
| Advisory Action | Patent | Yes | 50 | lecorpio (for lecorpio) | 4/7/2015 4:54:58 PM |
| Amendment | Patent | Yes | 50 | lecorpio (for lecorpio) | 4/7/2015 4:55:16 PM |
| Amendments | Patent | Yes | 50 | lecorpio (for lecorpio) | 4/7/2015 4:55:45 PM |
| Appeal (& Appeal Brief) | Patent | Yes | 50 | lecorpio (for lecorpio) | 4/7/2015 4:54:24 PM |
| Application Filing (Design) | Patent | Yes | 50 | lecorpio (for lecorpio) | 4/7/2015 4:56:12 PM |
| Application Filing (EP) | Patent | Yes | 50 | lecorpio (for lecorpio) | 4/7/2015 4:53:58 PM |
| Application Filing (Model) | Patent | Yes | 50 | lecorpio (for lecorpio) | 4/7/2015 4:55:09 PM |
| Application Filing (Non Provisional) | Patent | Yes | 0 | jeremy | 5/1/2015 3:44:51 PM |
| Application Filing (Provisional) | Patent | Yes | 50 | lecorpio (for lecorpio) | 4/7/2015 4:53:53 PM |
| Application Filing (Reissue) | Patent | Yes | 50 | lecorpio (for lecorpio) | 4/7/2015 4:53:23 PM |
| Application Filing (WO) | Patent | Yes | 50 | lecorpio (for lecorpio) | 4/7/2015 4:57:05 PM |
| Application Filing-AR | Patent | Yes | 50 | lecorpio (for lecorpio) | 4/7/2015 4:53:47 PM |
| Application Filing-AU | Patent | Yes | 50 | lecorpio (for lecorpio) | 4/7/2015 4:56:22 PM |
| Application Filing-BR | Patent | Yes | 50 | lecorpio (for lecorpio) | 4/7/2015 4:56:44 PM |
| Application Filing-CA | Patent | Yes | 50 | lecorpio (for lecorpio) | 4/7/2015 4:56:34 PM |

| Document Code | File Link |
|---|---|
| ABST | 14280421 Abstract.pdf |
| CLM | 14280421 Claims.pdf |
| N417 | 14280421 EFS Acknowledgment Receipt.pdf |
| ADS | 14280421 Application Data Sheet.pdf |
| WFEE | 14280421 Fee Worksheet (SB06).pdf |
| OATH | 14280421 Oath or Declaration filed.pdf |
| SPEC | 14280421 Specification.pdf |
| DRW | 14290400 Drawings-only black and white line drawings 1.pdf |
| APP.FILE.REC | 14280421 Filing Receipt.pdf |
| NPL | 14280421 Non Patent Literature.pdf |
| IDS | 14280421 Information Disclosure Statement (IDS) Form (SB08).pdf |
| FWCLM | 14290400 Index of Claims.pdf |
| SRNT | #VALUE! |
| CTNF | 14290400 Non-Final Rejection 1.pdf |
| 892 | 14290400 List of references cited by examiner.pdf |
| BIB | 14290400 Bibliographic Data Sheet.pdf |
| OA.EMAIL | 14280421 Email Notification.pdf |
| SRFW | 14290400 Search information including classification, databases and other search related notes.p |
| 1449 | 14290400 List of References cited by applicant and considered by examiner.pdf |
| NTC.PUB | 14290400 Notice of Publication.pdf |
| INTV.SUM.APP | 12512482 Applicant Initiated Interview Summary (PTOL-413).pdf |
| IMIS | 13780107 Miscellaneous Internal Document.pdf |
| A... | 11804414 AmendmentReq. Reconsideration-After Non-Final Reject.pdf |
| REM | 14290400 Applicant ArgumentsRemarks Made in an Amendment I.pdf |
| XT/ | 12512482 Extension of Time.pdf |
| IFW | 12583341 Issue Information including classification, examiner, name, claim, renumbering, etc., pd |
| INTV.SUM.EX | 12510251 Examiner initiated interview summary (PTOL-413B).pdf |
| NOA | 12583341 Notice of Allowance and Fees Due (PTOL-85) 2.pdf |

FIG. 12

| Sequence Number | Document Code | Doc Code | # | Seq:1 | Seq:2 | Seq:3 | Seq:4 | Seq:5 | Seq:6 | Seq:7 | Seq:8 | Seq:9 | Seq:10 | Seq:11 | Seq:12 | Seq:13 | Seq:14 |
|---|---|---|---|---|---|---|---|---|---|---|---|---|---|---|---|---|---|
| 1 | ABST | ABST | 533 | 509 | | | | | | | | | | | | | |
| 1 | CLM | CLM | 1311 | 549 | 6 | 19 | 45 | 51 | 66 | 69 | 80 | 76 | 59 | 40 | 57 | 37 | 27 |
| 1 | N417 | N417 | 2778 | 435 | 67 | 256 | 161 | 194 | 173 | 159 | 172 | 172 | 149 | 113 | 127 | 99 | 89 |
| 1 | ADS | ADS | 319 | 305 | 3 | | 1 | 2 | | 1 | | | | | | | |
| 1 | WFEE | WFEE | 2552 | 733 | 192 | 55 | 77 | 95 | 113 | 111 | 150 | 160 | 125 | 108 | 117 | 81 | 79 |
| 1 | OATH | OATH | 523 | 485 | 4 | 27 | 3 | 3 | | 1 | | | | | | | |
| 1 | SPEC | SPEC | 692 | 545 | 4 | 16 | 19 | 21 | 13 | 14 | 8 | 17 | 8 | 9 | 4 | 4 | 1 |
| 1 | DRW | DRW | 474 | 426 | 4 | 14 | 10 | 2 | 4 | | | 4 | 5 | 2 | | | |
| 2 | APP.FILE.REC | APP.FILE.REC | 551 | 400 | 59 | 46 | 14 | 12 | 6 | 4 | | | | | | 3 | |
| 2 | WFEE | NPL | 1875 | 220 | 59 | 299 | 160 | 187 | 256 | 139 | 159 | 79 | 74 | 76 | 38 | 34 | 26 |
| 3 | NPL | IDS | 724 | 188 | 28 | 98 | 44 | 55 | 41 | 41 | 32 | 31 | 21 | 15 | 13 | 11 | |
| 3 | N417 | FWCLM | 936 | | | 51 | 59 | 81 | 83 | 97 | 91 | 78 | 50 | 64 | 46 | 34 | 43 |
| 3 | NPL | SRNT | 1397 | | | 84 | 91 | 111 | 126 | 137 | 148 | 112 | 98 | 93 | 64 | 58 | 57 |
| 3 | IDS | CTNF | 521 | | | 52 | 65 | 63 | 76 | 55 | 48 | 31 | 26 | 20 | 18 | 15 | 9 |
| 4 | FWCLM | | 723 | 892 | | 56 | 62 | 69 | 85 | 66 | 56 | 42 | 47 | 44 | 29 | 22 | 22 |
| 4 | SRNT | BIB | 572 | | | 58 | 53 | 64 | 59 | 70 | 58 | 33 | 21 | 16 | 15 | 17 | |
| 4 | CTNF | OA.EMAIL | 2150 | | 191 | 73 | 150 | 125 | 148 | 140 | 143 | 135 | 126 | 138 | 109 | 114 | 86 |
| 4 | | SRFW | 1096 | | | 63 | 66 | 89 | 94 | 109 | 97 | 71 | 72 | 51 | 48 | 44 | |
| 4 | BIB | | 1449 | 793 | 1 | 44 | 60 | 68 | 64 | 88 | 69 | 68 | 52 | 56 | 31 | 32 | 25 |
| 4 | OA.EMAIL | NTC.PUB | 204 | | 2 | 35 | 46 | 32 | 21 | 15 | 8 | 7 | 11 | 3 | 8 | 3 | |
| 4 | SRFW | INTV.SUM.APP | 119 | | | | 2 | 8 | 11 | 15 | 9 | 9 | 15 | 11 | 6 | | 4 |
| 4 | | IMIS | 1449 | 46 | 4 | | | | 3 | 4 | 4 | 4 | 6 | 5 | 4 | 3 | 1 |
| 5 | NTC.PUB | A. | 501 | | | | 36 | 50 | 61 | 55 | 61 | 55 | 33 | 23 | 25 | 22 | 17 |
| 5 | OA.EMAIL | REM | 933 | 63 | 11 | 25 | 55 | 63 | 71 | 80 | 88 | 88 | 69 | 46 | 60 | 40 | 29 |
| 6 | OA.EMAIL | XT/ | 37 | | | 3 | 1 | 1 | 4 | 4 | 4 | 4 | 2 | | 3 | 1 | |
| 6 | INTV.SUM.APP | IFW | 380 | | | 10 | 5 | 18 | 25 | 29 | 45 | 35 | 31 | 25 | 19 | 24 | 23 |
| 6 | IMIS | INTV.SUM.EX | 41 | | | | | | 3 | 4 | 4 | 4 | 5 | | 1 | 3 | 4 |

FIG. 13

| PHASE | RATE | TIME | COST | FORECAST |
|---|---|---|---|---|
| Disclosure Review | Disclosure rate | Time to disclosure | Review cost | Disclosure forecast |
| Decision | Decision rate | Time to decision | Decision cost | Decision forecast |
| First Filing | First Filing rate | Time to first filing | First Filing cost | First Filing forecast |
| Prosecution | OA rate | OA response time | OA response cost | OA forecast |
| Issuance | Issuance rate | Time to Issuance | Issuance cost | Issuance forecast |
| Maintenance | Renewal rate | Time since issuance | Maintenance cost | Maintenance forecast |
| Abandonment | Abandonment rate | Time to abandonment | Cost to abandonment | Abandonment savings |

| | MONTHLY PLANNING - DETAILED | | JAN | FEB | MAR | APR | MAY | JUN | JUL | AUG | SEP | OCT | NOV | DEC | YEAR | % INC |
|---|---|---|---|---|---|---|---|---|---|---|---|---|---|---|---|---|
| 27 | | | | | | | | | | | | | | | | |
| 28 | Disclosure | Internal Cost | 19507.5 | 9180 | 5737.5 | 8032.5 | 17212.5 | 21802.5 | 14917.5 | 14917.5 | 12622.5 | 8032.5 | 10327.5 | 5737.5 | 148027.5 | 10.92% |
| 29 | Patent | Domestic Filing Orrick | 47973.86 | 34890.08 | 21806.3 | 30528.82 | 65418.9 | 82863.94 | 56696.38 | 56696.38 | 47973.86 | 30528.82 | 39251.34 | 21806.3 | 536434.98 | 41.51% |
| 30 | | Domestic Prosecution | 0 | 0 | 0 | 0 | 0 | 19068 | 170306 | 187626 | 0 | 0 | 0 | 0 | 377000 | 0.00% |
| 31 | | International Filing | 15548.84 | 27210.47 | 31097.68 | 34964.89 | 38872.1 | 31097.68 | 42759.31 | 31097.68 | 19436.05 | 11661.63 | 23323.26 | 19436.05 | 326525.64 | 47.57% |
| 32 | | Issuance | 0 | 0 | 0 | 0 | 0 | 0 | 0 | 0 | 0 | 0 | 0 | 0 | 0 | 0.00% |
| | | | | | | | 0 | 216943.76 | 281196016 | 3242060.72 | | | | | 627164.66 | |

Export to Excel | Export to PDF | Please select file to import: Choose File | No file chosen | Import Excel | Refine & Save Budget | Mark As Active Budget

FIG. 21 (Cont.)

| | MONTHLY PLANNING - DETAILED | | JAN | FEB | MAR | APR | MAY | JUN | JUL | AUG | SEP | OCT | NOV | DEC | YEAR | % INC |
|---|---|---|---|---|---|---|---|---|---|---|---|---|---|---|---|---|
| 28 | Disclosure | Internal Cost | 19507.5 | 9180 | 5737.5 | 8032.5 | 17212.5 | 21802.5 | 14917.5 | 14917.5 | 12622.5 | 8032.5 | 10327.5 | 5737.5 | 148027.5 | 10.92% |
| 29 | Patent Disclosure | Accrual | 1250 | 2100 | 0 | 0 | 12000 | 0 | 0 | 0 | 0 | 0 | 0 | 0 | 15350 | 0.00% |
| 30 | Domestic Filing | Actual | 1370.88 | 1358.64 | 0 | 0 | 1023.16 | 0 | 0 | 0 | 0 | 0 | 0 | 0 | 3752.68 | 0.00% |
| 31 | | Orrick | 47973.86 | 34890.08 | 21806.3 | 30528.82 | 65418.9 | 62863.94 | 56696.38 | 56696.38 | 47973.86 | 30528.82 | 39251.34 | 21806.3 | 536434.98 | 41.51% |
| 32 | Domestic Prosecution | Accrual | 1250 | 2100 | 0 | 0 | 12000 | 0 | 0 | 0 | 0 | 0 | 0 | 0 | 15350 | 0.00% |
| 33 | | Actual | 1370.88 | 1358.64 | 0 | 0 | 1023.16 | 0 | 0 | 0 | 0 | 0 | 0 | 0 | 3752.68 | 0.00% |
| 34 | | Orrick | 0 | 0 | 0 | 0 | 0 | 19068 | 170306 | 187626 | 0 | 0 | 0 | 0 | 377000 | 0.00% |
| 35 | International Filing | Accrual | 1250 | 2100 | 0 | 0 | 12000 | 0 | 0 | 0 | 0 | 0 | 0 | 0 | 15350 | 0.00% |
| 36 | | Actual | 1370.88 | 1358.64 | 0 | 0 | 1023.16 | 0 | 0 | 0 | 0 | 0 | 0 | 0 | 3752.68 | 0.00% |
| 37 | | Orrick | 15548.84 | 27210.47 | 31097.68 | 34984.89 | 38872.1 | 31097.68 | 42759.31 | 31097.68 | 19436.05 | 11661.63 | 23323.26 | 19436.05 | 326525.64 | 47.57% |
| 38 | Issuance | Accrual | 1250 | 2100 | 0 | 0 | 12000 | 0 | 0 | 0 | 0 | 0 | 0 | 0 | 15350 | 0.00% |
| 39 | | Actual | 1370.88 | 1358.64 | 0 | 0 | 1023.16 | 0 | 0 | 0 | 0 | 0 | 0 | 0 | 3752.68 | 0.00% |
| 40 | | Orrick | 0 | 0 | 0 | 0 | 0 | 0 | 0 | 0 | 0 | 0 | 0 | 0 | 0 | |
| 41 | | | | | | | | | | | | | | | | |
| 42 | TOTAL EXPENSES | | 93513.72 | 85115.11 | 58641.48 | 73546.21 | 173596.14 | 371775.9 | 309669.35 | 352398.28 | 80032.41 | 50222.95 | 72902.1 | 46979.85 | 627194.66 | 1 |

Export to Excel | Export to PDF | Please select file to import: Choose File | No file chosen | Import Excel

FIG. 22 (Cont.)

Actual Budget for Last Year

| Matter Type | Sub Matter Type | January | February | March | April | May | June | July | August | September | October | November | December | Total |
|---|---|---|---|---|---|---|---|---|---|---|---|---|---|---|
| Patent | Total | $321,754.50 | $187,700.50 | $177,296.50 | $209,510.10 | $176,019.30 | $155,342.02 | $177,735.10 | $328,997.20 | $61,760.80 | $186,451.00 | $201,732.64 | $277,477.84 | $2,461,777.50 |
| | Domestic Filing | $29,198.40 | $9,936.80 | $9,936.80 | $9,936.80 | $19,873.60 | $8,264.00 | $9,100.40 | $23,504.80 | $7,550.00 | $7,550.00 | $6,020.00 | $12,140.00 | $153,011.60 |
| | Domestic Maintenance | $26,952.40 | $13,812.80 | $13,812.80 | $13,812.80 | $13,812.80 | $12,348.00 | $13,180.40 | $28,309.00 | | $15,200.00 | $20,708.00 | $24,910.00 | $198,059.00 |
| | Domestic Prosecution | $49,741.70 | $24,970.30 | $24,970.30 | $24,970.30 | $24,970.30 | $29,386.90 | $33,803.50 | $77,450.00 | | $35,889.40 | $30,301.84 | $45,402.94 | $401,857.48 |
| | International Filing | $33,672.00 | $17,815.20 | $17,815.20 | $17,815.20 | $35,630.40 | $11,022.00 | $12,154.20 | $25,675.20 | $11,940.00 | $11,940.00 | $16,683.00 | $22,344.00 | $234,506.40 |
| | International Maintenance | $20,502.00 | $10,404.00 | | $10,404.00 | $10,404.00 | $12,484.80 | $13,525.20 | $13,923.00 | | $14,586.00 | $11,373.00 | $21,608.70 | $139,214.70 |
| | International Prosecution | $55,777.20 | $28,500.60 | $28,500.60 | $28,500.60 | $28,500.60 | $32,325.60 | $37,405.20 | $80,583.60 | | $34,284.00 | $42,280.80 | $49,431.40 | $446,090.20 |
| | Issuance | $61,242.80 | $61,242.80 | $61,242.80 | $83,052.40 | $21,809.60 | $25,763.12 | $31,693.40 | $38,252.00 | $42,270.80 | $37,619.60 | $42,689.00 | $61,242.80 | $568,121.12 |
| | Litigation | $21,612.00 | $9,184.00 | $9,184.00 | $9,184.00 | $9,184.00 | $10,122.40 | $11,060.80 | $24,263.60 | | $10,204.00 | $7,552.00 | $19,180.00 | $140,730.80 |
| | Project | $23,056.00 | $11,834.00 | $11,834.00 | $11,834.00 | $11,834.00 | $13,425.20 | $15,812.00 | $17,036.00 | | $19,178.00 | $24,125.00 | $21,218.00 | $181,186.20 |
| Total | | $321,754.50 | $187,700.50 | $177,296.50 | $209,510.10 | $176,019.30 | $155,342.02 | $177,735.10 | $328,997.20 | $61,760.80 | $186,451.00 | $201,732.64 | $277,477.84 | $2,461,777.50 |

FIG. 24 (Cont.)

Actual Budget for Last Year

| Matter Type | Sub Matter Type | January | February | March | April | May | June | July | August | September | October | November | December | Total |
|---|---|---|---|---|---|---|---|---|---|---|---|---|---|---|
| Patent | Total | $321,754.50 | $187,700.50 | $177,296.50 | $209,510.10 | $176,019.30 | $155,342.02 | $177,735.10 | $328,997.20 | $61,760.80 | $186,451.00 | $201,732.64 | $277,477.84 | $2,461,777.50 |
| | Domestic Filing | $29,198.40 | $9,936.80 | $9,936.80 | $9,936.80 | $65,418.90 | $8,264.00 | $9,100.40 | $23,504.80 | $7,550.00 | $7,550.00 | $6,020.00 | $12,140.00 | $153,011.60 |
| | Domestic Maintenance | $26,952.40 | $13,812.80 | $13,812.80 | $13,812.80 | $13,812.80 | $12,348.00 | $13,180.40 | $28,309.00 | | $15,200.00 | $20,708.00 | $24,910.00 | $198,059.00 |
| | Domestic Prosecution | $49,741.70 | $24,970.30 | $24,970.30 | $24,970.30 | $24,970.30 | $29,386.90 | $33,803.50 | $77,450.00 | | $35,889.40 | $30,301.84 | $45,402.94 | $401,857.48 |
| | International Filing | $33,672.00 | $17,815.20 | $17,815.20 | $17,815.20 | $35,630.40 | $11,022.00 | $12,154.20 | $25,675.20 | $11,940.00 | $11,940.00 | $16,663.00 | $22,344.00 | $234,506.40 |
| | International Maintenance | $20,502.00 | $10,404.00 | | $10,404.00 | $10,404.00 | $12,484.80 | $13,525.20 | $13,923.00 | | $14,586.00 | $11,373.00 | $21,608.70 | $139,214.70 |
| | International Prosecution | $155,777.20 | $23,500.60 | $28,500.60 | $28,500.60 | $28,500.60 | $32,325.60 | $37,405.20 | $80,583.60 | | $34,264.00 | $42,280.80 | $48,431.40 | $445,089.20 |
| | Issuance | $61,242.80 | $61,242.80 | $61,242.80 | $83,052.40 | $21,809.60 | $25,763.12 | $31,693.40 | $38,252.00 | $42,270.80 | $37,619.60 | $42,689.00 | $61,242.80 | $568,121.12 |
| | Litigation | $21,612.00 | $9,184.00 | $9,184.00 | $9,184.00 | $9,184.00 | $10,122.40 | $11,060.80 | $24,263.60 | | $10,204.00 | $7,552.00 | $19,180.00 | $140,730.80 |
| | Project | $23,056.00 | $11,834.00 | $11,834.00 | $11,834.00 | $11,834.00 | $13,425.20 | $15,812.00 | $17,036.00 | | $19,178.00 | $24,125.00 | $21,218.00 | $181,166.20 |
| Total | | $321,754.50 | $187,700.50 | $177,296.50 | $209,510.10 | $176,019.30 | $155,342.02 | $177,735.10 | $328,997.20 | $61,760.80 | $186,451.00 | $201,732.64 | $277,477.84 | $2,461,777.50 |

FIG. 25 (Cont.)

Actual Budget for Last Year

| Matter Type | Sub Matter Type | January | February | March | April | May | June | July | August | September | October | November | December | Total |
|---|---|---|---|---|---|---|---|---|---|---|---|---|---|---|
| Patent | Total | $321,754.50 | $187,700.50 | $177,296.50 | $209,510.10 | $176,019.30 | $155,342.02 | $177,735.10 | $326,997.20 | $61,760.80 | $186,451.00 | $201,732.00 | $277,477.84 | $2,461,777.50 |
| | Domestic Filing | $29,198.40 | $9,936.80 | $9,936.80 | $9,936.80 | $65,418.90 | $8,264.00 | $9,100.40 | $23,504.80 | $7,550.00 | $7,550.00 | $6,020.00 | $12,140.00 | $153,011.60 |
| | Domestic Maintenance | $26,952.40 | $13,812.80 | $13,812.80 | $13,812.80 | $13,812.80 | $12,548.00 | $13,180.40 | $28,309.00 | | $15,200.00 | $20,708.00 | $24,910.00 | $198,059.00 |
| | Domestic Prosecution | $49,741.70 | $24,970.30 | $24,970.30 | $24,970.30 | $24,970.30 | $29,386.90 | $33,803.50 | $77,450.00 | | $35,889.40 | $30,301.84 | $45,402.94 | $401,857.48 |
| | International Filing | $33,672.00 | $17,815.20 | $17,815.20 | $17,815.20 | $35,630.40 | $11,022.00 | $12,154.20 | $25,675.20 | $11,940.00 | $11,940.00 | $16,683.00 | $22,344.00 | $234,506.40 |
| | International Maintenance | $20,502.00 | $10,404.00 | | $10,404.00 | $10,404.00 | $12,484.80 | $13,525.20 | $13,923.00 | | $14,586.00 | $11,373.00 | $21,608.70 | $139,214.70 |
| | International Prosecution | $155,777.20 | $28,500.60 | $28,500.60 | $28,500.60 | $28,500.60 | $32,325.60 | $37,405.20 | $80,583.60 | | $34,284.00 | $42,280.80 | $48,431.40 | $445,090.20 |
| | Issuance | $61,242.80 | $61,242.80 | $61,242.80 | $83,052.40 | $21,809.60 | $25,763.12 | $31,693.40 | $38,252.00 | $42,270.80 | $37,619.60 | $42,689.00 | $61,242.80 | $568,121.12 |
| | Litigation | $21,612.00 | $9,184.00 | $9,184.00 | $9,184.00 | $9,184.00 | $10,122.40 | $11,060.80 | $24,263.60 | | $10,204.00 | $7,552.00 | $19,180.00 | $140,730.80 |
| | Project | $23,056.00 | $11,834.00 | $11,834.00 | $11,834.00 | $11,834.00 | $13,425.20 | $15,812.00 | $17,036.00 | | $19,178.00 | $24,125.00 | $21,218.00 | $181,186.20 |
| Total | | $321,754.50 | $187,700.50 | $177,296.50 | $209,510.10 | $176,019.30 | $155,342.02 | $177,735.10 | $326,997.20 | $61,760.80 | $186,451.00 | $201,732.00 | $277,477.84 | $2,461,777.50 |

FIG. 26 (Cont.)

Actual Budget for Last Year

| Matter Type | Sub Matter Type | January | February | March | April | May | June | July | August | September | October | November | December | Total |
|---|---|---|---|---|---|---|---|---|---|---|---|---|---|---|
| Patent | Total | $321,754.50 | $187,700.50 | $177,296.50 | $209,510.10 | $176,019.30 | $155,342.02 | $177,735.10 | $328,997.20 | $61,760.80 | $166,451.00 | $201,732.00 | $277,477.84 | $2,461,777.50 |
|  | Domestic Filing | $29,199.40 | $9,936.80 | $9,936.80 | $9,936.80 | $65,418.90 | $8,264.00 | $9,100.40 | $23,504.80 | $7,550.00 | $7,550.00 | $6,020.00 | $12,140.00 | $153,011.60 |
|  | Domestic Maintenance | $26,952.40 | $13,812.80 | $13,812.80 | $13,812.80 | $13,812.80 | $12,548.00 | $13,180.40 | $28,309.00 |  | $15,200.00 | $20,708.00 | $24,910.00 | $198,059.00 |
|  | Domestic Prosecution | $49,741.70 | $24,970.30 | $24,970.30 | $24,970.30 | $24,970.30 | $29,386.90 | $33,803.50 | $77,450.00 |  | $35,889.40 | $30,301.84 | $45,402.94 | $401,857.48 |
|  | International Filing | $33,672.00 | $17,815.20 | $17,815.20 | $17,815.20 | $35,630.40 | $11,022.00 | $12,154.20 | $25,675.20 | $11,940.00 | $11,940.00 | $16,683.00 | $22,344.00 | $234,506.40 |
|  | International Maintenance | $20,502.00 | $10,404.00 |  | $10,404.00 | $10,404.00 | $12,484.80 | $13,525.20 | $13,923.00 |  | $14,586.00 | $11,373.00 | $21,608.70 | $139,214.70 |
|  | International Prosecution | $155,777.20 | $28,500.60 | $28,500.60 | $28,500.60 | $28,500.60 | $32,325.00 | $37,405.20 | $80,583.60 |  | $34,284.00 | $42,280.80 | $48,431.40 | $445,090.20 |
|  | Issuance | $61,242.80 | $61,242.80 | $61,242.80 | $83,052.40 | $21,809.60 | $25,763.12 | $31,693.40 | $38,252.00 | $42,270.80 | $37,619.60 | $42,689.00 | $61,242.80 | $568,121.12 |
|  | Litigation | $21,612.00 | $9,184.00 | $9,184.00 | $9,184.00 | $9,184.00 | $10,122.40 | $11,060.80 | $24,263.60 |  | $10,204.00 | $7,552.00 | $19,180.00 | $140,730.80 |
|  | Project | $23,056.00 | $11,834.00 | $11,834.00 | $11,834.00 | $11,834.00 | $13,425.20 | $15,812.00 | $17,036.00 |  | $19,178.00 | $24,125.00 | $21,218.00 | $181,186.20 |
| Total |  | $321,754.50 | $187,700.50 | $177,296.50 | $209,510.10 | $176,019.30 | $155,342.02 | $177,735.10 | $328,997.20 | $61,760.80 | $166,451.00 | $201,732.00 | $277,477.84 | $2,461,777.50 |

FIG. 27 (Cont.)

Actual Budget for Last Year

| Matter Type | Sub Matter Type | January | February | March | April | May | June | July | August | September | October | November | December | Total |
|---|---|---|---|---|---|---|---|---|---|---|---|---|---|---|
| Patent | Total | $321,754.50 | $187,700.50 | $177,296.50 | $209,510.10 | $176,019.30 | $155,342.02 | $177,735.10 | $328,997.20 | $61,760.80 | $186,451.00 | $201,732.00 | $277,477.84 | $2,461,777.50 |
| | Domestic Filing | $29,198.40 | $9,936.80 | $9,936.80 | $9,936.80 | $65,418.90 | $8,264.00 | $9,100.40 | $23,504.80 | $7,550.00 | $7,550.00 | $6,020.00 | $12,140.00 | $153,011.60 |
| | Domestic Maintenance | $26,952.40 | $13,812.80 | $13,812.80 | $13,812.80 | $13,812.80 | $12,548.00 | $13,180.40 | $28,309.00 | | $15,200.00 | $20,708.00 | $24,910.00 | $198,059.00 |
| | Domestic Prosecution | $49,741.70 | $24,970.30 | $24,970.30 | $24,970.30 | $24,970.30 | $29,386.90 | $33,803.50 | $77,450.00 | | $35,889.40 | $30,301.84 | $45,402.94 | $401,857.48 |
| | International Filing | $33,672.00 | $17,815.20 | $17,815.20 | $17,815.20 | $35,630.40 | $11,022.00 | $12,154.20 | $25,675.20 | $11,940.00 | $11,940.00 | $16,683.00 | $22,344.00 | $234,506.40 |
| | International Maintenance | $20,502.00 | $10,404.00 | | $10,404.00 | $10,404.00 | $12,484.80 | $13,525.20 | $13,923.00 | | $14,586.00 | $11,373.00 | $21,608.70 | $139,214.70 |
| | International Prosecution | $155,777.20 | $28,500.60 | $28,500.60 | $28,500.60 | $28,500.60 | $32,325.60 | $37,405.20 | $80,583.60 | | | $42,280.80 | $48,431.40 | $445,090.20 |
| | Issuance | $61,242.80 | $61,242.80 | $61,242.80 | $83,052.40 | $21,809.60 | $25,763.12 | $31,693.40 | $38,252.00 | $42,270.80 | $37,619.60 | $42,689.00 | $61,242.80 | $568,121.12 |
| | Litigation | $21,612.00 | $9,184.00 | $9,184.00 | $9,184.00 | $9,184.00 | $10,122.40 | $11,060.80 | $24,263.60 | | $10,204.00 | $7,552.00 | $19,180.00 | $140,730.80 |
| | Project | $23,056.00 | $11,834.00 | $11,834.00 | $11,834.00 | $11,834.00 | $13,425.20 | $15,812.00 | $17,036.00 | | $19,178.00 | $24,125.00 | $21,218.00 | $181,186.20 |
| Total | | $321,754.50 | $187,700.50 | $177,296.50 | $209,510.10 | $176,019.30 | $155,342.02 | $177,735.10 | $328,997.20 | $61,760.80 | $186,451.00 | $201,732.00 | $277,477.84 | $2,461,777.50 |

FIG. 28 (Cont.)

SYSTEM AND METHOD FOR BEST-PRACTICE-BASED BUDGETING

RELATED APPLICATIONS

This application claims the benefit of Provisional Application No. 62/198,102, filed on Jul. 28, 2015, and of Provisional Application No. 62/207,386, filed on Aug. 20, 2015, which are incorporated herein by reference.

FIELD OF ART

The present disclosure relates to machine learning for legal docketing systems. In particular, it relates to use of machine learning to train a model to identified case status docket items in an automated docketing system and to leverage the identifications when performing budget estimates.

BACKGROUND

Every business starts with a plan, and every good plan needs a budget. Budgeting, in simple terms, is a planning document for the future. It is an estimation of the revenue and expenses over a specified future period of time. A budget can be made for a person, family, group of people, business, government, country, multinational organization or anything else that makes and spends money. Organizations utilize budgets for performance evaluation, strategy implementation, and strategy formation. A budget can contain both financial and non-financial information.

For preparation of a budget, companies often utilize budgeting software. Companies, organizations, and firms study the market in which they operate, the competition, potential demand, economic conditions, and costs of goods sold, operating expenses, inventory, and other assets. Strategic use of resources can lead to new revenue sources and commercial advantages.

The rapid advancement of technology has resulted in an exponential growth in the number of patent and trademark cases. Attorneys and law firms compete for clients. One of their challenges is to deliver services at a lower cost and with greater efficiency. Corporate law departments often hire outside vendors such as law firms. Thus, they need to effectively track vendor spending and legal manners. Typical accounts payable software does not have the level of detail necessary to make projections and reports. Thus, law firms and inhouse legal departments often turn to legal case management software or electronic legal billing software that includes budgeting in some manner. Presently, the budgeting functionality in these software programs are limited in functionality. Therefore, there is a need for a budgeting system that combines several points of analysis to result in more expansive capability to manage resources. There is a need for a budgeting software system that integrates different types of information including transaction histories, best practice data, invoice history, and payment history to create a more robust and adaptive budgeting model.

BRIEF DESCRIPTION OF DRAWINGS

FIG. 4 shows a user interface for pending office actions.
FIG. 5 shows a user interface for completed auto docketing actions.
FIG. 7 shows a preferences and audit user interface.
FIG. 8 shows a confidence rule user interface.
FIG. 11 shows a sample Microsoft™ Outlook™ Plug-in for handling office actions.
FIG. 13 shows a clustering density chart for adaptive flow.
FIG. 17 illustrates metrics for Strategy and Rules from FIG. 16.
FIG. 20 illustrates a screen shot of Tracking from FIG. 16.

The figures depict embodiments of the disclosed configuration for purposes of illustration only. One skilled in the art will readily recognize from the following description that alternative embodiments of the structures and methods illustrated herein may be employed without departing from the principles described herein.

DETAILED DESCRIPTION

Figure 1:
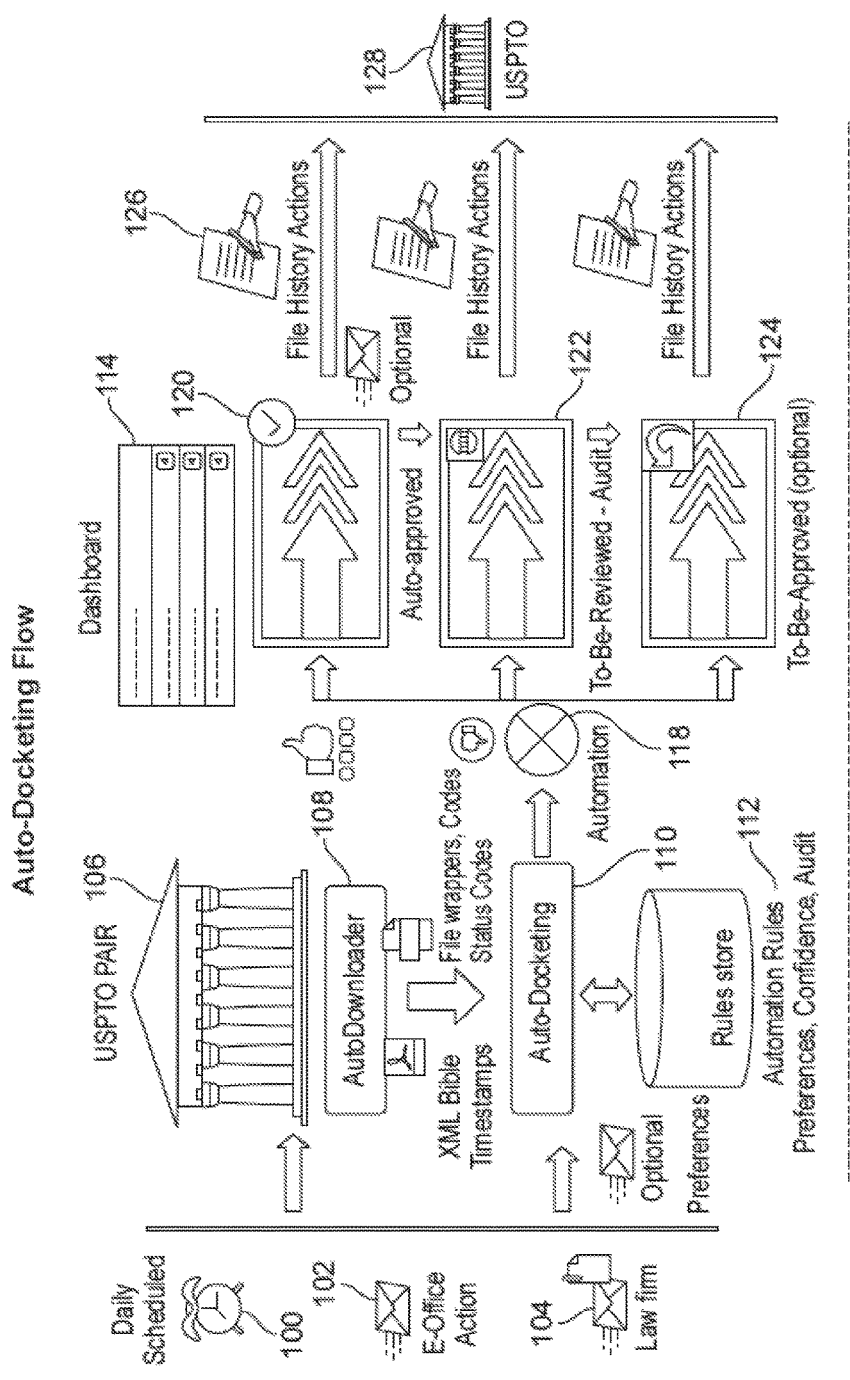
FIG. 1 illustrates a process flow chart for auto docketing.

Referring now to the drawings, FIG. 1 illustrates an example embodiment in an automated docketing process flow. Auto-docketing application 110 receives data for automation. This data can be sent two ways. First, the data can be in the form of emailed "office actions" 102 (e.g., communications from a patent office such as the United States Patent & Trademark Office, or the European Patent Office, conveying information regarding an action taken by the entity such as issuing a set of patent application rejections, a restriction of patent application claims, or the like) or emails 104 from law firms that redirect office actions initially received by the law firm from an entity, such as a patent office. It will be understood by one of ordinary skill in the art that the email 102 or email 104 can be sent from an Microsoft™ Outlook™ plug-in or standard email templates. Second, the data can be received from a daily scheduled refresh 100 set up with login information with the United States Patent and Trademark Office (USPTO) Private Patent Application Information and Retrieval (PAIR), European Patent Office (EPO), or other national patent office online databases. In the second method, the auto-docketing application 110 receives status information from the PAIR database 106 via an auto downloader 108. In particular, the auto downloader 108 downloads an image file wrapper (IFW) code from the PAIR database 106. It will be understood that the auto downloader 108 downloads bibliographic information in a format, such as Extensible Markup Language (XML), for a user's USPTO customer number that is associated with a patent or trademark application. This bibliographic information includes status indicators and time stamps. Furthermore, the bibliographic information can include but is not limited to the presence or absence of assignments, continuity, and list of outgoing and incoming correspondence. The correspondence includes, but is not limited to, application filing, filing receipt, final office action and response, invention disclosure statement, issue notification, notice of allowance, office action and response, power of attorney, and receipt of issued patent. It will be understood by one skilled in the art that a user, in specific embodiments, can be a human, device, process, or computer. It will also be understood that these processes occur over a network, such as the Internet. Furthermore, it will be understood that information on email or forms can include but is not limited to docket numbers, serial numbers, publication numbers, title, name of inventors, and name and address of applicants. Email may be patent, trademark, copyright or litigation related, or may originate from government, judicial or corporate entities. Further, it is understood that such information may be stored in a text searchable format or may be converted from an image format into a text searchable format using optical character recognition (OCR).

Referring again to FIG. 1, auto-docketing 110 utilizes automation rules 112 to determine whether the action will go to auto-approved 120, to be reviewed 122, or to be approved 124. The automation rules 112 include preferences that a user can enable or disable for each office action. A disabled preference is a default action. If an office action is disabled, no automation will execute. The automation rules 112 further include a confidence factor. The user chooses a minimum criteria, in percentages, to enable automation. If an automation event is enabled and does not meet the minimum configured confidence level, the application will pre-fill the office action form with data and place 118 the pre-filled office action in auto-docketing pending actions 122 and 124 queue to be reviewed by the user. If an automation event is enabled and exceeds the minimum configured confidence level, the application will execute 114 the office action to the USPTO 128 and place an automation transaction history 126 in an auto docketing completed actions queue for visibility.

Still referring to the automation rules 112, an audit frequency, in percentages, is also determined and set by the user. A random automation event will be selected, based on the configured audit frequency. The application will pre-fill the office action form with data and place the pre-filled office action in the auto-docketing pending actions queue 122 and 124 to be reviewed by the user. All enabled automation events will go to the auto-docketing pending actions queue 122 and 124 when the audit setting is at 100%. Auto-docketing pending actions queue 124, is an optional to-be-approved action.

Figure 2A:
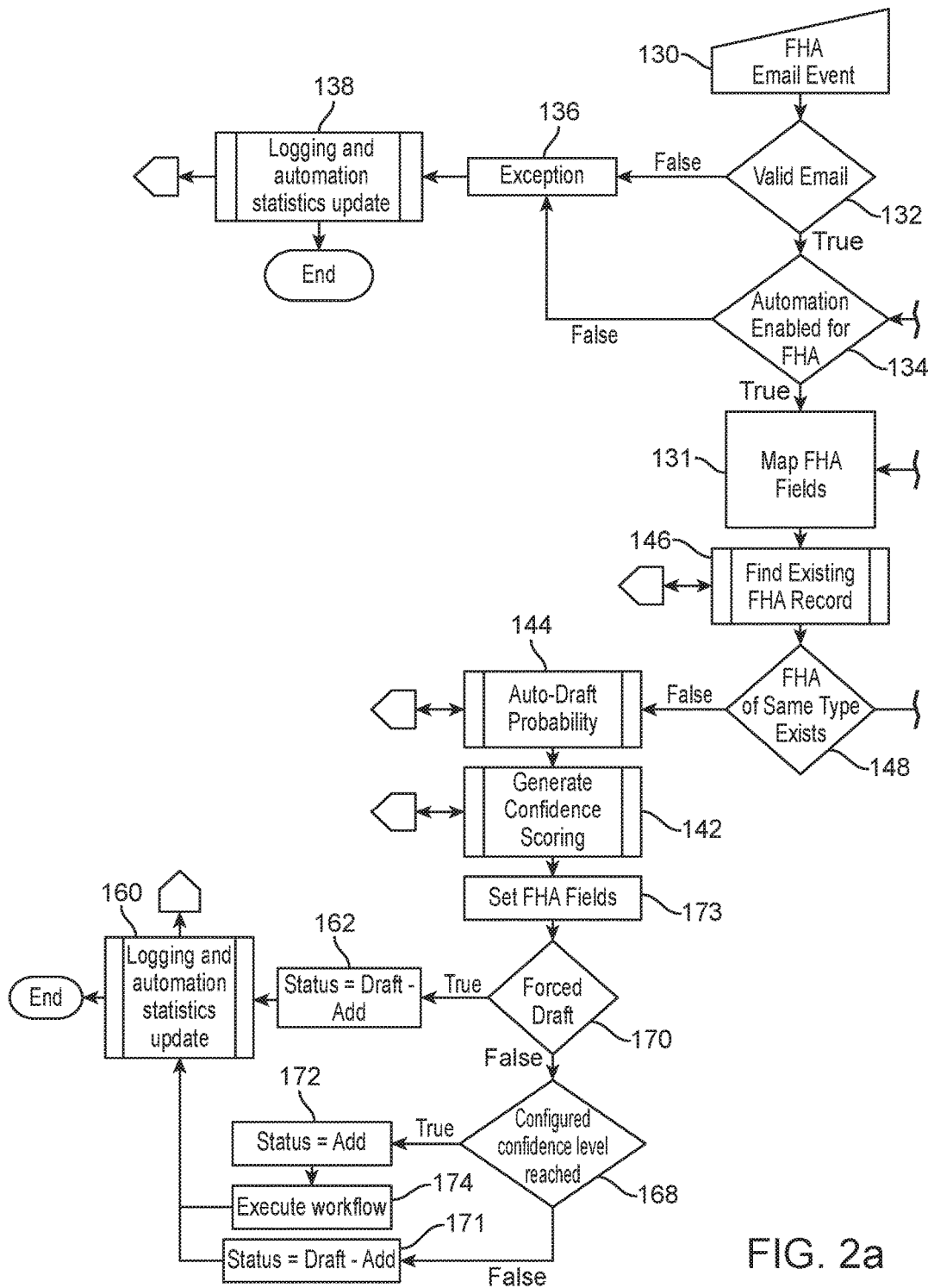
FIG. 2a illustrates a logic flow chart for auto docketing.
Figure 2A:
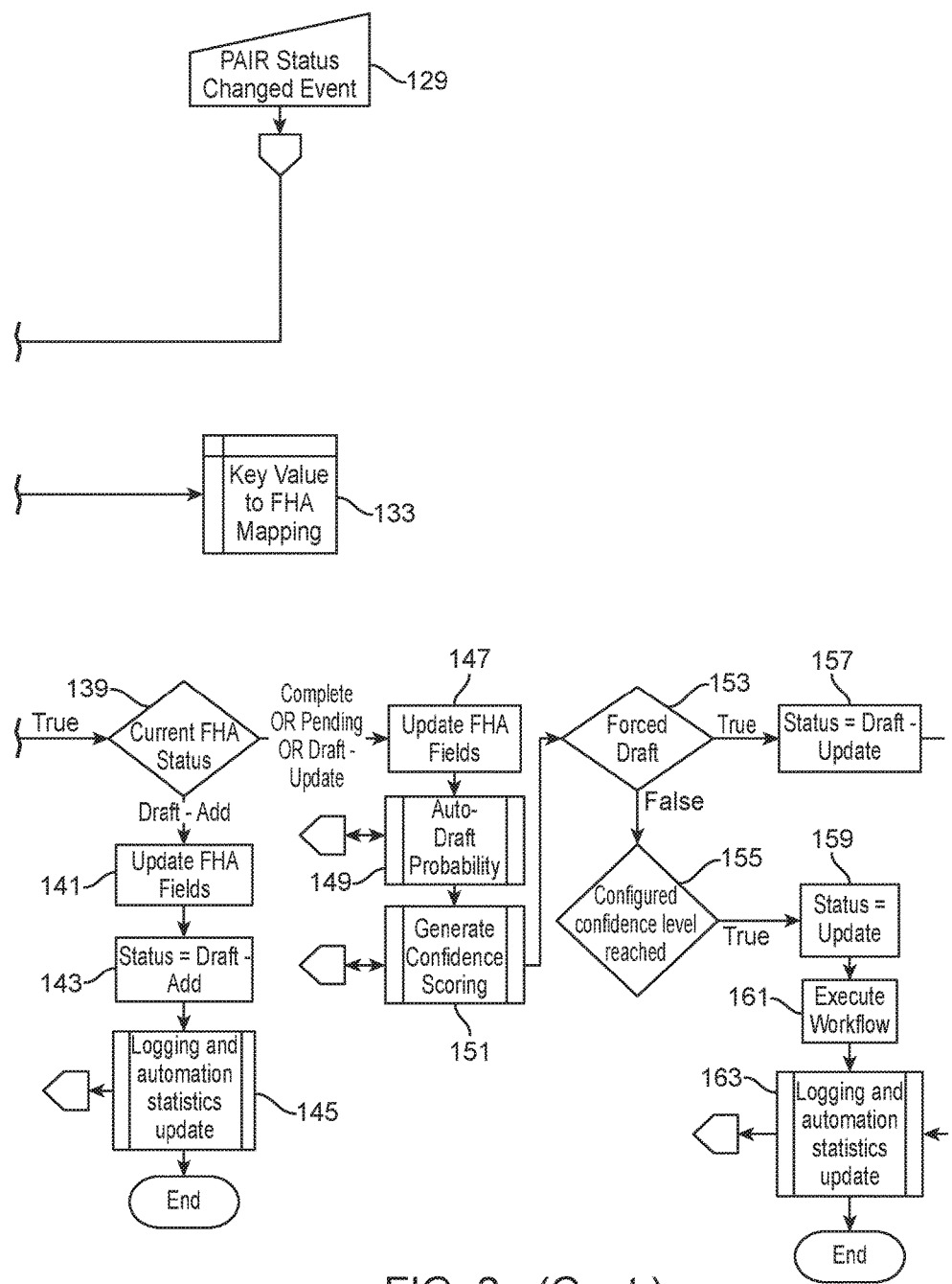

Referring now to FIG. 2a, a logic flow diagram of automated docketing is shown. File history action (FHA) email event 130 refers to the email being received by automated docketing. Next, the system validates 132 the email. Automated docketing system checks if the email is in the correct format. If the email is not in the correct format, the system creates a draft exception 136. Draft exception 136 indicates that the email failed. The system updates and stores the draft exception 136 such that a history of the failed email can be created. Logging and automation statistics update 138 indicates that the system is reviewing and storing information regarding the failed email. This gives much valued accountability for the automated docketing system. Accountability allows the docketing system to see why, or who initiated a FHA creation or modification. It will be understood that requests to the system may come from multiple sources. In a preferred embodiment, the adaptive docketing system has the ability to track and monitor FHA changes. Furthermore, in a preferred embodiment the adaptive docketing system allows a user to monitor undocumented changes via PAIR from the USPTO.

Still referring to FIG. 2a, the next step after valid email 132 is whether or not automation is enabled for a file history type 134. In other words, step 134 is the system checking if there is a configured value for the file history action type or not. If no, or false, then the draft exception 136 process occurs. If yes, or true, then the system checks if there is an existing file history action record 146 on the particular matter from the email (step 130). If not, or false, then a confidence score 142 is generated. The confidence score 142 step uses static rules that allow a user to check if the email has all required fields to create a file history action. The automated docketing system reviews, or checks basic rules to validate and build a confidence score. Once the confidence score is created, the system moves onto checking auto draft probability 144, another configurable value. For each file history action, the user can set the draft probability to a percentage value, such as 0%, 50%, or 100%, for example. This sets the probability of making the file history action a "draft", i.e., of requiring human approval of the FHA before executing a workflow for the FHA due to lack of sufficient confidence in the system's interpretation of the FHA email. The confidence score 142 and probability value 144 determines how the process goes forward.

In the case that auto draft probability 144 has been met, such as in the case of a probability setting of 100%, a draft add 162 is created. The draft add 162 is the status that is given to the file history action. The file history action was created, values filled in, and then saved to the system. The logging and automation statistics are updated 160.

If it was not selected for an auto draft selection, the confidence score value 168 is determined. If the configured value is less than the confidence score value, then it will be created as an add status 172. The add status 172 differs from the draft add because work flow runs in the system after this point. For example, if the file history action is a U.S.

non-provisional patent application, many emails and dates will be set, or executed 174 depending on the action. In other words, the system was confident that the file history action is ready to go.

Referring still to FIG. 2a, at current FHA status 139, when the system goes to a draft add, the system updates an existing record 141 and then keeps that status as a draft add 143. Not much changes except the system has updated the FHA and it remains in a draft mode. Thereafter, the logging and automation statistics 145 are updated as well. If the current status is complete, pending or draft update, the system will update the fields 147 again but the difference is the system will also go through auto-draft probability 149 and generate a confidence score 151 processes. If it is a forced draft 153 (coming from generated confidence score 151), then system will change the status to draft update 157, and then go back to updating the logging and automation statistics 163 (also as in box 160). If it is false from forced draft 153, then the system will check the confidence level 155. Then, if true, the status will be changed to update 159. Update 159 is different than draft update 157 in that update 159 will execute a workflow 161 in the system and users will get notified. After the notification, the logging and automation statistics update 163 occurs.

Figure 2B:
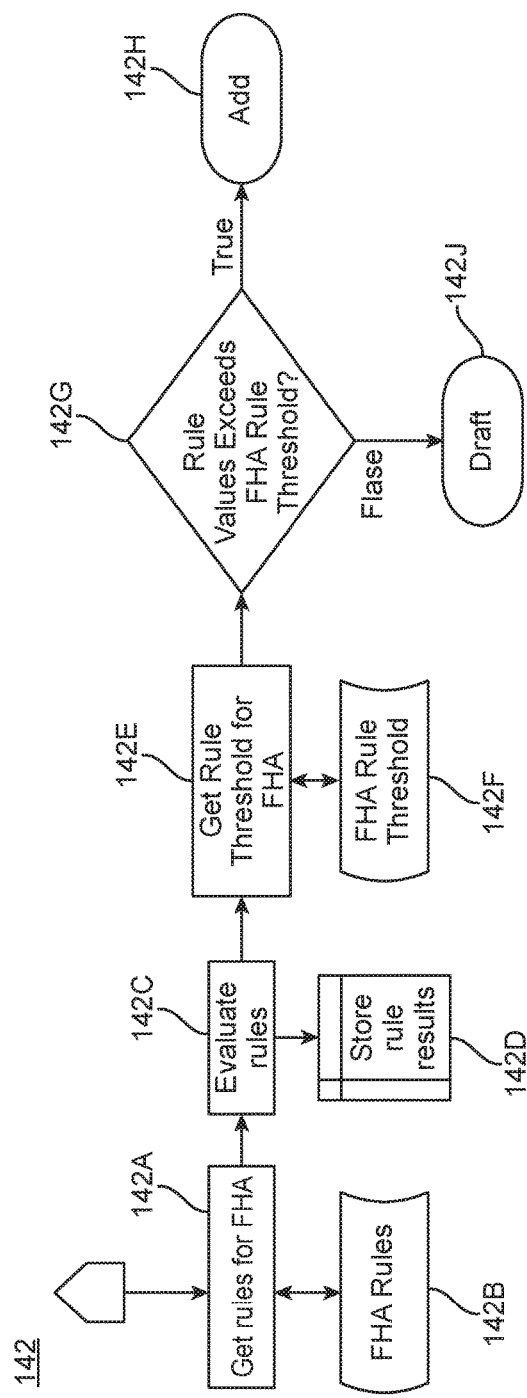
FIG. 2b illustrates a confidence scoring flow chart.

Referring now to FIG. 2b, generate confidence scoring 142 from FIG. 2a is shown in expanded form. In a preferred embodiment, the adaptive automated rules system gets 142A rules for FHA's from a FHA rules library 142B. A particular FHA needs to have the required fields to give the system confidence that it is a proper, or real FHA. Thus, the system evaluates 142C rules by writing rules and storing 142D the value of what those rules are. Furthermore, the system uses a percentage confidence score related to each one of the rules. Thus, the next step is to move from evaluate rules to get 142E rule threshold 142F for the FHA. The percentage confidence score for the rule is then compared 142G to the rule threshold 142F to see whether it exceeds the rule threshold. For example, the confidence score can be 50%. That means that for values over 50%, the system will sufficiently trust its interpretation of the FHA to run the FHA through the work flow. The add step 14211 means that the workflow of the FHA will be executed. If the value is below that threshold of 50%, then the draft add process 142J occurs, which will require human approval of the FHA before the FHA is run through the workflow.

Figure 2C:
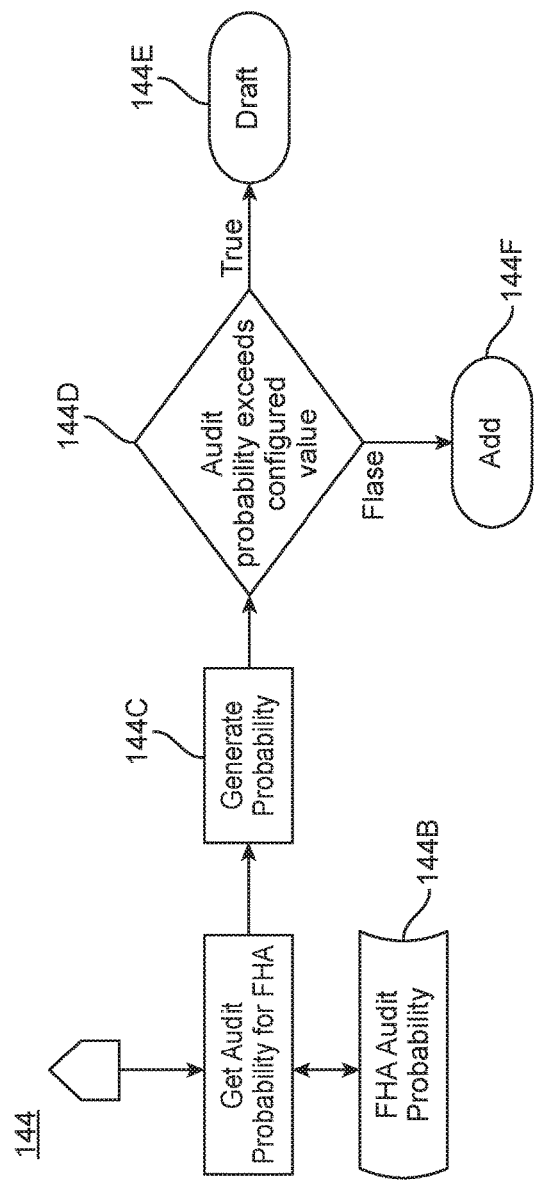
FIG. 2c illustrates a flow chart of auto draft probability process.

FIG. 2c shows an expanded flow of the auto draft probability 144 from FIG. 2. For every FHA, the system generates 144C a probability score 144B associated with the FHA. If the audit probability threshold exceeds 144D a configured value, the system will go to the draft process 144E. If the audit probability threshold does not exceed a configured value, then the system will go to the add process 144F (in which the system requires confirmation before proceeding to process the FHA). This is similar to the confidence flow expansion in FIG. 2b.

Figure 2D:
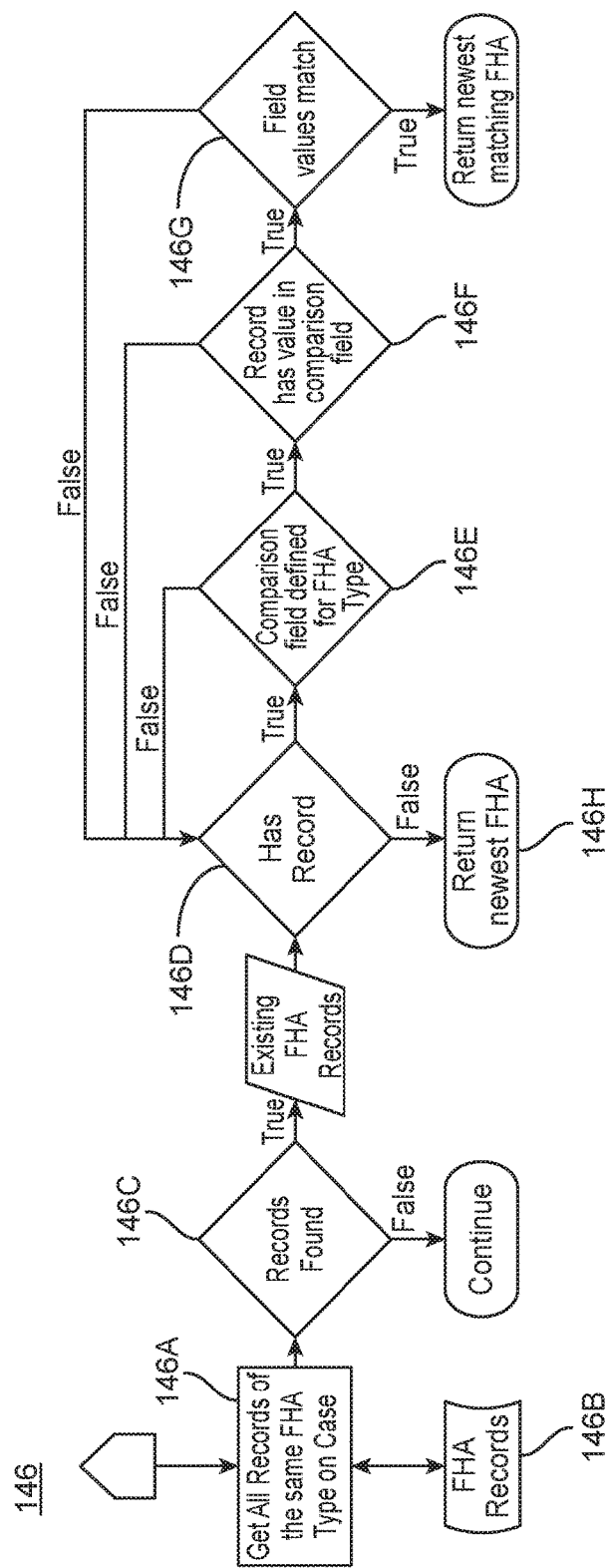
FIG. 2d illustrates a flow chart of find existing file history action record.

FIG. 2d illustrates an expanded flow of find existing FHA record 146 from FIG. 2a. First, the system gets 146A all the FHA records 146B of the type the user is looking to create. In one embodiment, there are 152 FHA types in the system that are manually created. It will be understood that the number of creatable FHA's is not limited to that number. If there are no records found on the matter, then the system will go to continue (default flow shown in FIG. 2a). If records are found 146C, then the system checks 146D to see if there is a record. If yes, or true, then the system checks 146E if there is a comparison field type defined for the FHA type. A comparison field type is configured for every FHA, and some have it and some do not. If it doesn't have a comparison field defined, then it will return 146H the newest FHA in that list. For example, if there are two FHA's, and neither of them have a comparison field, then the newest created FHA will be returned 146H for modification. If there is a comparison field, then the system will check 146F if it has a value. If yes, or true, then the system verifies 146G the value on the FHA and the value on an event match. If not, the system returns back through the process again. If it does have a value, then the newest FHA that matches the comparison field is returned.

Figure 2E:
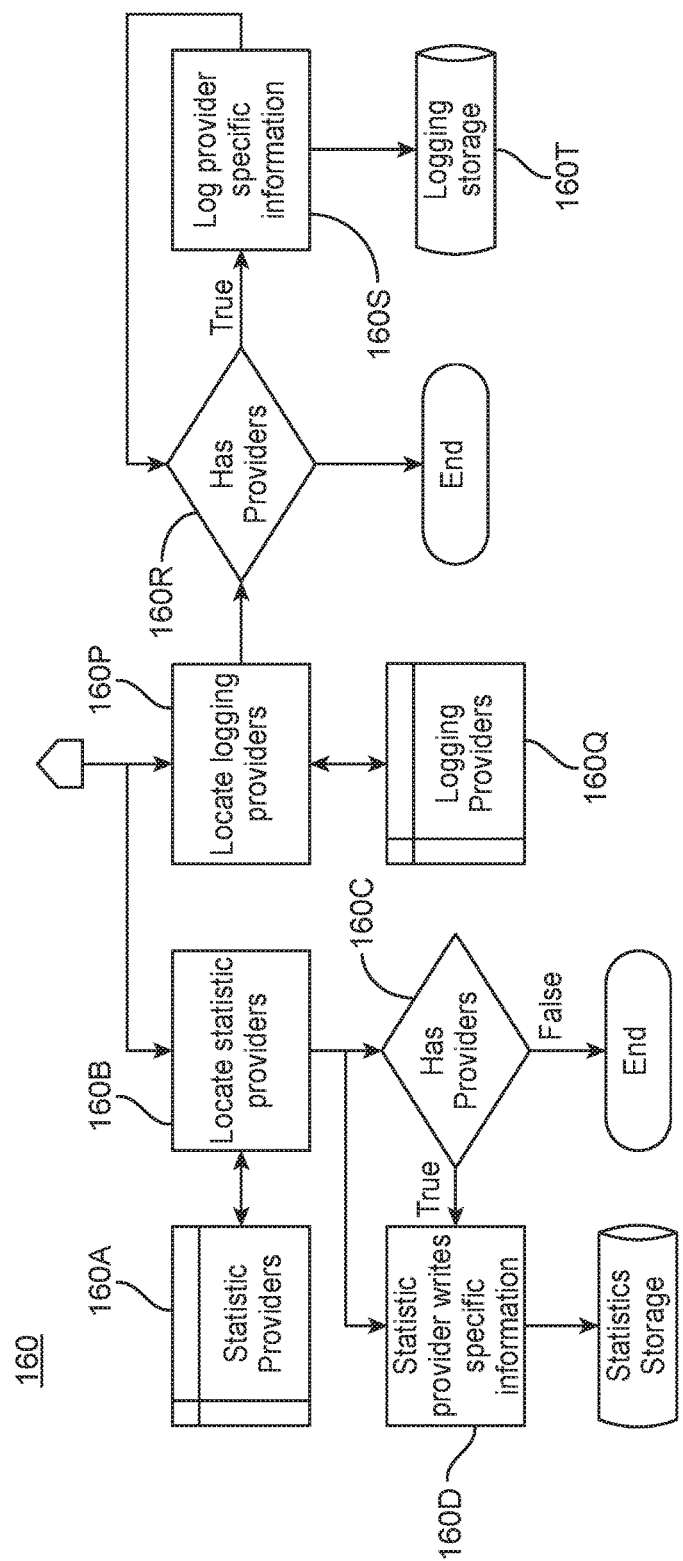
FIG. 2e illustrates a flow chart of logging and automation statistics update process.

FIG. 2e shows an expanded box of logging and automation statistics update 160 process from FIG. 2a. Adaptive automated rule docketing system has functionality to load statistics providers 160A. Adaptive automated rules docketing system locates 160B statistic providers by pulling their data from an IOC (inversion of control container). At box 160C, if there are any statistics providers that have been registered with the system, the system will write 160D for this event for that specific provider information, and that will then complete statistics providers process. Once the statistics provider process is complete, the process returns to box 160C. It will keep returning to this point until the system has gone through all of the statistics providers, then end that process. Additionally, the statistics process is happening in parallel with a locate logging providers process 160P. At locate logging providers 160P, the system obtains logging providers 160Q. If logging providers are available at box 160R, the system will send all information to a logging provider and log 160S what is necessary, and then repeat. If it doesn't have any more providers, then it ends, and if it does it will put the log provider specific information into logging storage 160T.

Figure 2F:
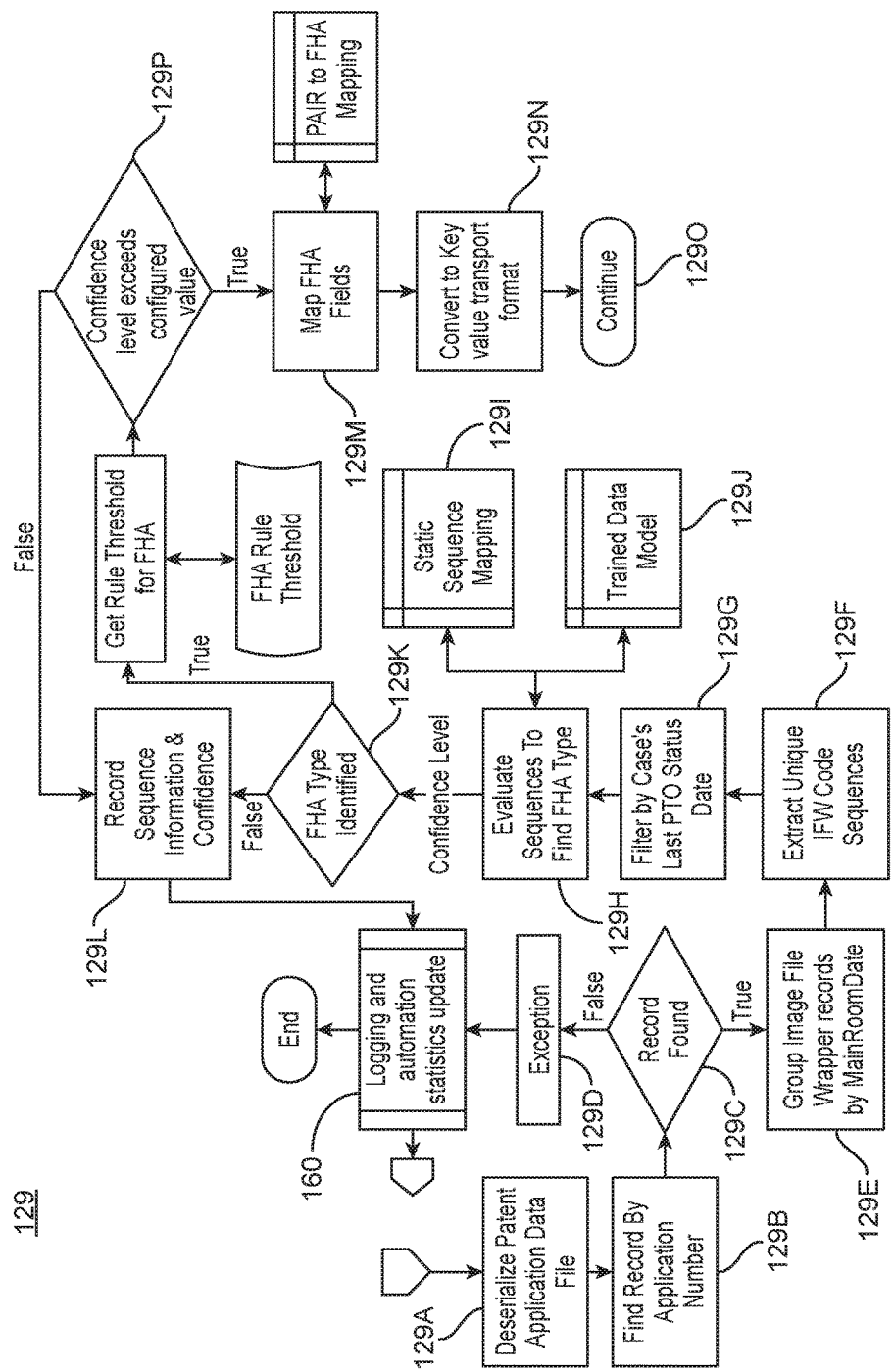
FIG. 2f illustrates a flow chart of PAIR status change event.

FIG. 2f illustrates an expanded flow of PAIR status change event 129 from FIG. 2a. For private PAIR (the PAIR data to which registered applicants have access), there is a document the system can download 129A that describes everything regarding the application at the USPTO. The adaptive automated rule docketing system takes that document's information and de-serializes it into something the system can read and understand. Thereafter, the system moves onto 129B finding the record by the application number. At record found 129C, if false, an exception process 129D will begin, which then returns to logging and automation statistics update 160 (as seen in previous figures). At record found 129C, if true, then all the image file wrappers in that document will be grouped 129E by mail room date. The system will take the IFW codes and create 129F a unique sequence. Out of the mail date groupings, the system will discard any groups that have already been taken care of (filtered 129G by USPTO status, date, etc.) Anything older than a particular date gets discarded. At evaluate sequence 129H, the system utilizes the unique sequences created. There are two paths at this point. The first one is the status sequence mapping 129I, where the system knows certain sequences are going to create a specific type of FHA. If the system matches on those sequences, it will return FHA type and tell more about what to do with the actual data. This is part of the analytical portion of adaptive automated rules docketing system. The second path utilizes a trained data model 129J which is another way to determine that sequence to get to the FHA type. From both of the paths the system is able to determine 129K the FHA type, map them and get the data into the system for analytics purposes. Based on the static sequence mapping and trained data model, the system comes up with a confidence level for determining FHA type. On the false path, the system will record that information in a different place so that it notes how it came close to defining something but it was not accurate or it was incorrect. The system can then change the logic, or adaptive rules, to accommodate the inaccuracies in the information. Once the system records 129L the information, logging automation tree occurs (as seen in previous figures). Looking now at the FHA type identified box from the true path, it is similar to the other processes previously shown by going to rule threshold for FHA. If the confidence level exceeds 129P a value that wasn't met then, as per the true path, mapping 129M field storage occurs. For example, an invention disclosure statement has certain fields that relate to a document or a field within the application. Adaptive automated rules docketing system maps that information from the private PAIR into the system. The next step is to convert 129N into key value transport format. This is also being used for other parts of the application. The system converts it so the rest of the application knows how to use it. This refers to the continue box 129Q that goes back into the main docketing flow from FIG. 2a. After this step, the system validates everything.

Figure 2G:
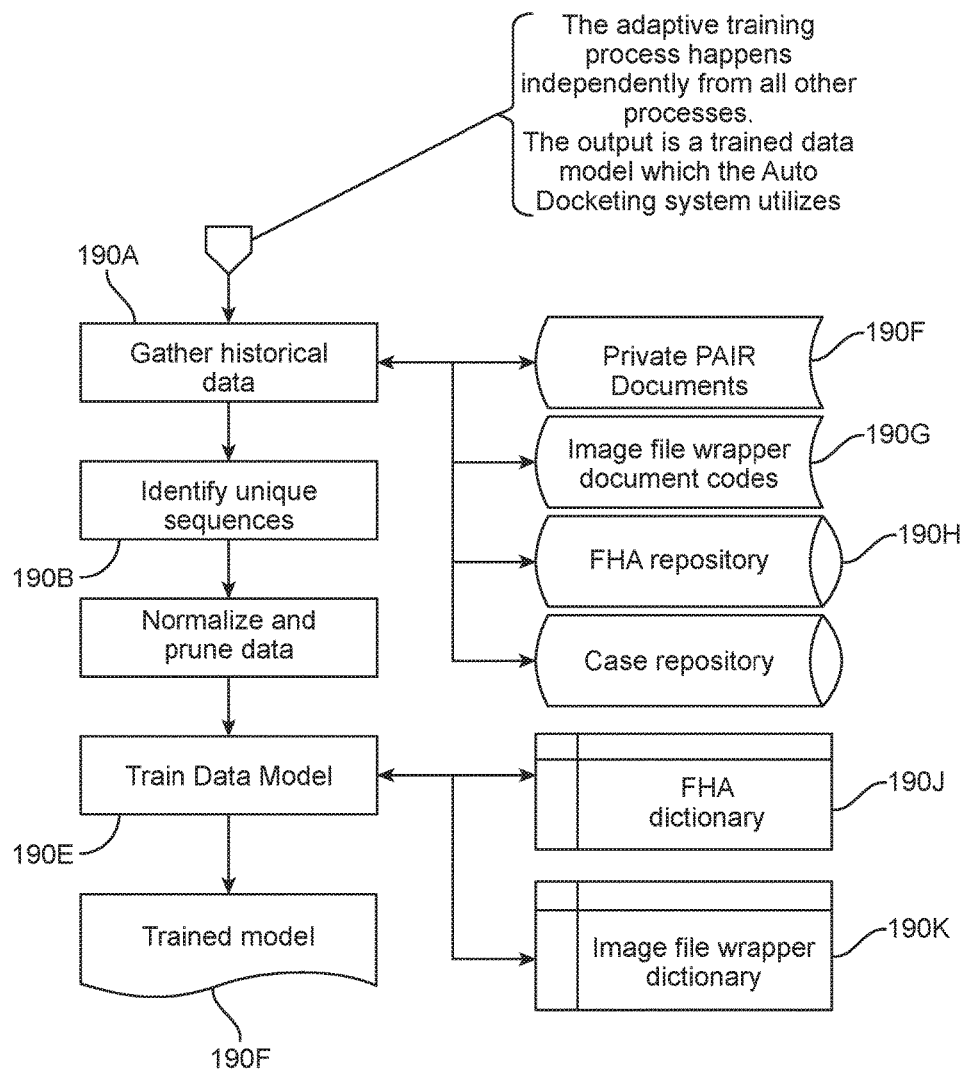
FIG. 2g illustrates an adaptive flow from trained data model and static sequence mapping.

FIG. 2g illustrates an expanded flow from trained data model 129J and static sequence mapping 129I from FIG. 2f This process occurs independently of the remaining processes so the system can update the model separately. First, the system gathers 190A historical data, such as all the private PAIR documents 190F downloaded, or a mapping of document codes 190G to translate into the system. Adaptive automated rules docketing system also has an FHA repository 190H such that information can be molded and pruned. Once all that information is gathered, the system identifies 190B unique sequences based on the image file wrapper codes and the historical data. Processing occurs here to match FHA data to the private PAIR information and to what has been done in the past. Adaptive automated rules docketing systems automatically groups, changes, or interprets information with what the system determines should already be there. Next is training 190E the data model. The system utilizes machine learning algorithms to take in normalized and setup data. The data is massaged, or recalculated, then inputted into machine learning algorithms using an FHA dictionary 190J or IFW dictionary 190K. These FHA and IFW dictionaries contain maps to determine the FHA. All that information gets run into algorithms and the output is a trained data model 190F. In the PAIR process, an identified sequence is used to classify what type is the FHA. This is an adaptive part of automated rules system. It utilizes all the known FHA history and over time it learns and adapts to the changes of the USPTO.

In other words, this capability is based on machine learning technology because the USPTO does not provide full documentation and changes to the general public. The adaptive algorithm identifies IFW patterns by grouping office action Mail Date IFW documents and matter statuses. This learning capability resolves in a set of cluster IFW documents, and each cluster will be associated with an office action and its corresponding confidence level.

The application monitors Private PAIR website daily for status change. If there are changes detected, the PAIR status and Image File Wrapper (IFW) Document code and its contents will be used to determine which applicable office action clusters to be executed. See FIG. 1214, infra.

Figure 3:
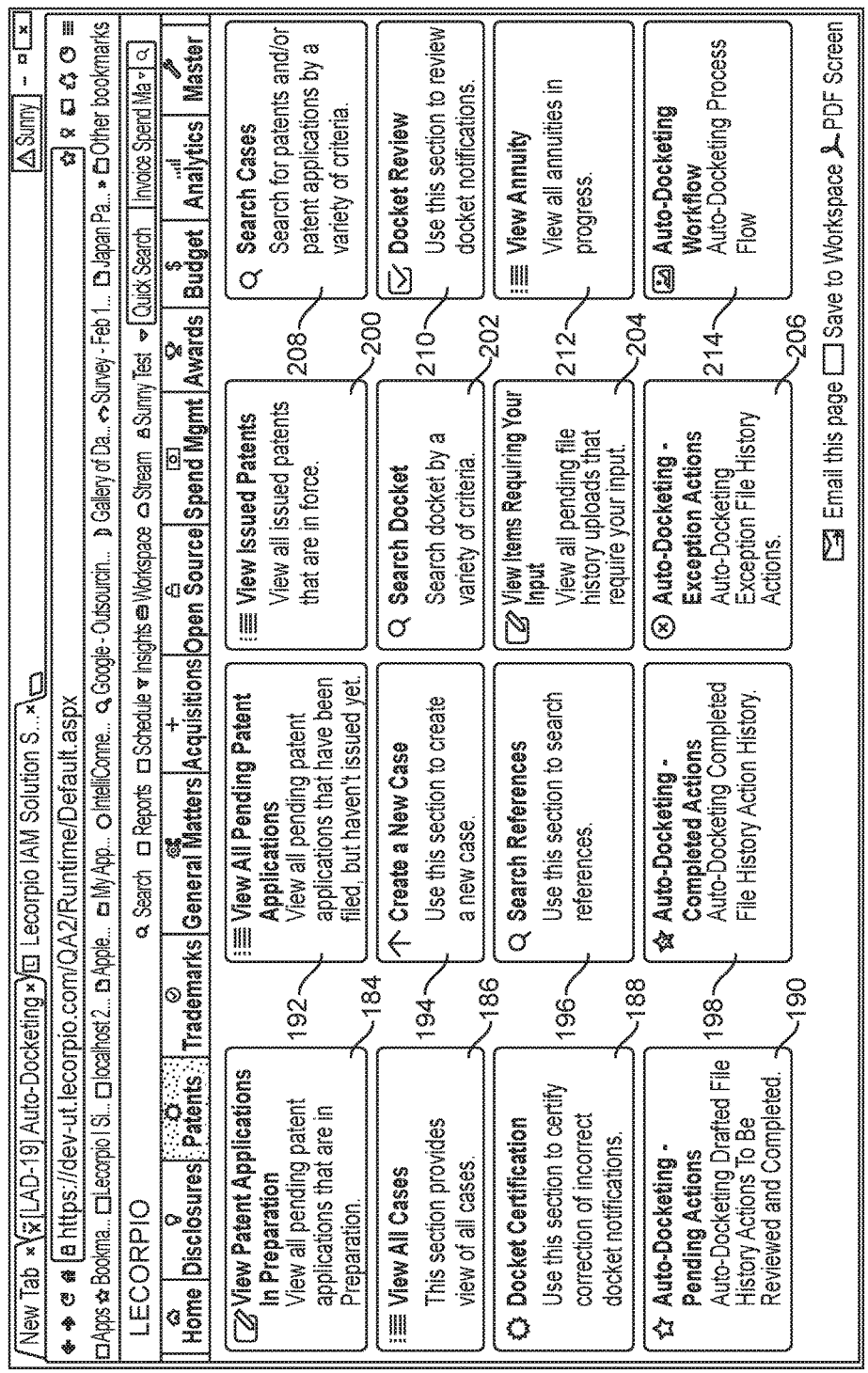
FIG. 3 shows a user interface to review pre-fill and complete actions.

Referring now to FIG. 3, a user interface menu is shown. Here, the user can review pre-filled actions, completed actions, and exceptions. The user can view pending patent applications 184 that are in preparation stage. The user can view a list of all the matters 186 in their docket. A docket certification 188 box leads the user to certify correction of incorrect docket notifications. Below that, the user can click on auto docketing pending actions 190 to view file history actions that need to be reviewed and completed. A view of all pending patent applications 192 allows the user to view pending patent applications that have been filed but haven't issued yet. The user can create a new matter 194, and search references 196. The user can click on auto docketing completed actions 198 to view completed file history and action history. To view all issued patents that are in force, the user can click on view issued patents 200. A search docket 202 leads the user to search the docket by a variety of criteria. The user can click on view items requiring your input 204 to see uploaded items that need input. Auto docketing exception actions 206 leads the user to view exception file history actions. These actions do not meet the required fields to be associated with any file history actions. The actions are used to ensure quality of process. Users can select to view and delete these. In addition, the user can search matters 208 to search for patents or patent applications by a variety of criteria. Also, the user can review their docket notifications 210. To view annuities in progress, the user can click on view annuity 212. Finally, the user can click on auto docketing workflow 214 to see a process flow for their docketing.

Figure 4:
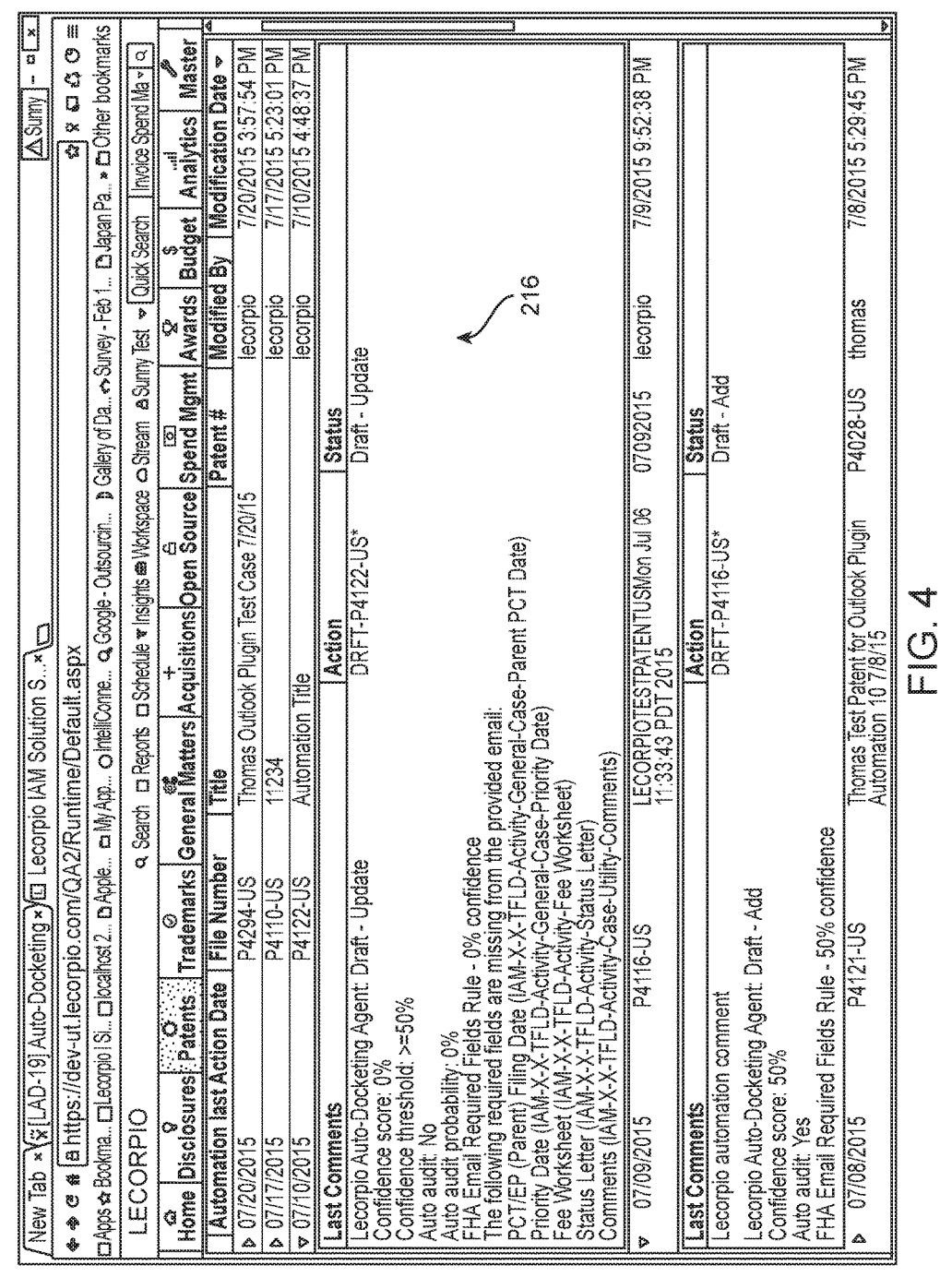

FIG. 4 shows a user interface 216 for auto docketing pending actions 190 from FIG. 3. Here, the user can view actions to be reviewed and completed. If the requested file history action does not meet the configured confidence factor and is selected as part of an audit sampling rate, the actions will be put in a pending actions mode. Within this mode, auto docketing rules such as confidence factor and audit selection will be displayed. The users complete each action by reviewing and submitting, and the action will keep track whether each action is "Add" or "Edit" and launch a proper display context. Mail date will be used to determine whether the "Add" or "Edit" action is applied.

Figure 5:
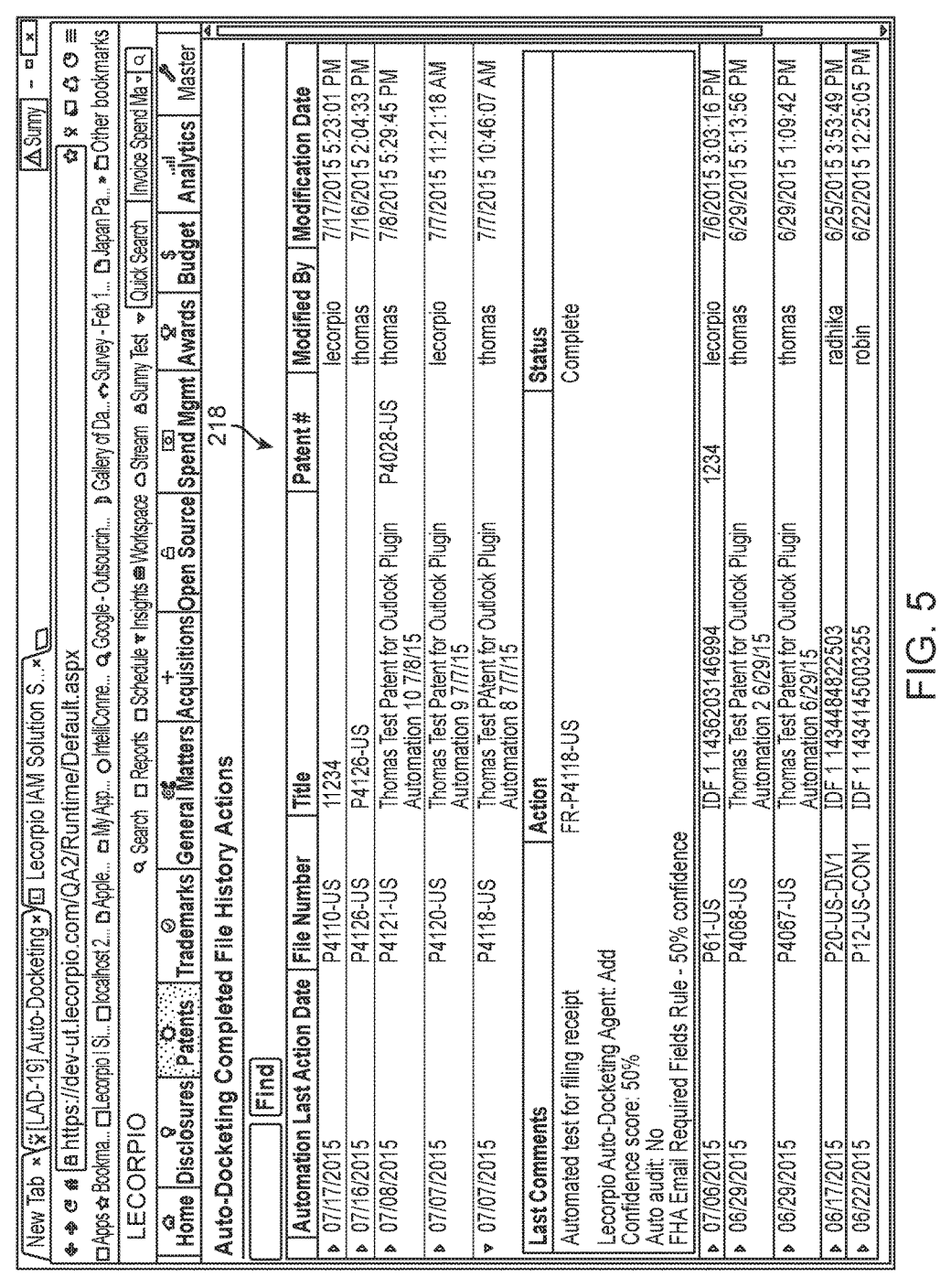

Referring now to FIG. 5, an interface 218 for auto docketing completed actions 198 from FIG. 3 is shown. In interface 218, the user's actions are not required. If the file history action meets the pre-configured confidence factor and is not selecting as part of the pre-configured audit sampling rate, the actions will be put in a complete actions mode. The user completes each action by reviewing and submitting. As in FIG. 4, the application in FIG. 5 will keep track of whether the action is "Add" or "Edit" and launch the proper display context.

Figure 6:
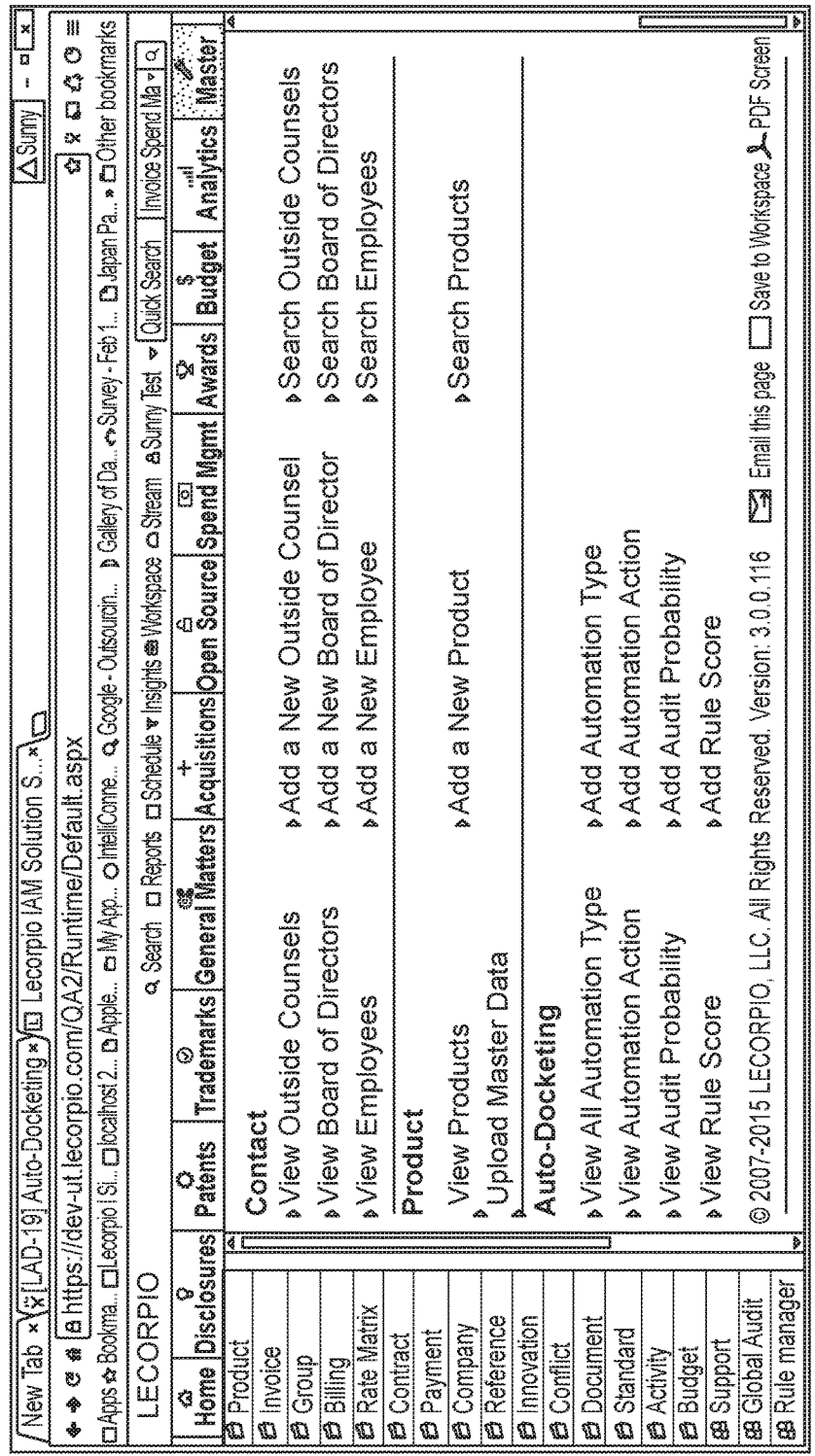
FIG. 6 shows a user interface for auto docketing configuration by the user.
Figure 8:
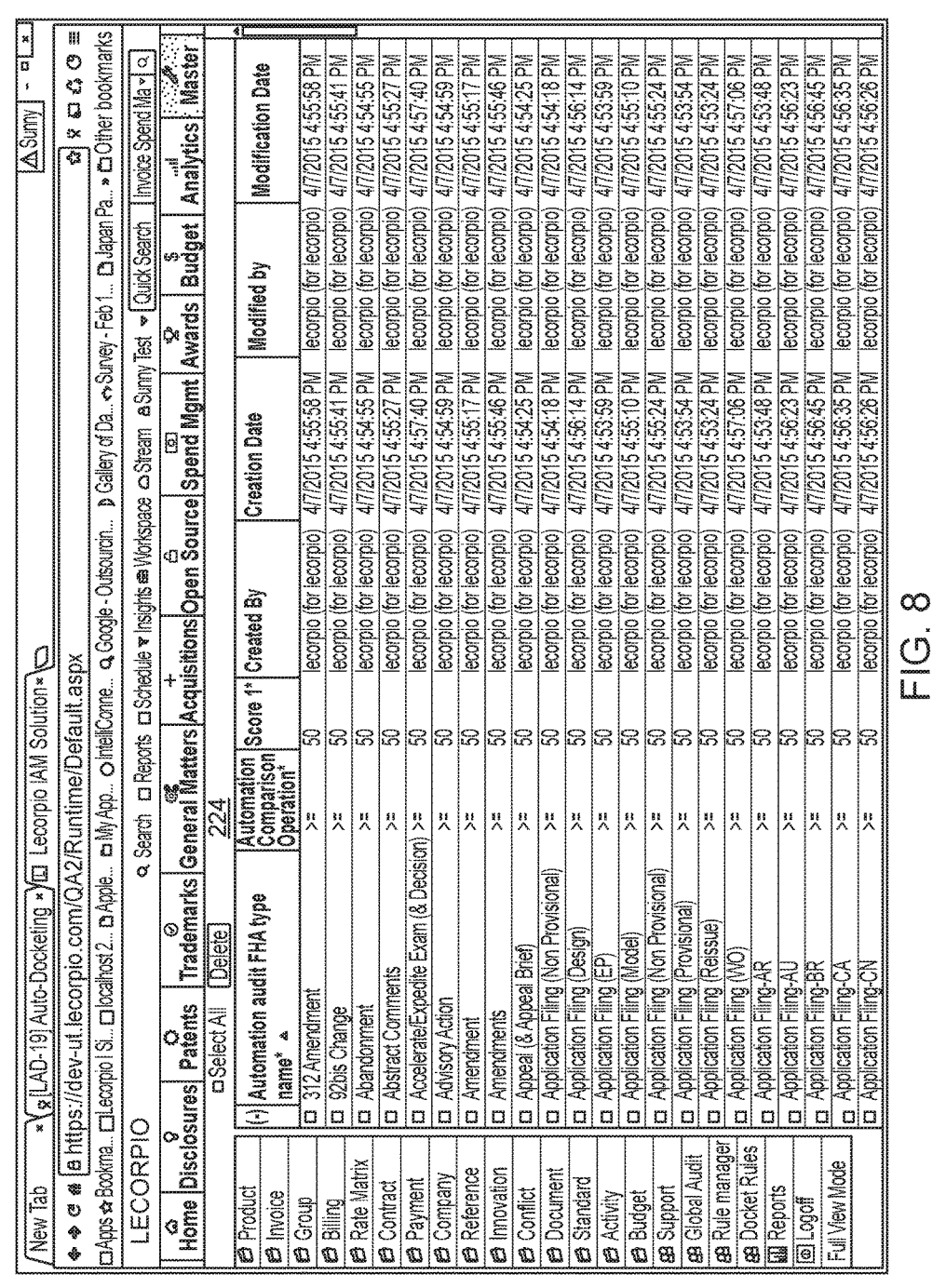
Figure 9:
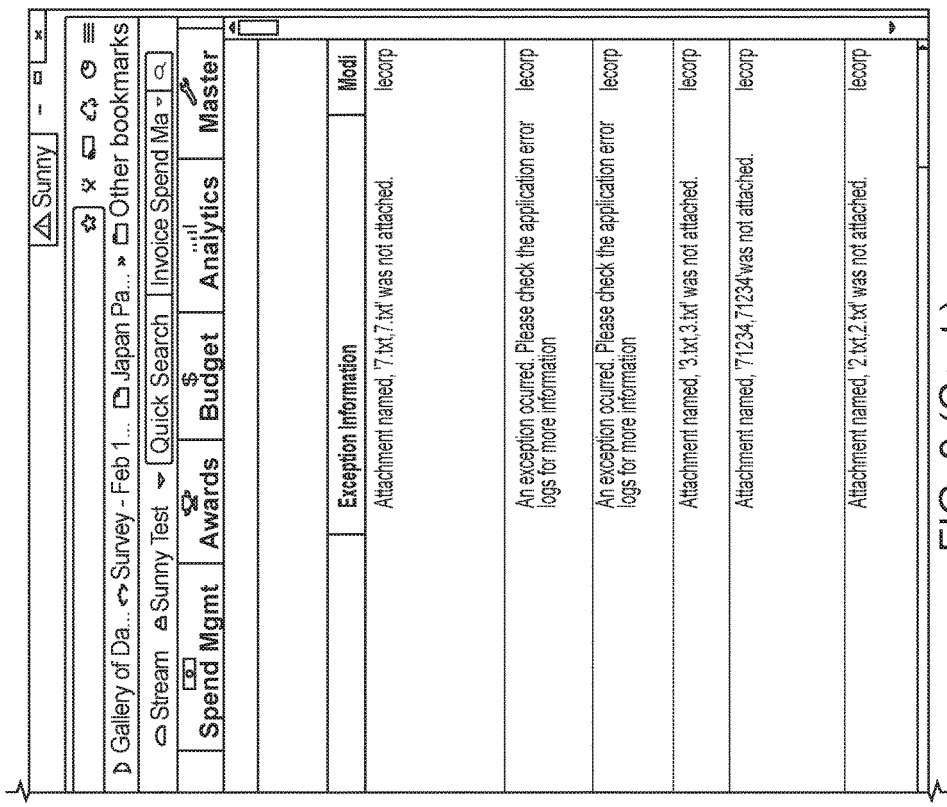
FIG. 9 further shows exception file history action user interface.

FIG. 6 shows a user interface for configuring auto docketing. FIG. 7 shows a user interface for preferences and configuring audit rules. FIG. 8 shows a user interface for confident factor rule, and FIG. 9 shows a user interface for exception file history actions. These actions do not meet the required fields to be associated with any FHA actions. These actions are used to ensure quality of process. Users can select to view and delete these.

Figure 10:
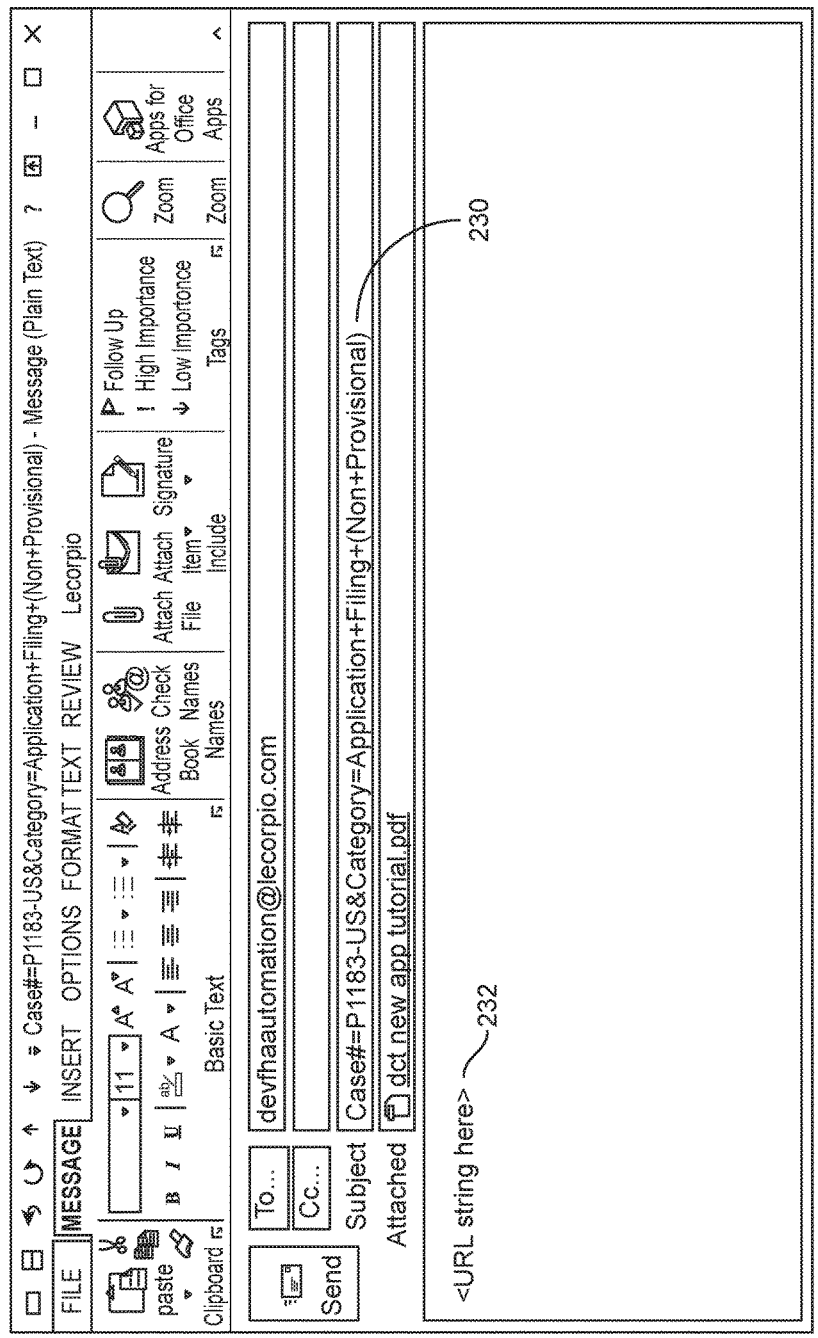
FIG. 10 shows a standard email handler screen scheduled to process incoming emails.

FIG. 10 illustrates a standard email handler. The email handler is scheduled to run hourly to process incoming emails. A standard Microsoft Outlook plug-in (see, infra) can be provided to support these actions. As explained in the FIG. 1 flow chart, auto docketing email is triggered by incoming emails from outside law firms. All parameters follow standard name value field format separated by "&" separator. An email subject field 230 includes required matter# and file history action. A body content 232 includes all parameters. For out of the box, auto docketing application will support actions including but not limited to: application filing (non-provisional), assignment filing (and recordation), file receipt, final office action and response, invention disclosure statement, issue notification and notice of grant, notice of allowance, office action and response, power of attorney/declaration, and receipt of issued patent.

Figure 11:
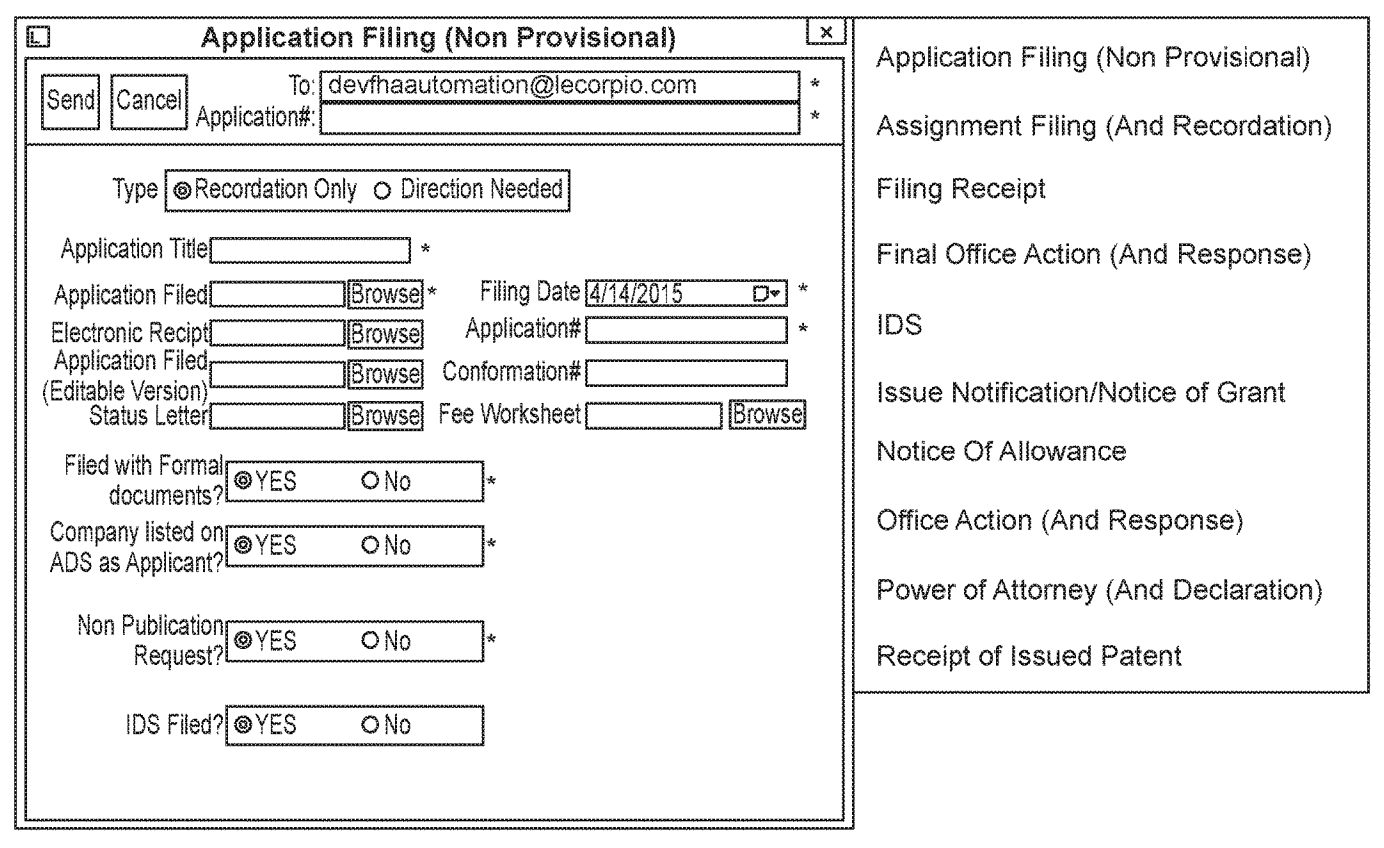

FIG. 11 shows a sample electronic mail (e-mail) plug-in, for example, a plug-in for Microsoft Outlook, as an example of an e-mail plug-in. For ease of discussion, reference will be made to Outlook plug-in 234. It is noted that plug-ins for other communication methods may be used, such as chat plug-ins, messenger plus-ins, etc. The Outlook plug-in can be downloaded from the auto-docketing application home page. Auto-docketing application, in a preferred embodiment, supports the following common office actions: application filing (non-provisional), assignment filing and recordation, file receipt, final office action and response, information disclosure statement, issue notification/notice of grant and response, power of attorney/declaration, and receipt of issued patent. Additional actions can be added upon request. The Outlook plug-in utilizes auto-docketing configuration parameters of preferences, confidence factor, and audit factor, with the process flow as in FIG. 1. It will be understood by one skilled in the art that office actions may be identifiable by indicia as part of an electronic image. Also, a scanner may be used for generating an electronic image. Character recognition software may be utilized for analyzing the image and event indicia, and reporting software for docketing the event information.

Figure 12:
FIG. 12 shows a clustering sequence for adaptive flow.

FIG. 12 shows machine learning docketing system knowledge base that maps how often each document code appears in a sequence with other document codes. FIG. 13 shows a machine learning docketing system knowledge base that maps document codes to how often they appeared in each sequence. The knowledge base also maps docket status code by frequency of appearance.

Figure 14:
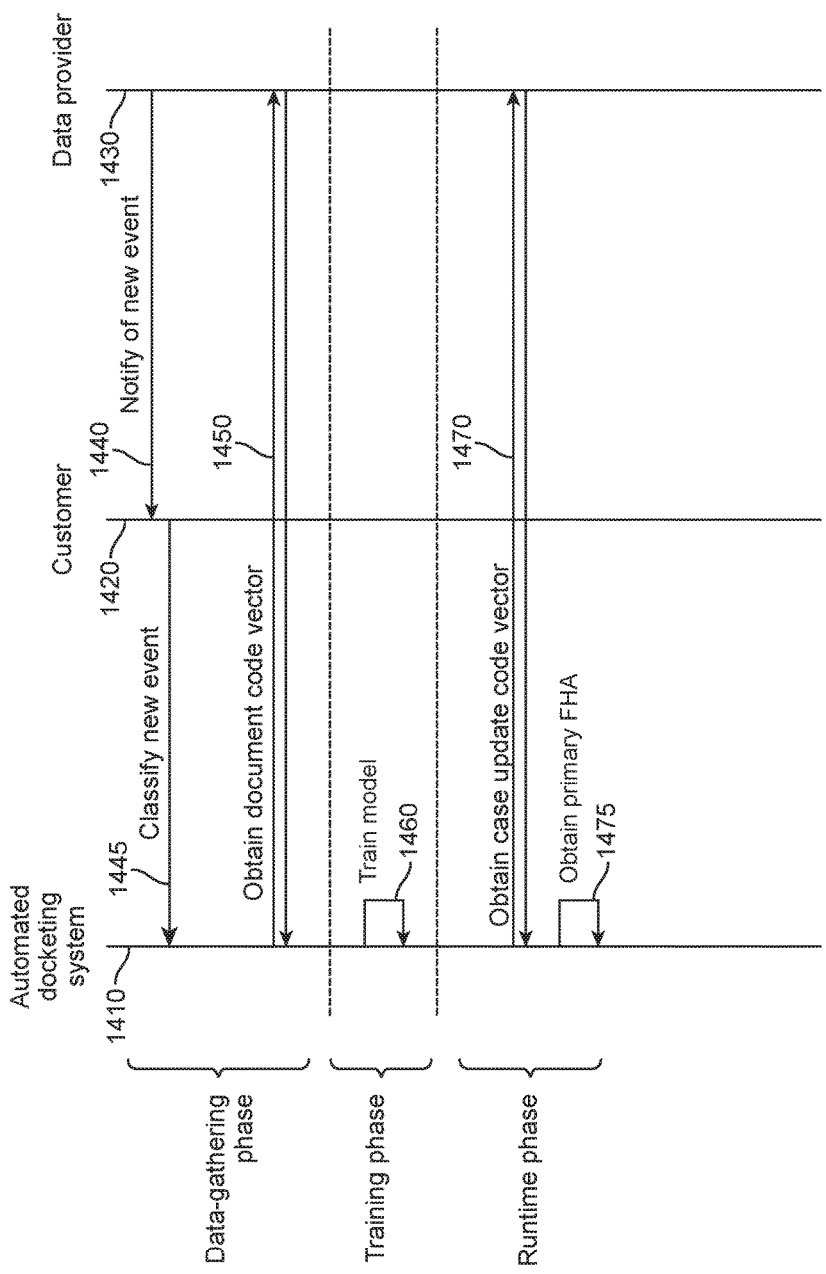
FIG. 14 is a sequence diagram illustrating the interactions between different entities when training the data model for identifying a particular FHA based upon given document codes, according to one embodiment.

FIG. 14 is a sequence diagram illustrating the interactions between different entities when training the data model for identifying a particular FHA based upon given document codes, according to one embodiment.

As described above, each FHA (file history action) indicates a particular meaningful event that can take place for a particular intellectual property matter and of which the owner of the intellectual property matter (e.g., a customer such as a company to which the intellectual property matter has been assigned, or a law firm with power of attorney over the intellectual property matter) should be informed. For example, for a patent application matter, possible FHAs include new office action, filing of an Information Disclosure Statement (IDS), examiner interview summary, notice of appeal filing, request for continued examination filing, notice of allowance, and the like. As also described above, a provider of data about the intellectual property matter (such as the USPTO, or a company or other organization redistributing its data) may make available a list of documents associated with the intellectual property matter, each document having a corresponding document code that indicates what the document represents. For example, for patent matters, possible document codes might include "CLM" (representing the claims for the matter), "NFOA" (representing a non-final office action), "REM" (representing applicant's remarks in the response to an office action, "DRW" (representing drawings for the patent application), "ADS" (representing an application data sheet for the patent application), "WFEE" (representing a fee worksheet), "892" (representing a list of references cited by a patent examiner), "ABN" representing abandonment of the matter, and the like.

FIG. 14 illustrates an automated docketing system 1410, a customer 1420 that uses the automated docketing system 1410 to handle its intellectual property matters, and a data provider 1430 (such as the U.S. Patent and Trademark Office) that provides information about documents associated with intellectual property matters. FIG. 14 elaborates on aspects discussed with respect to FIGS. 2f and 2g.

During a data-gathering phase, the automated docketing system 1410 gains information about correlations between document codes and FHAs. Specifically, when a new event occurs for an intellectual property matter, the data provider 1430 may notify 1440 the customer 1420 that owns the intellectual property matter of the occurrence of the event. For example, the USPTO, acting as the data provider 1430, might email the customer 1420 to inform it that new documents are available for its matter. (Step 1440 is optional, in that in some embodiments the customer 1420 may manually check its own matters to determine whether new documents are available.)

The customer 1420—e.g., a paralegal or docketing employee thereof—classifies 1445 the documents as representing a particular FHA. For example, a paralegal might manually review the new documents, determine that they represent the various portions of a new non-final office action mailed by the examiner of the matter, and use a user interface (e.g., provided by web-based software of the automated docketing system 1410) to indicate that the documents represent the "NFOA" FHA. This indication assigned by the customer 1420 is received by the automated docketing system 1410 and acts as a ground truth label for the set of new documents associated with the matter.

The automated docketing system 1410 obtains 1450 the document code vector corresponding to the new matter event. For example, the automated docketing system 1410 could use an application programming interface (API) of the data provider 1430, perform screen-scraping on a web-based user interface of the data provider 1430, or the like. In one embodiment, the automated docketing system 1410 obtains the set of document codes corresponding to all documents made available by the data provider 1430 on the day of the FHA event, on the assumption that only one FHA event typically occurs in a single day. For example, in the case of an FHA event corresponding to a new non-final office action being mailed, the set of document codes for the particular day on which the non-final office action was mailed might be "CTNF", "892", "FWCLM", "SRNT", "FOR", "SRFW", and "OA.EMAIL". In one embodiment, the obtained document codes are represented as a bit vector, with each element corresponding to one of the possible document codes, a "1" bit indicating that the document code was present among the documents corresponding to the FHA event, and a "0" bit indicating that the document code was not present. In other embodiments, each element stores an integer representing how many times the corresponding document code occurred.

Steps 1440-1450 typically occur many times during the data-gathering phase in order to allow the automated docketing system 1410 to accumulate sufficient data for the training phase, although for simplicity only one occurrence of the steps is illustrated in FIG. 14.

During a training phase, the information gathered in steps 1440-1450 serves as "ground truth" for training the model. Specifically, the automated docketing system 1410 trains 1460 the model by using the data accumulated as a result of steps 1440-1450 as input to a machine learning algorithm such as a hidden Markov model, a multiclass support vector machine, or the like. The machine learning algorithm learns the association of the given "ground truth" FHA labels with the corresponding document code vectors. The resulting model takes a document code vector as input and produces as output an indication of one or more FHAs that the code vector likely represents. In one embodiment, the model produces a confidence score for each possible FHA, each confidence score indicating how likely it is that the document code vector represents the corresponding FHA. In another embodiment, the model produces a single FHA identifier that represents the FHA most likely to be represented by the document code vector, along with its confidence score.

During a runtime phase, the automated docketing system 1410 uses the trained model to automatically docket new FHAs for intellectual property matters. Specifically, in step 1470, the automated docketing system 1410 obtains a code vector corresponding to an update (new event) for a matter. For example, in one embodiment the automated docketing system 1410 periodically requests matter data for all the matters that it is monitoring on behalf of its customers 1420, noting any documents that are new since the last monitoring. If any documents for a given matter are new, the automated docketing system 1410 produces the document code vector for the new documents in the same manner described above with respect to step 1450. The automated docketing system 1410 then provides the document code vector to the trained model and obtains (for example) the primary FHA determined to be most likely to represent the set of new documents, e.g., along with its corresponding confidence score. Then, as described above, the automated docketing system 1410 can take an automatic docketing action in response to the determined FHA, such as creating a new FHA item in association with the matter, optionally notifying the associated customer 1420 of the new FHA. In one embodiment, the automated docketing system 1410 compares the confidence score corresponding to the determined FHA to a given minimum threshold confidence score, and if the confidence score is above the threshold it takes the automatic docketing action, and if not it takes a different action, such as prompting the customer 120 to confirm that the determined FHA is correct for the given documents.

Thus, due to the training of the model as a result of steps 1440-1460, the automated docketing system 1410 need no longer rely on the customers 1420 to manually label events, as in step 1445, but rather can automatically create a new docket item for an FHA identified for the event.

Figure 15:
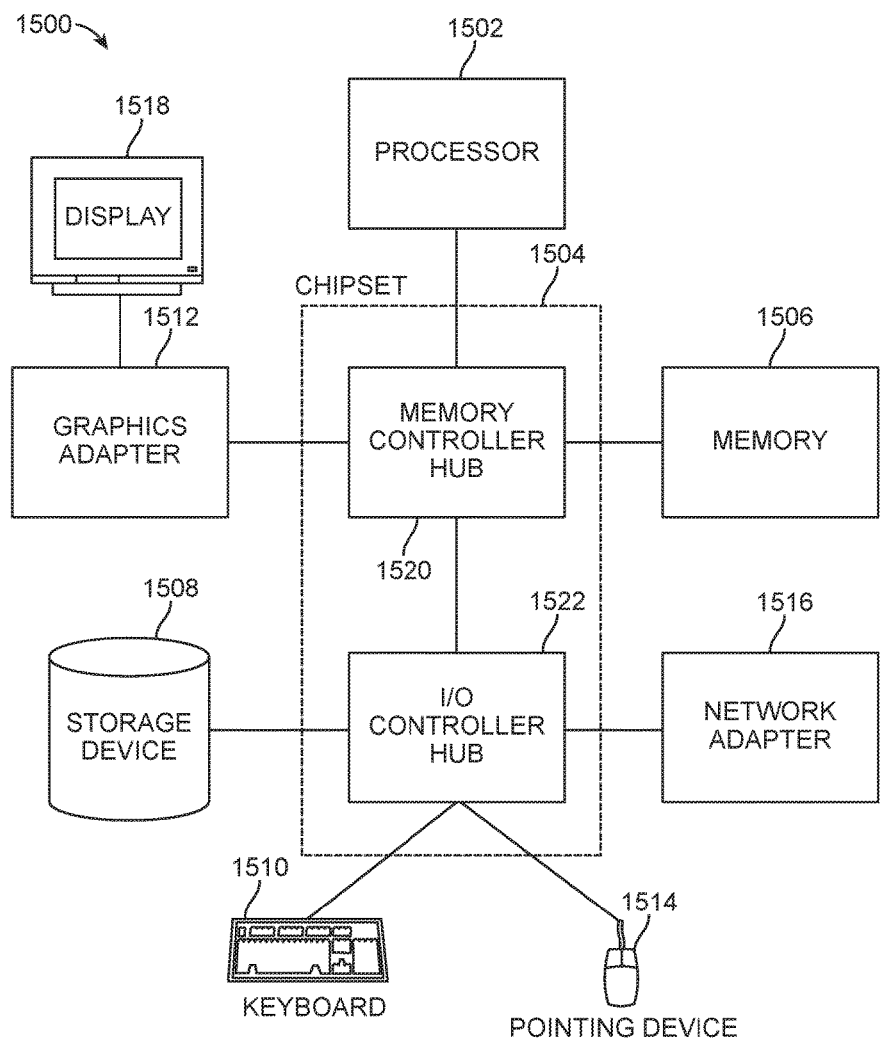
FIG. 15 is a high-level block diagram illustrating physical components of a computer used as part or all of an automated docketing system, according to one embodiment.

Note that the data-gathering and training phase, although illustrated in FIG. 15 as taking place entirely before the runtime phase, may take place at various times. For example, the data-gathering of steps 1440-1450, and the resulting training 1460, may occur repeatedly, such as at fixed intervals of time, or in response to a certain amount of data-gathering, and may occur after some instances of steps 1470-1475, for example.

In one embodiment, the automated docketing system 1410 does not determine an FHA for a matter update event solely based on the trained model, but additionally factors in specified rules. For example, although in many cases a combination of codes is needed to predict the FHA corresponding to a set of documents, the presence of a certain document code may without more be perfectly determinative of a certain FHA (e.g., the "ABN" document code might indicate the FHA for matter abandonment with 100% certainty). Thus, additional static rules may be specified (e.g., by the organization responsible for the automated docketing system 1410) to override or adjust the FHA prediction of the trained model in certain cases.

Note that the training of the model by the automated docketing system 1410 provides a number of benefits. For example, as opposed to specifying static rules, training a model allows predicting a number of FHA types for which no rule is inferable based on simple human observations (e.g., no single document code is perfectly predictive of the FHA). Thus, the use of the trained model allows the inference of the applicability of certain FHAs that humans could not reasonably infer. Additionally, the set of possible document codes, or the possible FHAs, could changes. For example, the U.S. Patent and Trademark Office could add to, or alter, the document codes for the documents that it associates with matters, or the organization responsible for the automated docketing system 1410 could start supporting new FHAs corresponding to new possible actions to be taken. In such cases, the automated docketing system 1410 can automatically re-train the model, without any additional effort on the part of employees of the organization responsible for the automated docketing system 1410, which reduces required labor and required time to adjust to the change. The use of static rules, in contrast, would require considerably more effort and time.

It is appreciated that although FIG. 14 illustrates new events being classified 1445 by a customer 1420 of the automated docketing system 1410, the role of the customer 1420 could be played by any user of the automated docketing system 1410, a law firm, corporate user or other company, a legal service provider, or the like.

FIG. 15 is a high-level block diagram illustrating physical components of a computer 1500 used as part or all of the automated docketing system 1510, according to one embodiment. Illustrated are at least one processor 1502 coupled to a chipset 1504. Also coupled to the chipset 1504 are a memory 1506, a storage device 1508, a graphics adapter 1512, and a network adapter 1516. A display 1518 is coupled to the graphics adapter 1512. In one embodiment, the functionality of the chipset 1504 is provided by a memory controller hub 1520 and an I/O controller hub 1522. In another embodiment, the memory 1506 is coupled directly to the processor 1502 instead of the chipset 1504.

The storage device 1508 is any non-transitory computer-readable storage medium, such as a hard drive, compact disk read-only memory (CD-ROM), DVD, or a solid-state memory device. The memory 1506 holds instructions and data used by the processor 1502. The graphics adapter 1512 displays images and other information on the display 1518. The network adapter 1516 couples the computer 1500 to a local or wide area network.

As is known in the art, a computer 1500 can have different and/or other components than those shown in FIG. 15. In addition, the computer 1500 can lack certain illustrated components. In one embodiment, a computer 1500 acting as a server may lack a graphics adapter 1512, and/or display 1518, as well as a keyboard or pointing device. Moreover, the storage device 1508 can be local and/or remote from the computer 1500 (such as embodied within a storage area network (SAN)).

As is known in the art, the computer 1500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1508, loaded into the memory 1506, and executed by the processor 1502.

FIG. 15 is a high-level block diagram illustrating physical components of a computer 1500 used as part or all of the automated docketing system 1510, according to one embodiment. Illustrated are at least one processor 1502 coupled to a chipset 1504. Also coupled to the chipset 1504 are a memory 1506, a storage device 1508, a graphics adapter 1512, and a network adapter 1516. A display 1518 is coupled to the graphics adapter 1512. In one embodiment, the functionality of the chipset 1504 is provided by a memory controller hub 1520 and an I/O controller hub 1522. In another embodiment, the memory 1506 is coupled directly to the processor 1502 instead of the chipset 1504.

The storage device 1508 is any non-transitory computer-readable storage medium, such as a hard drive, compact disk read-only memory (CD-ROM), DVD, or a solid-state memory device. The memory 1506 holds instructions and data used by the processor 1502. The graphics adapter 1512 displays images and other information on the display 1518. The network adapter 1516 couples the computer 1500 to a local or wide area network.

As is known in the art, a computer 1500 can have different and/or other components than those shown in FIG. 15. In addition, the computer 1500 can lack certain illustrated components. In one embodiment, a computer 1500 acting as a server may lack a graphics adapter 1512, and/or display 1518, as well as a keyboard or pointing device. Moreover, the storage device 1508 can be local and/or remote from the computer 1500 (such as embodied within a storage area network (SAN)).

As is known in the art, the computer 1500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1508, loaded into the memory 1506, and executed by the processor 1502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 16:
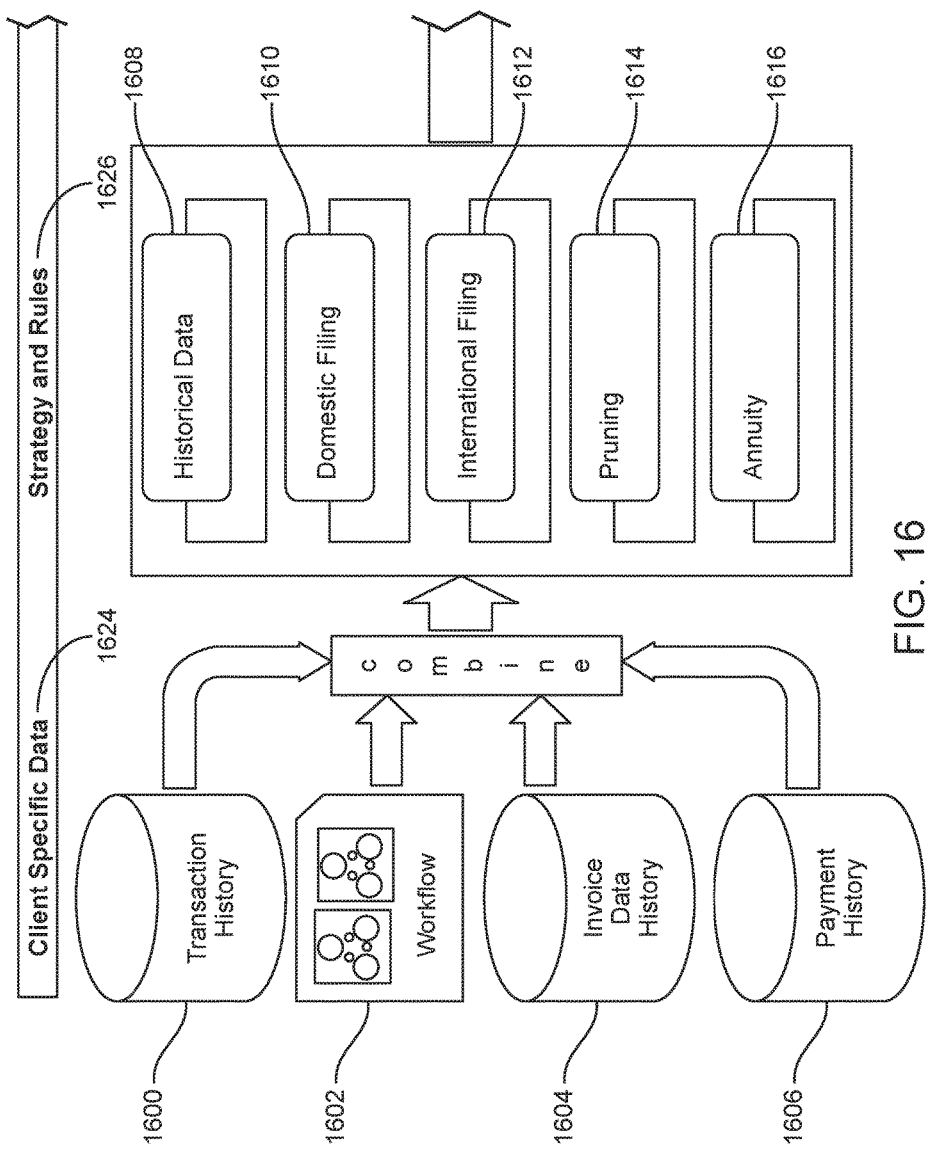
FIG. 16 illustrates a flow diagram for best practice budgeting.
Figure 16:
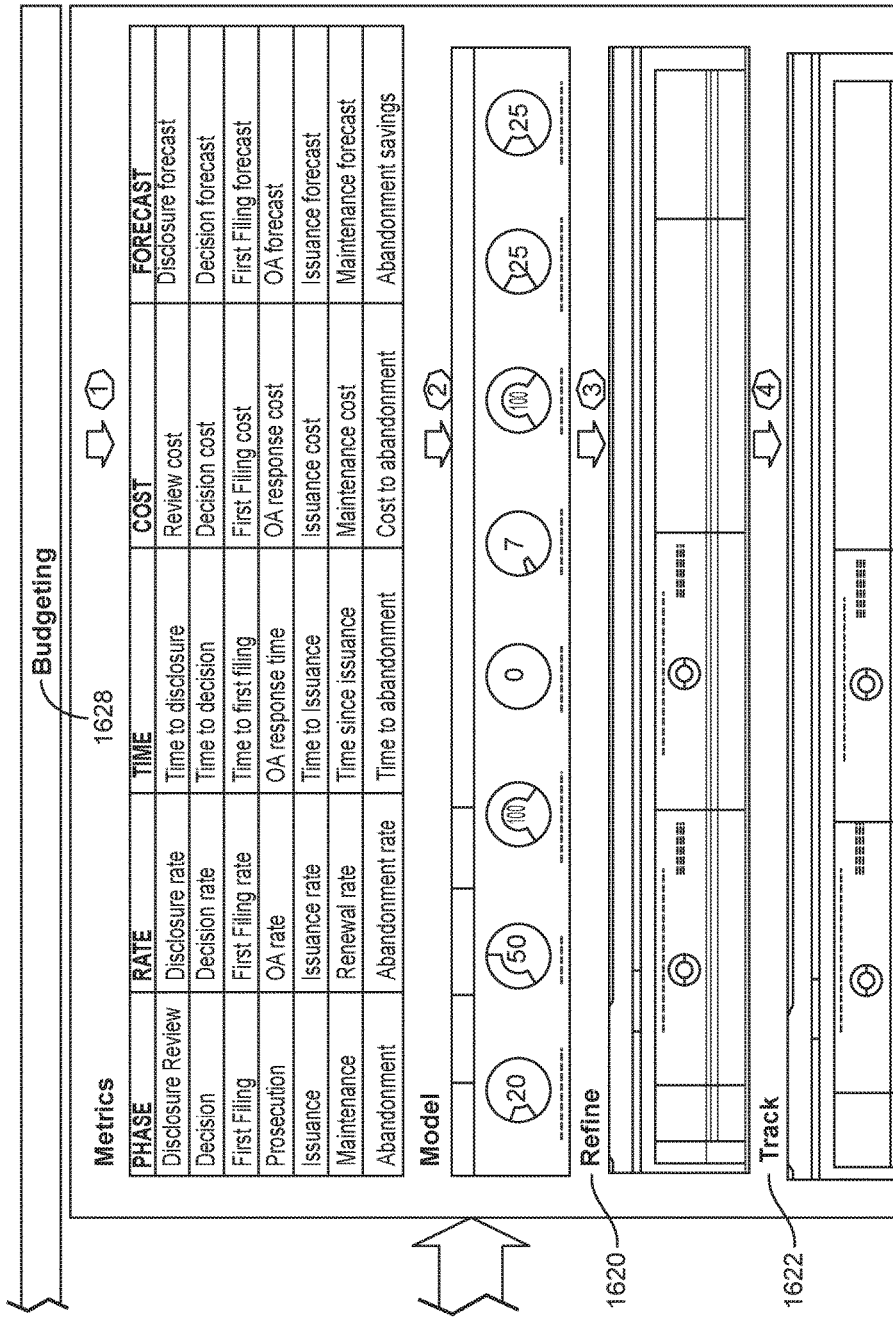

Referring now to FIG. 16, a flow diagram for best practice budgeting is described. In a preferred embodiment of the invention, this approach includes incorporating a combination of workflow (best practice) information, client defined strategies, and client past transaction and payment history. As seen in FIG. 16, there are three different subsets where relevant information is gathered under Client Specific Data 1624. Transaction History 1600, Workflow 1602, Invoice Data History 1604, and Payment History 1606 is shown. It will be understood by one of ordinary skill in the art that the cylinder shapes of Transaction History 1600, Invoice Data History 1604, and Payment History 1606 relates to the budgeting application pulling values directly from a database. It will further be understood that the square shape of Workflow 1602 relates to workflow information taken directly from the application itself.

Transaction History 1600 includes, but is not limited to, intellectual property objects such as patents, trademarks, open source registrations, and contracts. Transaction History 1600 provides insights into inventor data, law firm data, attorney data, classification data, rating data, case information, and case histories. Classification data is information regarding the type of case, such as trademark, patent, or open source registration. Rating data comes from a database in the best practices budgeting system. The best practices budgeting system allows the client to rate patents and cases by how well they expect them to succeed and what they believe the patent value should be. Rate data is a subjective value rating of that patent or case. Invoice data refers to personnel behavior. It looks to different agents or vendors and how long a specific agent would take to process a specific action, how much they charge, and determine on an individual basis based on which one should be hired in the future for further work. Invoice data looks at how many actions are under an agent's control, which steps they take, what do they record, and how well they do their job in the budgeting system. Payment data refers to financial and compliance polices from a client perspective rather than the vendor perspective from Invoice Data. Payment Data looks at what the client financial policies are and how much they have been willing to pay in the past. Case information refers to data on a case by case level, such as utility versus design patent application. Or, case information can be information about which country or jurisdiction the case was filed in, when they were filed, if it was allowed, or if the case cumulated in abandonment. Case history is information regarding whether or not a patent was sold to a different company or abandoned. Workflow 1602 refers to client specific policies and procedures, such as organization hierarchy, approval policies, compliance policies, procurement procedures, financial constraints, and corporate behaviors. Workflow 1602 is where the application calculates the values, and trends of the client specific policies and procedures. Workflow 1602 is a collection of actions a user has taken in the application such as various steps taken, submission of documents, interactions between the client and vendor, or client and United States Patent and Trademark Office via the application. Invoice Data History 1604 refers to a vendor's behaviors and financial needs, such as personnel behaviors, activity patterns, operational hygiene, and technical competence. Payment History 1606 refers to client behaviors and financial strategy, such as financial policies, compliance policies, personnel behaviors, activity patterns, operational hygiene, and technical competence. Transaction, Invoice and Payment History include the content of what the invoices are and how much is being paid.

Still referring to FIG. 16, Strategy and Rules 1626 is the next section shown. These strategies are determined by examining Historical Data 1608, Domestic Filing 1610, International Filing 1612, Pruning 1614, and Annuity 1616. Historical Data 1608 is a rule or strategy that analyzes collection of data from invoices, such as action calendar dates and monetary data. Domestic Filing 1610 and International Filing 1612 strategy analyzes how many cases are filed on a periodic basis, such as monthly. These strategies analyze what exactly was filed, such as patent applications (provisional or non-provisional) or office actions. Furthermore, Domestic Filing 1610 and International Filing 1612 analyze how many cases were filed and at what time and date.

Pruning 1614 strategy applies to portfolio development (prosecution) steps in the process of filing a patent or trademark application. Pruning data involves getting relevant data about the prosecution phase, and then cutting out all the extraneous data and examine what is left in a reasonable light. For example, a client has an "X" number of filings and "X" number of issuances. If the client has only half of "X" for a number of office actions, the data needs to be cleaned to find corresponding actions. Annuity 1616 strategy refers to maintenance payments. Annuity 1616 strategy analyzes date values from a storage of records regarding when these payments are made. Most patent offices have specific guidelines as to when these fees are to be made. Annuity 1616 strategy looks at the amount paid in fees over a period of time and then stores it in a database.

After processing Strategy and Rules 1626, best practice based budgeting moves on to what would be displayed to the user, as seen in Budgeting 1628 section of FIG. 16. Refinement 1620 displays the relevant refinement data. Best practice based budgeting generates what is reasonable based on the resulting data from Strategy and Rules 1626. For example, it will show based on "X" number of invention disclosures, "X" number of filings result and "X" number of patents are issued. Thereafter, the user can determine whether or not it's reasonable to add more filings in a particular time period (for example, add more filings next year or next month) based on expected data. From the strategies and refinements, a trend will be produced that a user can determine what should be filed in the future. Such an approach also can be used with regard to other types of intellectual property such as registering trademarks.

Based on the client specific data 1624, (Transaction History 1600, Workflow 1602, Invoice Data History 1604, and Payment History 1606), best practice budgeting system analyzes and provides key metrics as the foundation for budget modeling, as seen in Budgeting 1628 section of FIG. 16. The metrics are outlined in FIG. 17.

Track 1622 is an end budget spreadsheet that breaks down the entire budget. It displays how much the client paid and how much they will pay in the future. It will be understood by one of ordinary skill in the art that the spreadsheet can be displayed in a Microsoft™ Excel™ program spreadsheet, but is not limited to this software. This spreadsheet in Track 1622 can be downloaded and shared with colleagues for input. The user can change settings in Refine 1620 to change the current data budget data in Track 1622. Moreover, Track 1622 presents to the user to see where the crucial areas are that need fixing or tweaking in the event of a budget shortage or budget excess. The user can compare a projected budget to an actual budget.

Referring now to FIG. 17, metrics for Strategy and Rules 1726 from FIG. 16 are shown. Phase 1730 is the general life cycle of a patent. This is decision-based, so after disclosure review, if the decision is positive then filing phase is entered. Prosecution process, issuance, maintenance and abandonment, if any, are the phases examined. Rate section 1732 is the corresponding rate to each phase 1730. Rate 1732 determines how many disclosures were received, how many patents were filed, or not filed. Rate 1732 determines how many office actions a patent receives, and then a prediction of how many will be filed the next time. Time 1734 is the time periods for various phases, such as how long it will take before a disclosure, the time from decision to filing, to office action response time, time to issuance, time since issuance, and time to abandonment. Time 1734 includes how long the prosecution process will take overall in the end. Cost 1736 is the amount for each Phase 1730. Examples of cost include cost of disclosure, decision cost, first filing cost, office action response cost, issuance cost, maintenance cost, and abandonment cost. Forecast 1738 is taking the rates and extrapolating them to the future. Forecast 1738 suggests to the client the research points to analyze and change in the future.

Figure 18:
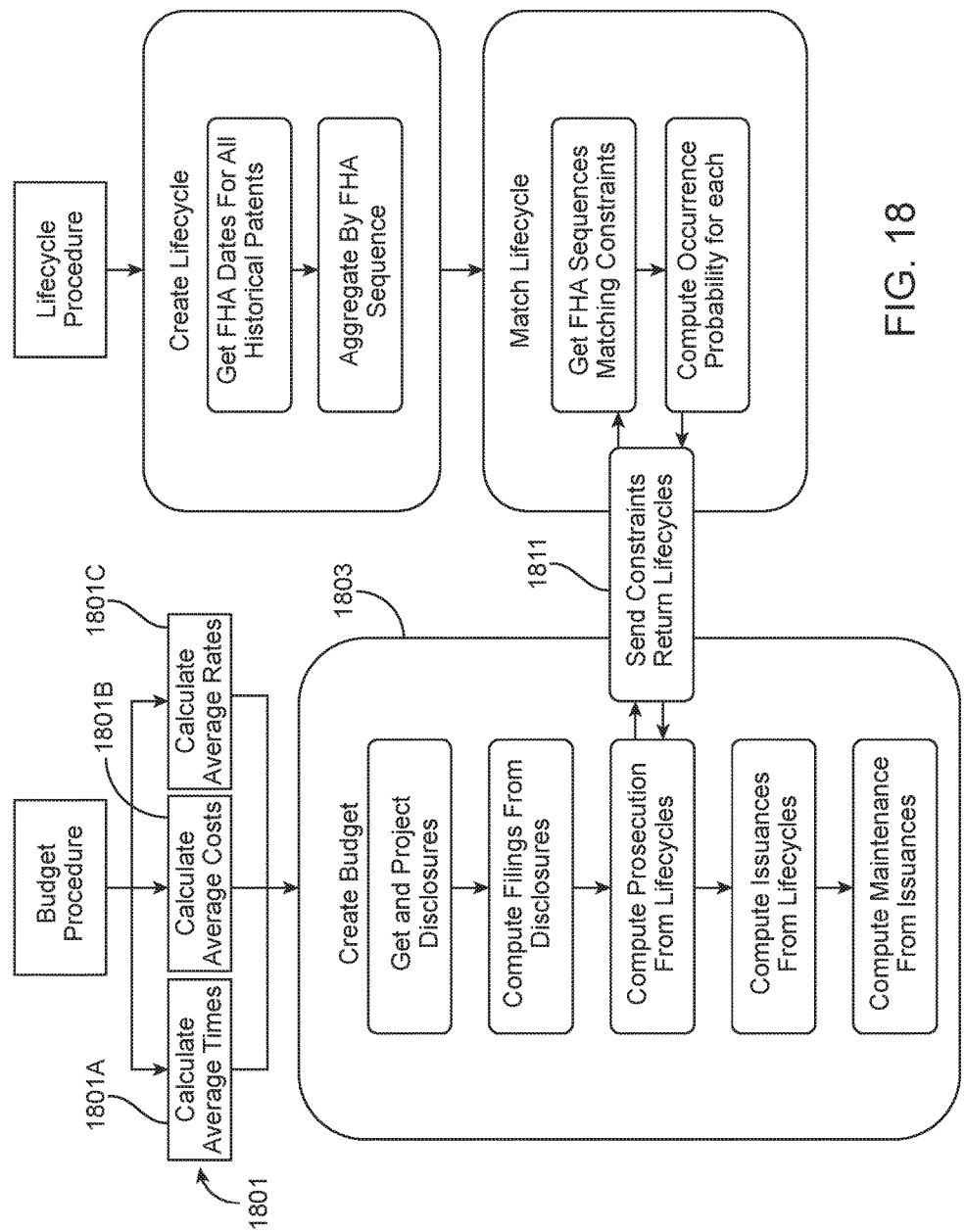
FIG. 18 illustrates a budget creation flow diagram.

Referring now to FIG. 18, a budget creation flow diagram is shown. In creating a budget, a first step is to gather the average rates for time and cost. These rates will then be available for use. The budget creation process analyzes at a level of very high granularity, on a case by case basis. This process involves looking at the number of invention disclosures. The system looks at how many invention disclosures happened in the past and then it projects that number into the current year. That way an estimation of the current year can be determined. A cost can be associated with the disclosures, and also with filings. The system uses the average times and the average rates to derive the projection for the following time period (in this case, a year). For example, the system sees that on average it takes six months to get from a disclosure submission to a filing point. From this information and rates, the system can project what to pay today. A similar process occurs for prosecution and issuances. The system determines what happened in the past, for example on average a client abandons "X" number of patents, "X" number of office actions. The system, from that data, can expect a certain number of patents in the present day. Further, constraints life cycle data can be analyzed. For example, the user could file a patent, receive one office action, have it allowed, and then issued. Or, the user could file a patent, receive three office actions, and then the patent abandons. It will be understood by one of ordinary skill in the art that there could be a number of combinations of the patent, trademark, or intellectual property life cycle data that could be analyzed. That procedure would identify what the common trends are for a client's specific case management. Constraints are not derived from paths that are issued. The system looks at patents in process as well. For example, if a user has filed one patent application and receives one office action, the system determines what to expect after that action has occurred. It would eliminate any cases where a patent application did not receive an office action. The same life cycle may not be used for each case. Instead, a sequence of events along with probability of occurrence rate is utilized. For example, if 60% of the time, the system gets a first sequence, and 40% of the time the system gets a second sequence. The system will add the respective ratios to determine at the aggregate level to decide future costs. The FIG. 18 flow chart refers to the budgeting process, at the model section of FIG. 1. The model section is representative of the budgeting process, after the strategies and rules have been defined. After the strategies portion, the user makes any last minute modifications and clicks select budget. From then on the create budget process occurs.

Figure 18B:
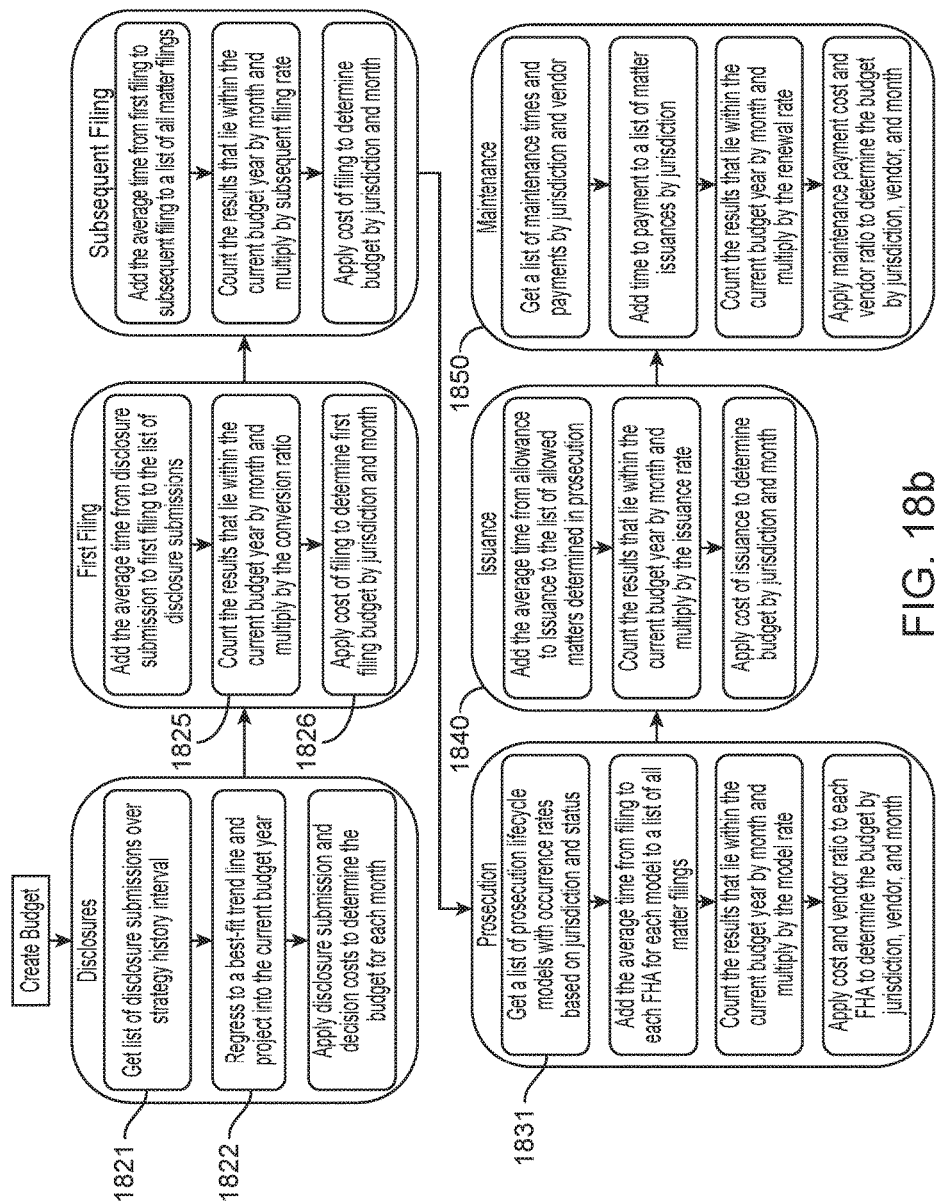
FIG. 18b illustrates a detailed budget creation process flow.

FIG. 18*b* illustrates a detailed budget creation process flow. The system gets a list of disclosure submissions. The user can get disclosure submission data over a past time period, for example, the past two, five, or ten years. The user can also get disclosure submission data over the entire period of time. Within that strategy history the system can project the number of submissions they have, and then perform a best fit regression extrapolated into the future to estimate how many disclosures will happen in the current year. In some embodiments of best practice budgeting system, this is the only point where the system does any actual statistical projection. After that point, the system relies on the rates and best practice modeling to do the extrapolations. After getting a list of disclosures, and an average, the system brings them forward a few months, then adds a conversion ratio for example, 80% disclosures become filing, then drop 20%, so that is what the estimate for filing can be. Next, the system breaks that down by jurisdiction because the rates and times can vary. It will be understood by one of ordinary skill in the art that jurisdictions have different rules and processes. After that, the system looks at first and subsequent filing. If the user files in one country and then internationally for the same patent asset it is essentially in the same family. The filing processes are slightly different for different countries and a bit lengthier, so the same rates and ratio do not necessarily apply. From there the system looks at the filing lengths for the filing rates of the first patent asset in the family, and then conducts the extrapolations. From there, the first box is similar to the sending constraints life cycle box from FIG. 18. The system gets the list of the prosecution life cycle, for example, deciding if the patent has already gone through prosecution, already filed, or first in a family. Moreover, the system decides if the patent is in a certain jurisdiction or not. The system sends off to another procedure, and here determines the likelihood of these events occurring. From that filing point, the system is able to estimate where each of the events will lie in the present from the past filing. For example, a first office action occurs at 20 months, and a second office action at five months. This means that a few months from now another office action will occur, or 60% chance of another office action. At that granularity level, there is some loss of accuracy because of aggregation on a monthly level. However, afterwards most of the inaccuracies level out because of probability of occurrence. On a single case level doing a probability level can be meaningless. However, in a group of a thousand patents, it means more in terms of budgeting. At that point the system counts the results by current budget year and multiplies by model rate (30, 60, etc). From this approach, the system applies the cost of the actions and what is expected for the vendor ratios. The system determines that about 60% are handled by this vendor, and another at 20% by a different vendor. The system applies the cost perspective to each of these vendors as well. At issuance, the system looks at filing to allowance, and determines average time to issuance. From there, the system can look at a conversion rate to determine issuance rate, time and what is to be issued. For maintenance the system analyzes in a similar way but using different data because maintenance does not occur in the same time span as prosecution. It is not (for example) a three year span for prosecution, but perhaps 17 years. Thus, the system analyzes a great deal backwards and then brings the data forward in time to maintenance on a jurisdiction level (3.5, 7.5, and 11.5 years for example in the United States). The budgeting system looks at any patents that were issued 3.5 years ago, for example, and bring them to the present point. It will figure out the abandonment year, and determine an abandonment rate. Also, the system will look at an event level. The USPTO has fixed charges for filing events, but if the client is going through an agent or another company, they might charge differently so that has to be taken into account as well.

The system can also use the FHAs for a case (e.g. the most recent FHA to form fine-grained estimates, such as budget estimates or time estimates, based upon the events that have already occurred for a case, as opposed to treating each case as a typical case, regardless of the events that have already occurred.

To do so, the system computes statistics associated with particular FHA types (e.g., "non-final office action"), or instances of those FHA types (e.g., the second instance of a "non-final office action" for the same case). The system can, as part of the analysis of prior cases that have reached completion (e.g., for a patent case, been allowed or abandoned), quantify an average cost or an average amount of time from a particular FHA type (or instance of that FHA type for the case) until completion.

To obtain the FHAs for the cases, the system can apply the model trained at step 1460 in FIG. 14 to document code bit vectors obtained from the documents at various points in the prosecution history. For example, the system could, for a particular completed case, identify a set of document codes for documents corresponding to a case event (e.g., documents from a particular date) for that case, form a document code vector from those codes, and obtain a FHA for the case by applying the trained model to the document code vector. The system can do this repeatedly for different sets of documents in the file history of the given case (e.g., sets of documents from the same day), determining the number of times that FHA occurred for the case before case completion, or the amount of time from the $n^{th}$ occurrence of that FHA until case completion, or the like. For instance, the system might determine that a particular completed case had two FHAs corresponding to non-final office actions, and took 14 months to completion from the first non-final office action and 6 months to completion from the second non-final office action.

The analysis could be performed for multiple completed cases, and the statistics aggregated (e.g., averaged) across the completed cases of a particular customer, or across multiple customers. Thus, the system might learn that an average case for a particular customer (or for customers in general) has two FHAs corresponding to non-final office actions prior to completion (e.g., allowance), or—after the FHA of the first non-final office action—takes another 9 months til completion.

Accordingly, the system's budgeting operations can obtain portfolio-level estimates (e.g., of budgets) by performing the above operations for each case in the portfolio. (A portfolio is some set of cases assigned to or otherwise belonging to a particular entity, such as all cases for that entity, or a subset of the cases as designated by the entity, such as a designated set of cases corresponding to one of the particular technologies of the entity, or a designated set of cases being handled for that entity by a particular law firm.) That is, for each case in the portfolio, the system determines an FHA (e.g., the most recent FHA, or the most recent FHA of a particular type) for the case and applies its previously-determined statistics to arrive at an estimate for that case. For instance, the system could determine, for each of the cases, how many non-final office action FHAs the case has had, estimating the cost until completion as the average cost to completion (given that number of non-final office actions) for completed cases. The system could then (for example) sum the costs until completion for each case to arrive at an estimate of total costs til completion for the entire portfolio of cases.

Figure 18C:
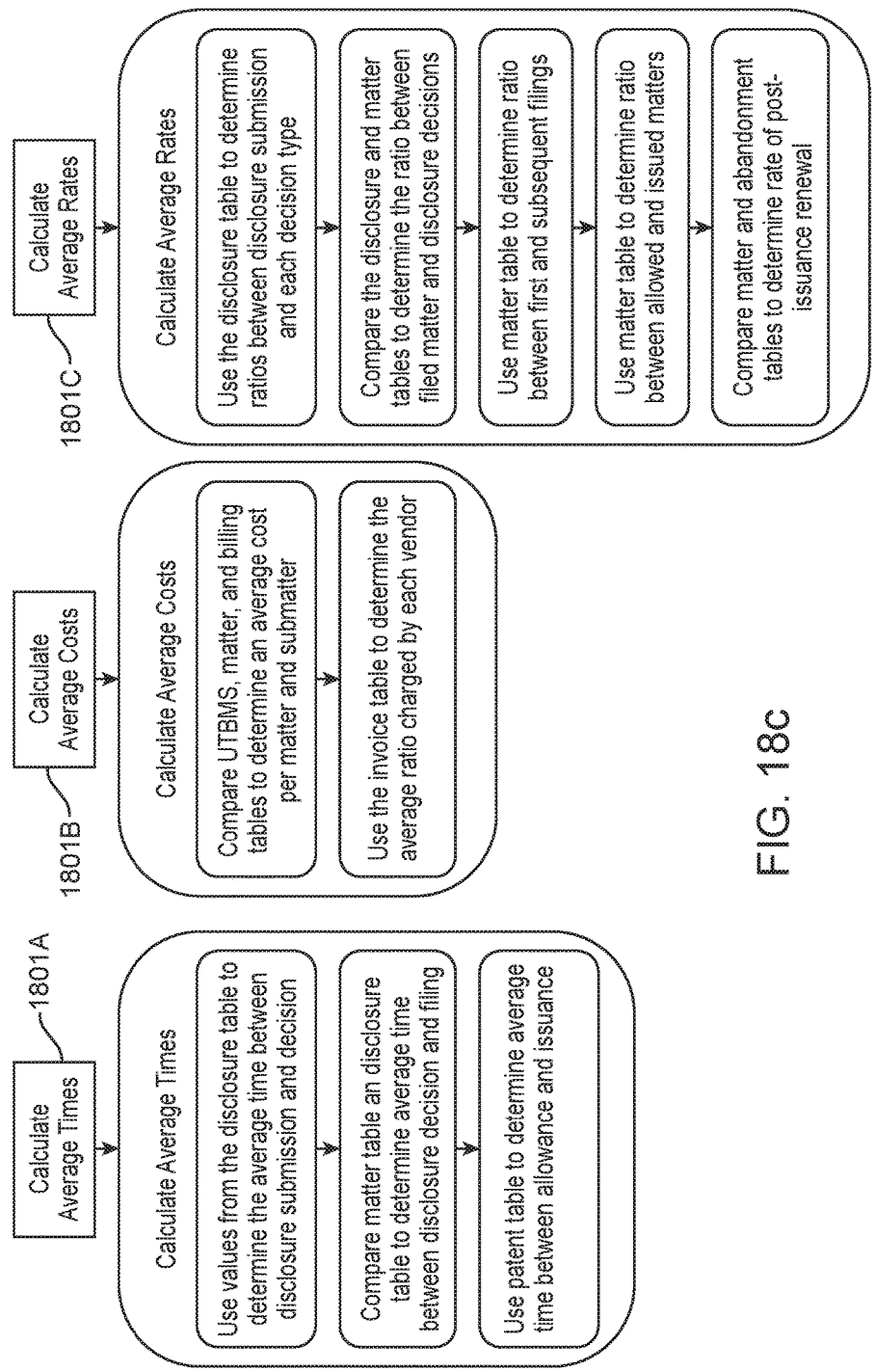
FIG. 18c shows a flow diagram for metric derivation

FIG. 18c shows a flow diagram for metric derivation. The system looks at a list of disclosures, and determines if they are submitted, abandoned, and what is the final decision on each. From there, the system can make a decision to move forward. Next, the system decides that 80% become patents, 20% become trademarks, for example for an average rate, either for a single company or for multiple companies. For time, it will look at average time from point A to point B. For decision of filing, the system compares a list of filings. It determines that a certain number are lost because a company decided it was too costly to continue with that filing, for example. Furthermore, the system looks at the cost associated with filings, such as invoice data accumulated over the past to determine what vendors will charge for certain items. For example, if the client is usually late on certain payments, the system will figure the cost of that lateness, such as extending the time further or charging extra. Also the system will compare how much a certain vendor has charged versus another vendor. It will be understood by one of ordinary skill in the art that Uniform Task Based Management System (UTBMS) is a task based management schema. The budgeting system uses UTBMS to break down matter and sub matter types. It identifies different matters, or sub matters for patent or trademarks and categorizes them in a hierarchal fashion. Then from this point, costs are determined. Similar to average times, the system looks at disclosure tables, and submissions. The system looks at how many items were approved in the process by determining how many corresponding patents a client actually has, or what actually was the final result of these patent filings. The system also looks to determine what matters are converted into international patent filings. Rates and allowances to issuance are determined as well. The system also looks at post issuance abandonment to determine whether a patent is likely to be renewed.

Figure 19:
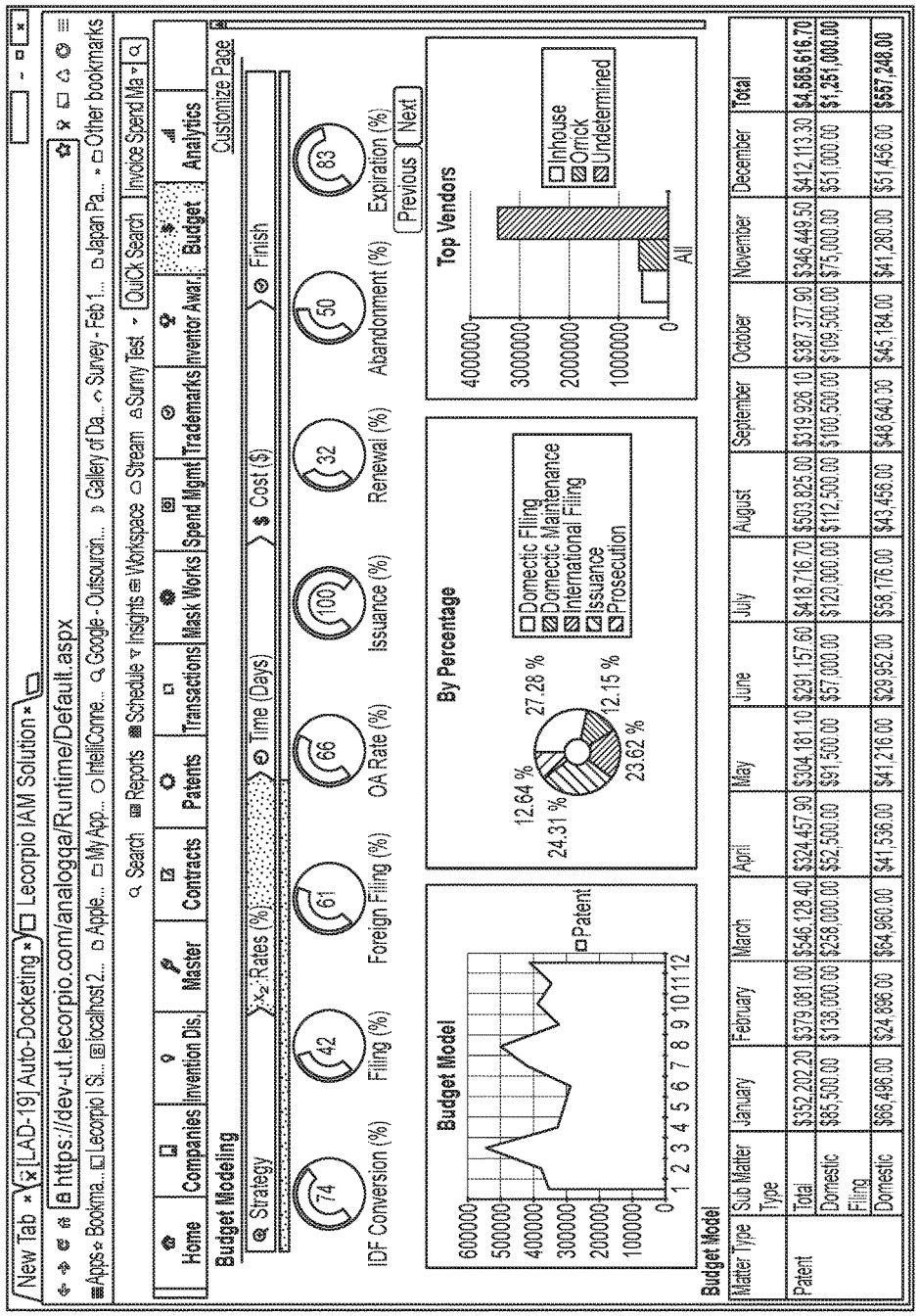
FIG. 19 illustrates a refinement model from FIG. 16.

FIG. 19 illustrates a refinement model from FIG. 16. Sliders, or rate knobs allow users to modify their budget model and provide them with what they believe to be correct. For example, if the users believe that they will be abandoning more patents assets in the future, they can lower an abandonment slider 1952. This approach will later be represented in the budget model and spreadsheets. The user can also tweak IDF Conversion slider 1940, Filing slider 1942, Foreign Filing slider 1944, Office Action rate slider 1946, Issuance slider 1948, Renewal slider 1950, and Expiration slider 1954.

Figure 20:
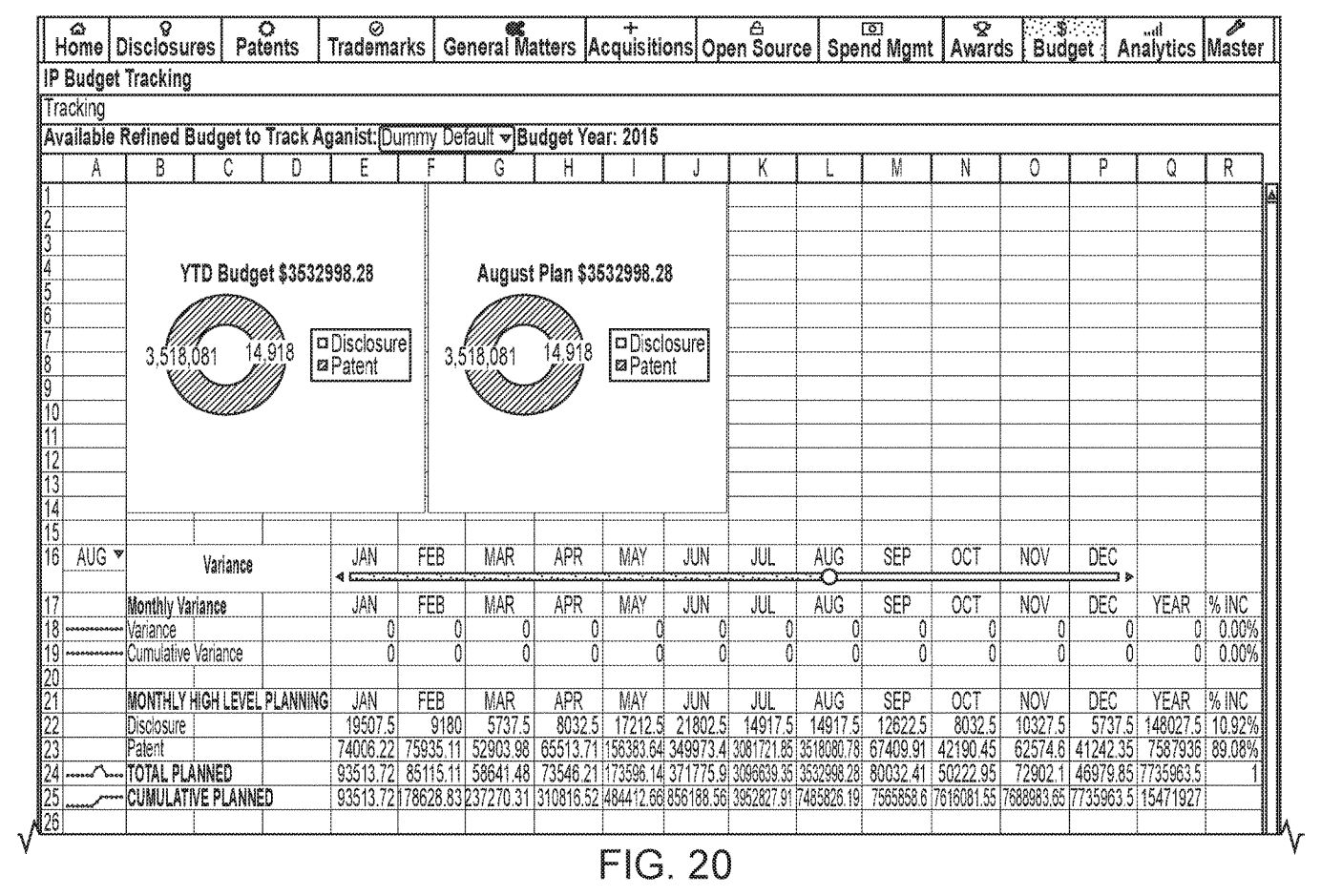
Figure 20:
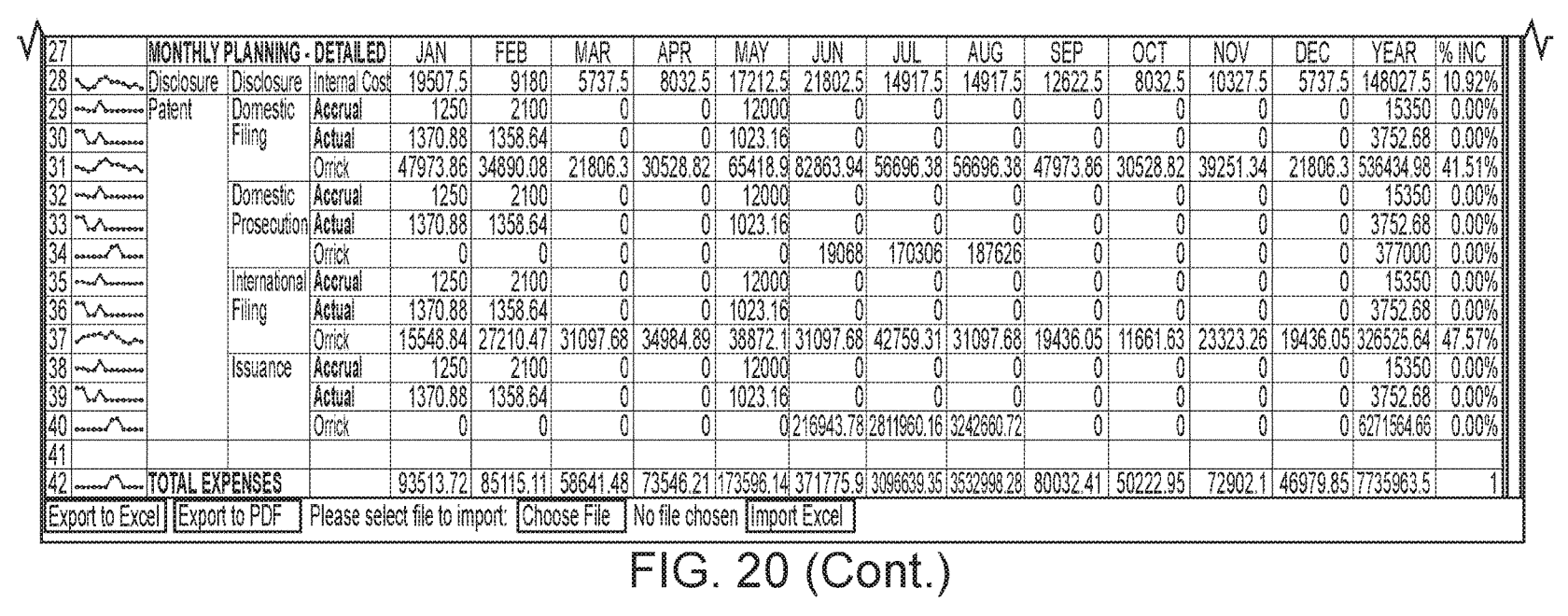

FIG. 20 illustrates a screen shot of Tracking from FIG. 16. This shows a graphical representation of what the budget would look like after historical data, strategies, rates, and refinement is applied. This is broken down in a monthly basis, by how much money is paid on what matter types such as patents or trademarks. The next box is a pie chart breakdown of how much money was spent on disclosure, domestic and foreign filing, issuance, maintenance, and trademark filing. Since this process is after the finalization of the budget, there is no editing here, it is merely displayed to the user.

Figure 21:
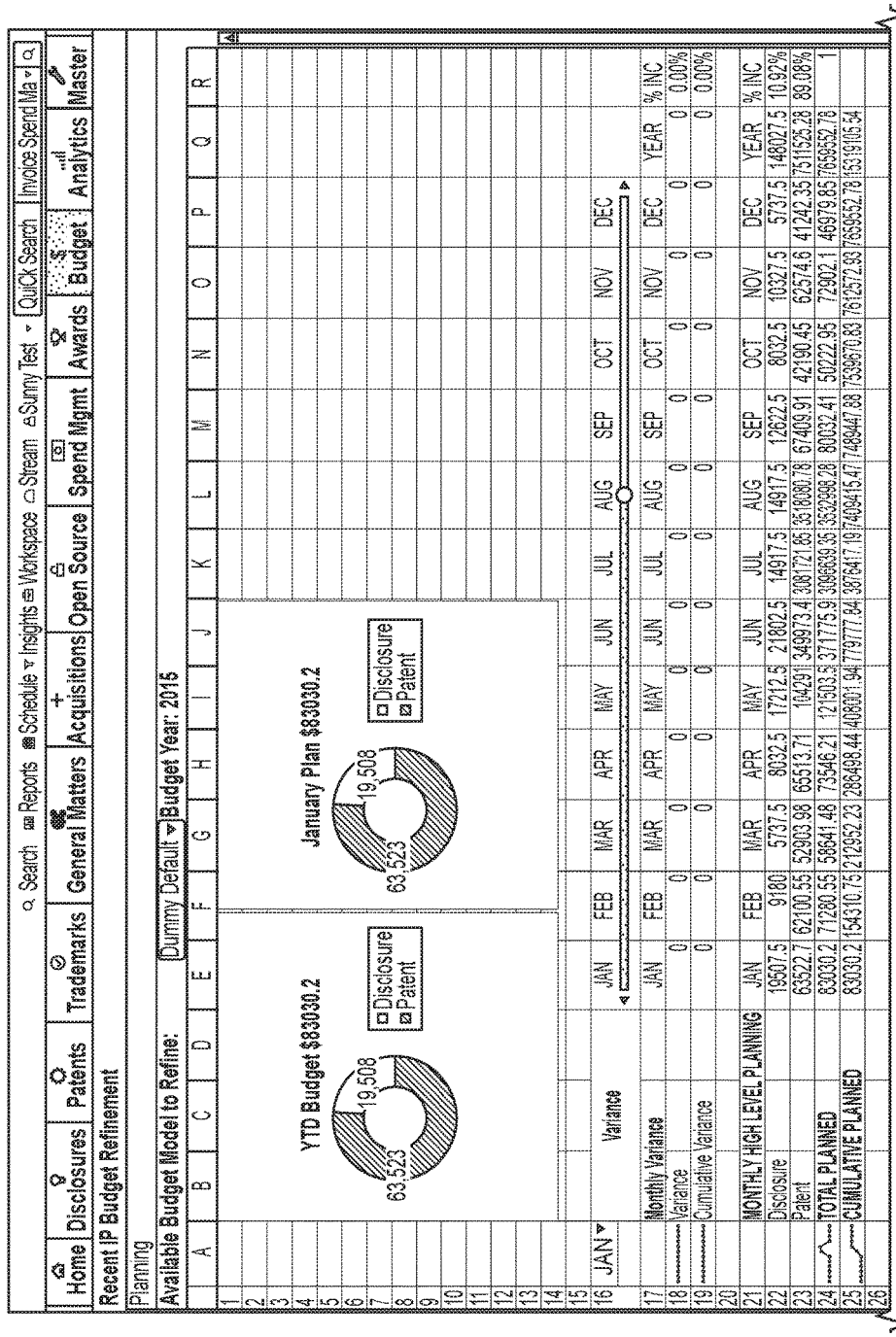
FIG. 21 illustrates a screen shot of refinement from FIG. 16.

FIG. 21 illustrates a screen shot of refinement from FIG. 16. This page the client can download and enter their own budget information to track again. After the initial published model, a user can refine the model using a standard spreadsheet metaphor. The refinement process can be done online within the best practices budgeting system, offline by exporting to a spreadsheet, or a combination between online and offline. Upon completing the refinement process, the budget will be activated and become active for future tracking and adjustments.

Figure 22:
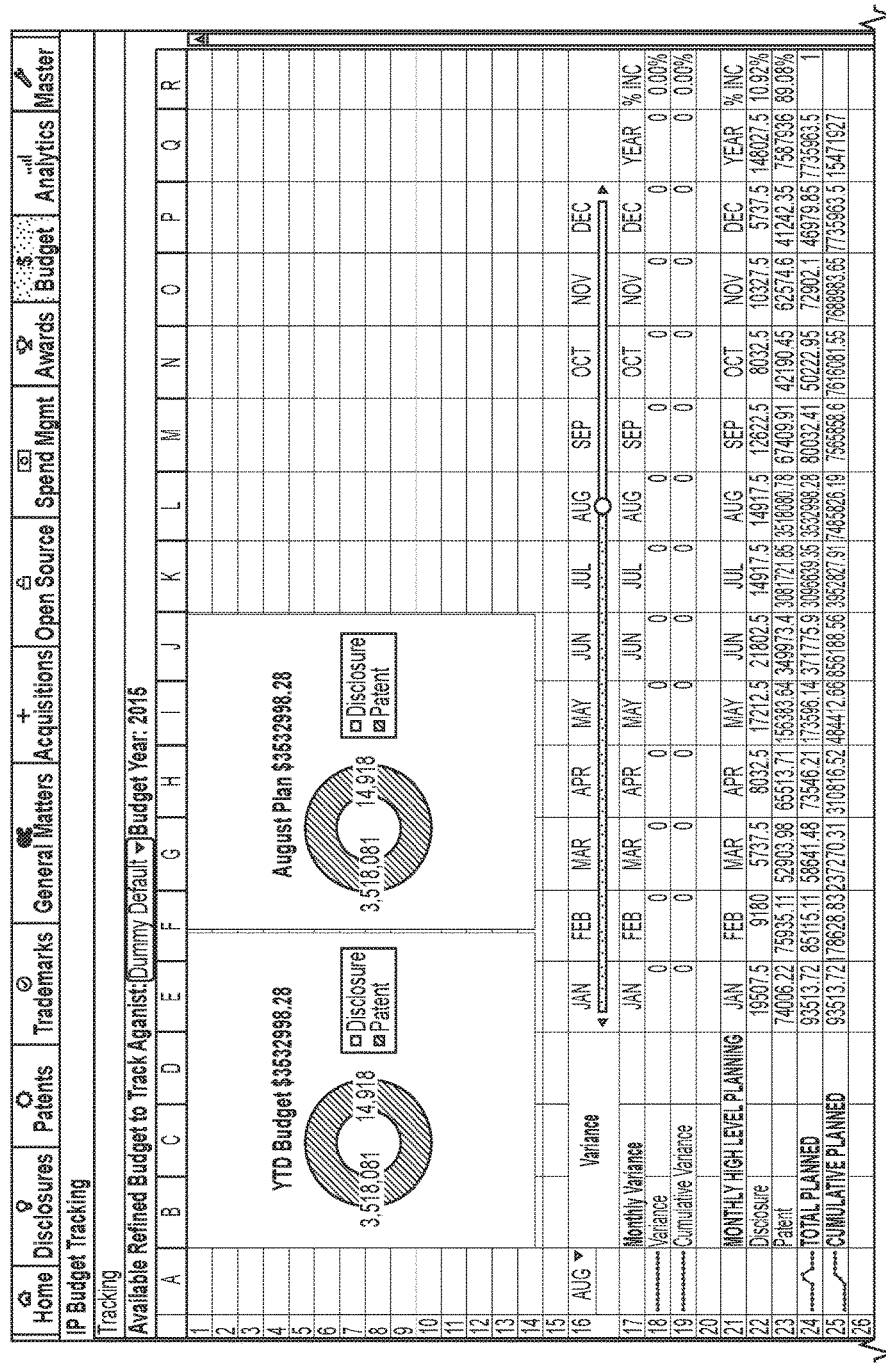
FIG. 22 illustrates a screen shot of tracking from FIG. 16.

FIG. 22 illustrates a screen shot of tracking from FIG. 16. This is a graphical representation of the budget from the current and previous year, in a monthly breakdown. This spreadsheet similar to the refinement spreadsheet where information is displayed. However, this spreadsheet is for client purposes; the clients can download the data and see if they are over or under budget.

Figure 23:
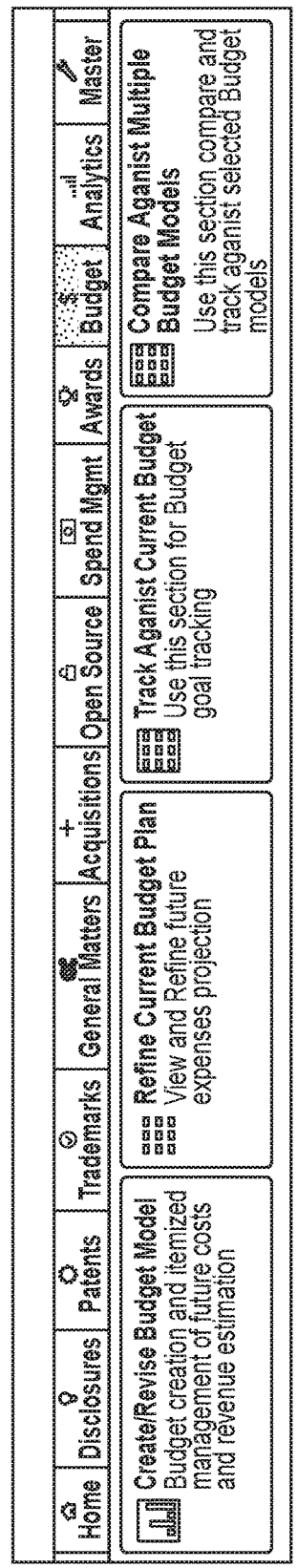
FIG. 23 illustrates a screen shot of the budget menu.

FIG. 23 shows a screen shot of the budget menu in the system.

Figure 24:
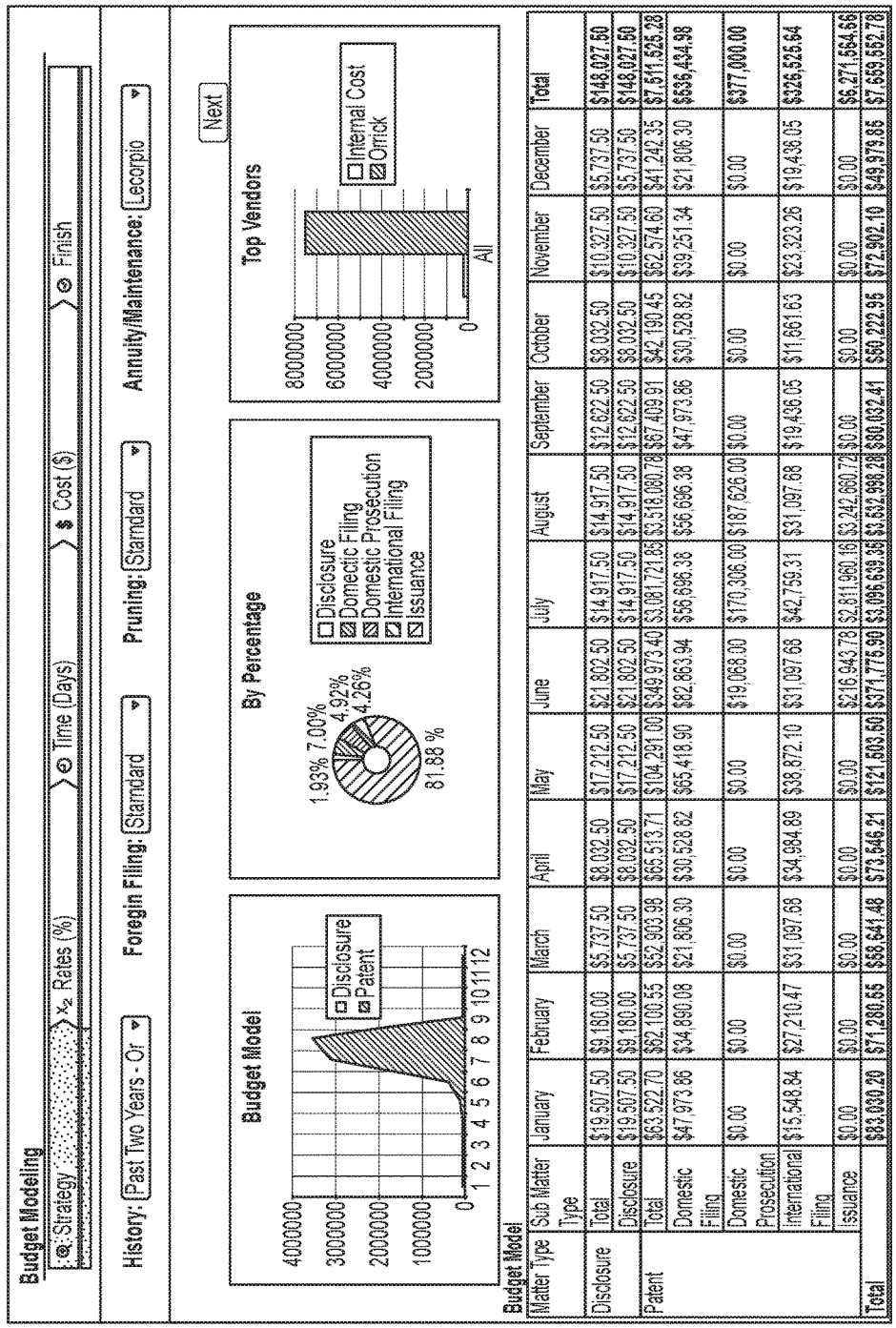
FIG. 24 illustrates shows a screen shot of strategy step 1 of best practices budgeting.

FIG. 24 shows a screen shot of strategy step 1 of best practices budgeting system and method.

Figure 25:
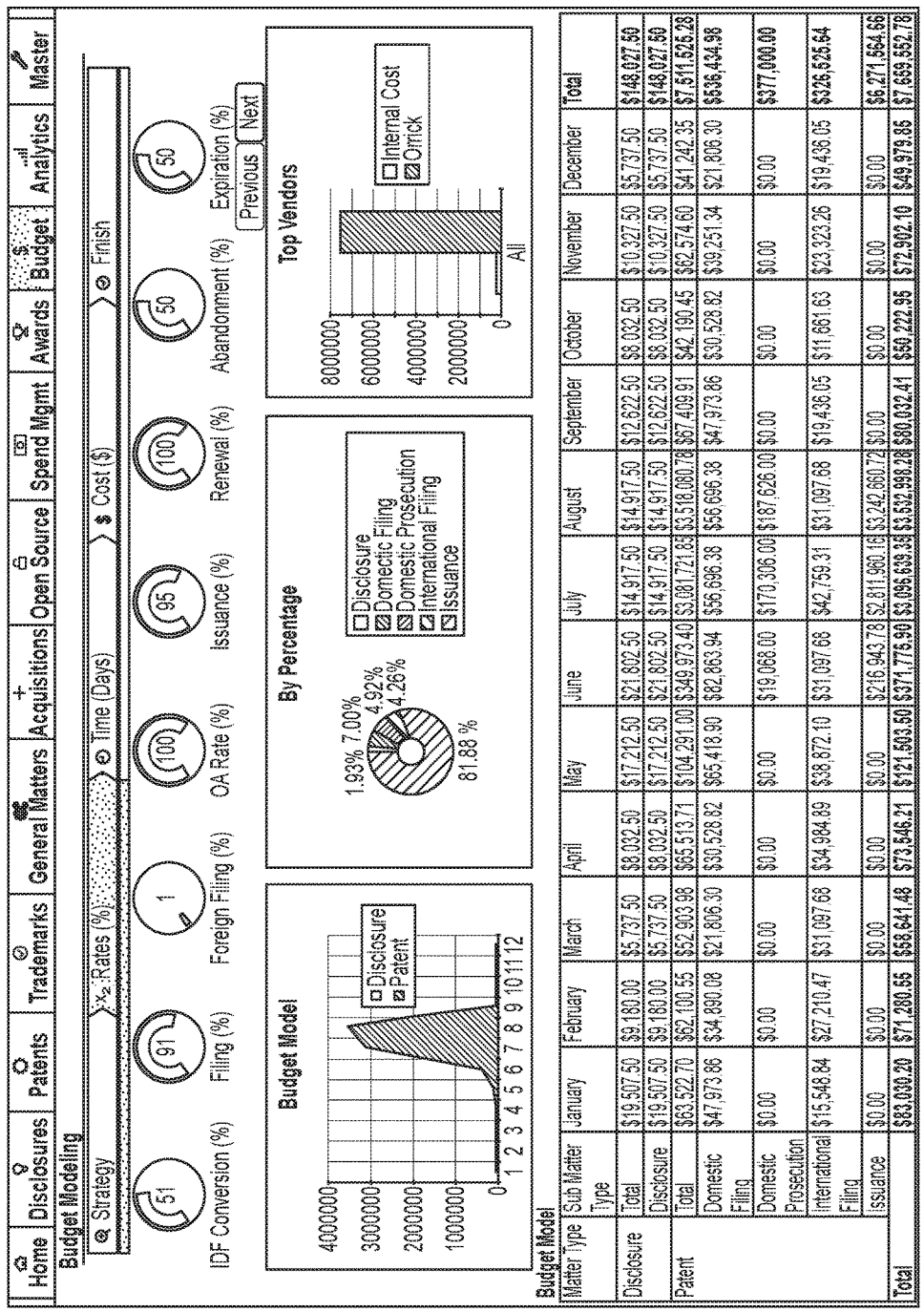
FIG. 25 illustrates a screen shot of rates step 2 in best practices budgeting.

FIG. 25 shows a screen shot of rates step 2 in best practices budgeting system and method.

Figure 26:
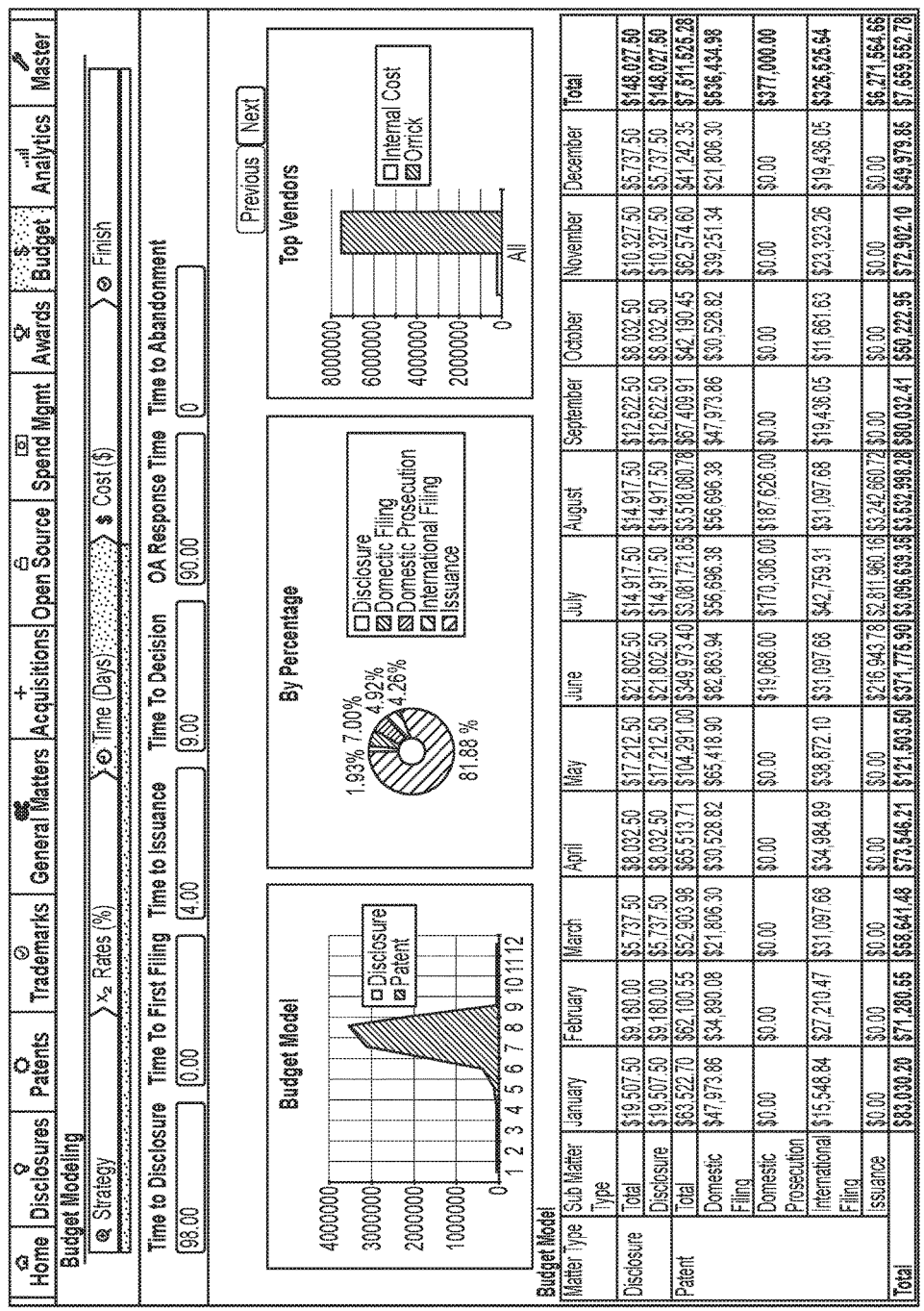
FIG. 26 illustrates a time step 3 in modeling for best practice budgeting.

FIG. 26 shows a time step 3 in modeling for best practice budgeting system and method.

Figure 27:
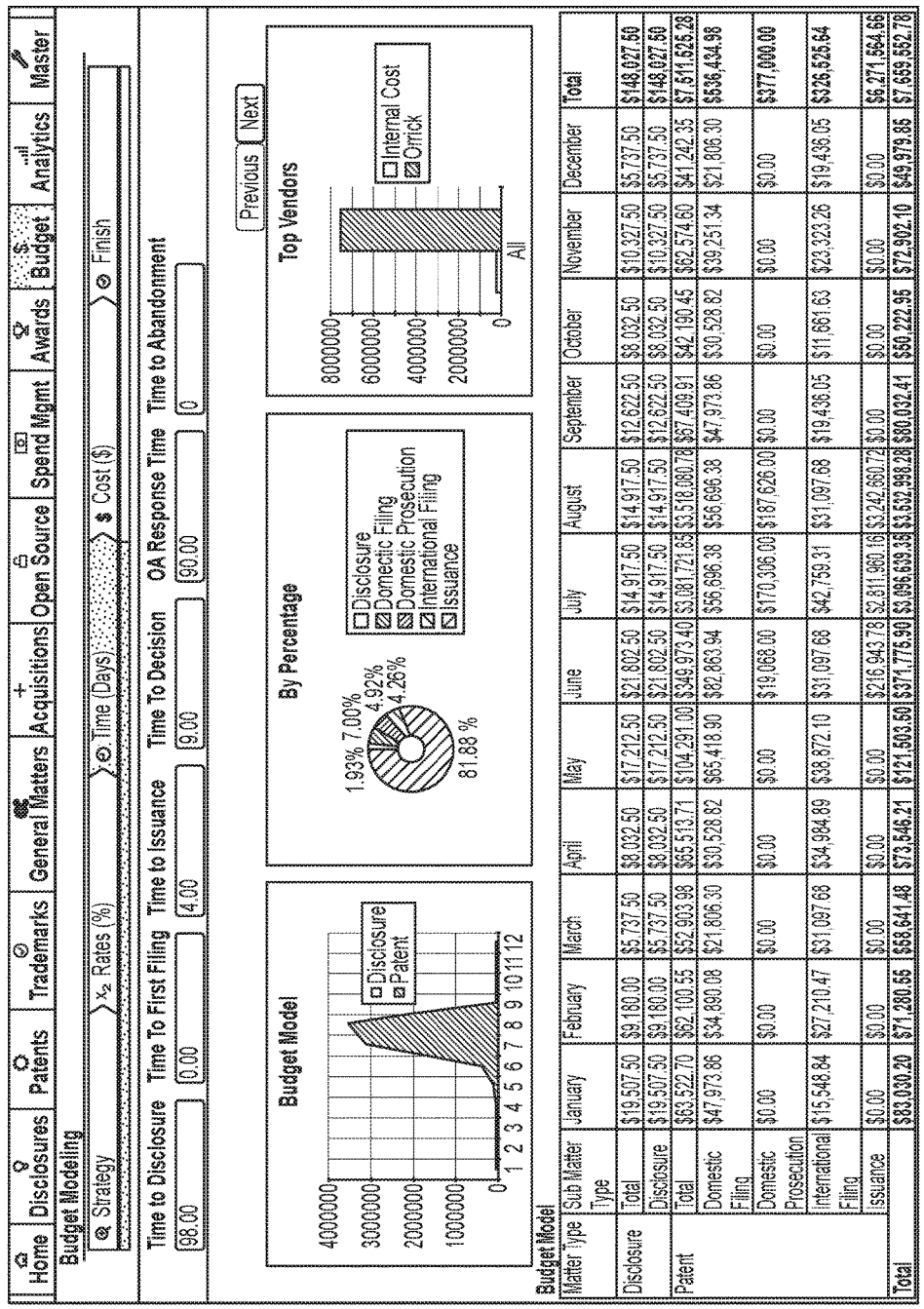
FIG. 27 illustrates a cost step 4 in modeling for best practices budgeting.

FIG. 27 shows a cost step 4 in modeling for best practices budgeting system and method.

Figure 28:
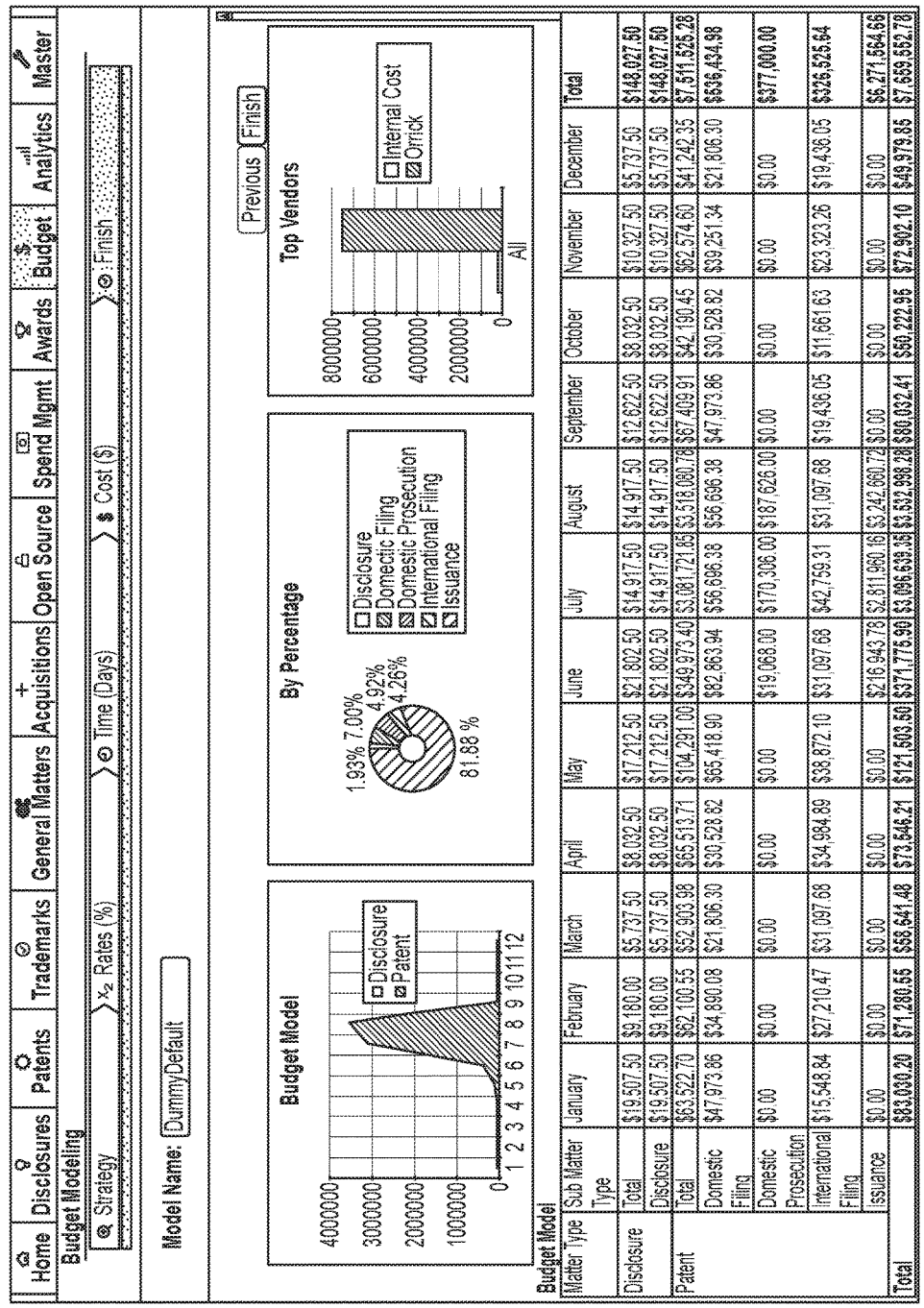
FIG. 28 illustrates a finishing step 5 in modeling for best practices budgeting.

FIG. 28 shows a finishing step 5 in modeling for best practices budgeting system and method.

Data Driven

Workflow/Best Practice: The workflow/best practice data provides an enterprise view of client-specific policies and procedures. They provide information and history regarding:
  Organization hierarchy
  Approval policies
  Compliance policies
  Procurement procedures
  Financial constraints
  Corporate behaviors
  Transaction Data
  This data includes key Intellectual Property objects: patents, trademarks, open source registrations, contracts, and others. These data provide insights into:
  Inventors
  Law Firms
  Attorneys
  Classifications
  Rating
  Case Information (type, countries, etc.)
  Case histories (history, actions, interactions, etc.)
Invoice Data
  Invoice data provides key insights regarding vendor's behaviors and financial needs. They provide detailed insights and history about:
  Personnel behaviors
  Activity patterns
  Operational hygiene
  Technical competence
Payment Data
  Payment data provides key insights regarding client's behaviors and financial strategy. They provide detailed insights regarding the client's:
  Financial policies
  Compliance policies
  Personnel behaviors
  Activity patterns
  Operational hygiene
  Technical competence
Strategies
  Additional strategies can be injected to further optimize the budget modeling. These strategies revolve around best practices: Domestic Filing, International Filing, Pruning, and Annuity.
Metrics
  Based on deployed best practices and historical data, the application analyzes and provides key metrics to be used at the foundation for budget modeling.
Budgeting
  New Budgeting functionality provides additional financial instrument and discipline within legal spend. Key IP metrics include rate, time, and cost at all phases of IP life-cycle, associated with these metrics at task level (task code, law firm, attorney, others) and a spreadsheet interface for Refinement and Tracking. This new capability spans the full budgeting methodology: Modeling, Refinement, and Tracking. See key IP metrics table below.
Highlights
  Key budgeting highlights include:
  Estimating spends at both macro and micro levels
  Complete history every budget, and compare against previous version or current budget Allow multiple budget items to roll-up to single top-line level Provide Insights for enforcement and approval Budget-to-Actuals visual metrics Insights/alerts during invoice review and approval if exceeds limit, tolerance, and forecasts Configurable fiscal calendar by month Modeling To create a budgeting model, a client first formalizes a modeling strategy. This includes:

Historical data: how much spend and activity history to be used (past year, past 3 years, or past 5 years)

International Filing: whether to focus on US only, US and National, US and PCT, or Custom (client-defined)

Pruning: based on Rating and Cost, Coverage and Cost, or Custom (client-defined)

Annuity/Maintenance: based on CPA, CPI, IPAN, or mixed

Based on defined strategy and historical data, the budget application will generate key IP metrics (rate, time, and cost) and create a base budget model. The user can further adjust key IP metrics to finalize a base model by revising rate knobs, average duration parameters, and estimated cost fields. The application then automatically builds a new model with newly anticipated and on-going matters. These matters' cost will be rolled-up and grouped by category (disclosure, patent, trademark, firm, etc.). The finalized base model can be published for the next step, Refinement.

Refinement

After the initial published model, users can refine the model using a spreadsheet metaphor. The refinement process can be done online (within our application), offline (by exporting), or a combination between online and offline. Upon completing the refinement process, the budget will be activated and become active for future tracking and adjustments.

Tracking

After an active budget is activated, users can track at law firm or matter expenses by reconciling accrual and invoice transactions. The same spreadsheet metaphor may be used.

Detailed Design

The file BudgetSP is intended to calculate parameters and aggregate data in order to develop an estimated budget for the current fiscal year. These tasks are broken down into five separate procedures. The first is the creation of historical data in CreateHistoricalBudget which aggregates historical invoice information to develop budgets for previous years. The second is the calculation of average times to points in the matter DNA sequence which are performed in CalculateFHATiming and CalculateAverageTimes. Thirdly, average costs are calculated in CalculateAverageCosts which determines default values for the costs pertaining to various actions in a matter's life cycle. Fourthly, budget ratios are determined in GetRatiosForBudget where transition rates are calculated that are used to estimate the number of matters in each stage for any given time. Lastly, the budget itself is developed for disclosures, patents, and trademarks using the calculated parameters and the counts and costs of currently active matters.

Historical Data

[CreateHistoricalBudget]

The creation of a historical budget table is the first step taken before any budget model is generated. It involves populating the table BudgetHistoricalData with all information in the database pertaining to invoice payments. The structure of the procedure is as follows:

The field sequence numbers are retrieved from the Field table for a variety of invoice parameters, patent and trademark filing numbers, along with other general information.*

The table sequence numbers are looked up in the Type table for the tables with information regarding invoice and billing record types, law firm and attorney types, currency types, UTBMS codes, and budget matter types.*

The retrieved fields are then selected from a joining of all the retrieved tables and inserted into the table BudgetHistoricalData.

Time Averages

[CalculateFHATiming]

This procedure takes in a strategy history as a parameter in order to populate the table FHAAverageTimes. This is done by taking a union of 36 different parameters* taken from a joining of the patent table (rgo_tt_194**) and a second table containing a pertinent time.

As an example, an average publication date is determined by joining tables rgo_tt_283 and rgo_tt_194 on the patent id (objectID_194**) and taking the average date difference between the patent filing date and creation date for the publication record.

[CalculateAverageTimes]

This procedure combines tables and fields* to populate the table BudgetAverageTimes with the average times to major events in the patent DNA including:

Time to Disclosure

The time to disclosure is determined by joining the patent table with the disclosure table where the disclosure submission date is within the observed strategy period. From this, the average difference between the disclosure submission date and the disclosure final decision date is calculated. This is done while joining the patent and disclosure tables on the disclosure id in order to determine that these disclosures would eventually be filed as patents.

Time to First Filing

The time to first filing is calculated similarly to time to disclosure except that the disclosure final decision date is replaced with the patent filing date. Additionally, there is a requirement placed on the patent jurisdiction that it must align with the filer's domestic jurisdiction (an imperfect identifier of a first filing).

OA Response Time

The average office action response time is determined from the office action table and is taken as the time between the PTO date (date the patent filing was received by PTO) and the filing date (date the action was filed by the PTO).

Time to Abandonment (Pre Issuance)

The pre-issuance time to abandonment is determined by the average time taken for a filed patent to become abandoned. This is calculated from the patent table where the filing date is compared to the PTO status date where the PTO status is listed as Abandoned and the issuance date is null.

Time to Decision

The time to decision is taken as the time between a patent's filing date and its allowance date. This is done by taking from the patent table the average difference in dates between the patent filing date the patent allowance date where the allowance date was in the strategy history.

Time to Issuance

The time to issuance is determined similarly as time to decision except that the issuance date is taken into account as opposed to the allowance date.

Time to Abandonment (Post Issuance)

The post-issuance time to abandonment is determined by the average time taken for an issued patent to become abandoned. This is calculated from the patent table where the issuance date is compared to the PTO status date where the PTO status is listed as Abandoned and falls later than the issuance date and within the strategy history range.

Cost Averages

[CalculateAverageCosts]

This procedure populates the table BudgetAverageCosts with data related to the average cost of each Matter and SubMatter Type. This is done by joining the Billing table and the UTBMS table on the Billing Fee types and joining the Budget Matter table on the matter types. From this, the average of the Total amount billed for each MatterType and SubMatter Type is determined by a multiplication between the LEDES unit count and the LEDES unit cost.

Budget Ratios

[GetRatiosForBudget]

The purpose of this procedure is to evaluate the rates of progression throughout the patent DNA sequence by getting the ratios of number of matter instances in each stage compared to the previous stage.

The procedure observes all matter instances that lie within the strategy date range. This range is specified by the input parameter StrategyHistory and extends from the beginning of the current calendar year** to the same point a number of years prior as defined by StrategyHistory.

IDF Conversion

The basis of this ratio comes from a count of all the records in rgo_tt_156 where the field Field_307 is within the strategy date range. This value is then compared to the count of all records in rgo_tt_156 where Field_307 is between 1 Jan. 2013 and 1 Jan. 2014** and that Field_1617 is marked as Begin Filing Process.

Domestic Filing

The basis of this ratio comes from a count of all the records in rgo_tt_156 where the field Field_307 is within the strategy date range and Field_1617 is marked as Begin Filing Process. This value is then compared to the count of distinct items in rgo_tt_194 where Field_1100 consists of one of the objectId_156 counted in the ratio basis. Additionally, there is a requirement the Field_169 is not null and that the Field_852 is listed as US**.

Foreign Filing

Foreign filing is identical to domestic filing except that Field_852 cannot be not listed as US**.

Office Action

Office actions are determined by a combination of two ratios, one for first office actions and a second for final office actions. The first-office-action ratio is determined by the number similar entries in rgo_tt_153 and rgo_tt_194 where the field field_169 is past the beginning of the strategy date range. This is then compared to the total number of entries in rgo_tt_194 where the field field_169 is past the beginning of the strategy date range.

The final-office-action ratio is determined in the same way with rgo_tt_153 is replaced with rgo_tt_224.

The final ratio is determined by averaging these two ratios.

Issuance

The rate of issuance is determined by the number of items in rgo_tt_194 where the field field_169 is after the start of the strategy date range and field_697 is listed as Issued. This is compared to the total number of records in rgo_tt_194 where the field field_169 is after the start of the strategy date range.

Abandonment and Expiration

Both these values are determined in the same way as issuance except having field_697 listed as Abandoned or Expired respectively.

Renewal

The basis of the renewal ratio is the count of all items in rgo_tt_194 where the value of field_169 is earlier than 3.5 years before the start of the current year but not older than 4**. This count is then compared to the same value with the additional constraint that field_697 must be equal to Issued.

Budget Model

The budget models procedure [CreateBudget], is intended to develop a budget estimate for each month of the current budget year based on previous budget data along with the time averages, cost averages, and status rates, the determinations of which are discussed in the previous sections.

The model is broken down into three matter types: disclosures, patents, and trademarks. For each of these matter types, data is entered into the table Budget consisting of:

BudgetId,
BudgetName,
MatterType,
SubMatterType,
Vendor,
Date,
BudgetSequence,
MatterCost,
TotalBudgeted Here, the BudgetId is a new unique identifier that generates every time the procedure runs and the BudgetName is an input parameter of the procedure. MatterType and SubMatterType are hard-coded** depending on which MatterType is currently being handled.

Disclosures

Determining the budget for disclosures is done by extrapolating the rate of new submissions over the course of the strategy history into the current budget year. This process involves first populating a new table with monthly disclosure submission counts over the strategy history. Then, the monthly counts are compared on a yearly basis to determine the rates of change between each year in the strategy history. These rates are then averaged in order to determine how much a particular month will change in the current budget year. Lastly, this rate of change is applied to the previous year in order to determine the current one.

This process allows for the estimation of new submissions during the current budget year. The next step is to determine the costs associated with this. This is done by taking all the disclosures estimated for the current budget year and multiplying them by the IDF conversion rate and the decision cost to determine the total budget for disclosures (as determined by the total cost of disclosure decisions).

Other cost factors such as prior art searches and other preliminary research are not yet considered.

Patents

Prior to any budget data being calculated one table must first be populated. This is the table holding vendor names and their estimated billing ratios that will determine how much of the budget to attribute to each specific vendor. This is done by joining the table BudgetHistoricalData with itself in order to derive a list of each vendor and how much they charged as a ratio of the total amount charged on a MatterType and SubMatterType level.

Filing

The basis for determining the amount budgeted for filing is to make a join between the table of disclosure rates populated previously with the table of supplier ratios and the table BudgetHistoricalData on MatterType and SubMatterType which are set to be Patent and Domestic Filing. The disclosure table is used in combination with the IDF Conversion Rate and the Rate of Domestic Filing in order to determine an estimated number of patents that will be filed in the current year. Note that disclosures prior to the current budget year are considered in this case as the time taken from submission disclosure to patent filing can be in excess of a year.

With the knowledge of the number of expected patents filed, the next step is to determine their costs. This is done by simply multiplying by either the user-entered cost of first filing, or by the relevant entry in BudgetHistoricalData if the user abstained from entering any data. This is also multiplied by the vendor ratio in order to determine the estimated cost breakdown by vendor.

The budget for internationally filed patents is very similar. The only differences here are that the SubMatterType is set to International Filing and the Rate of International Filing is used in place of the Rate of Domestic Filing.

Issuance

The Issuance budget is calculated in a similar way as to filing where three tables are joined and their result is used to determine a total estimated count for the current budget year. The biggest difference here is that the patent table is used as opposed to the disclosure submission table. The basis of this calculation is the number of filed patents rather than the number of disclosure submissions as it removes a potential point of error (the estimation of disclosures to patent filing rate).

The total estimated count of issuances for each month of the current budget year is determined by the number of patents filed multiple months before (as determined by the TimeToIssuance) multiplied by the Rate of Issuance. The cost associated with these are calculated by the multiplying the Cost of Issuance and the Vendor Ratio. This produces a budget broken down by vendor of issuance costs per month.

Maintenance

In order to calculate maintenance, a maintenance fee lookup table must first be produced with a list of jurisdictions, time to payment (in decimal years), and payment amount. Once this table exists, the evaluation of maintenance payments can be performed. This is done by gathering a list of all jurisdictions that have been filed in by the company from the patent table and then looping over each jurisdiction and each instance of a corresponding maintenance payment in the lookup table.

Once this is done, the process to determining the maintenance budget is to simply gather a count of all the patents that were issued prior to the current budget year at a number of years corresponding to a maintenance payment. These payment counts are then multiplied by the payment amount (as determined by the lookup table) in order to get the total budget. A check of the jurisdiction determines whether the budget is associated with the domestic or international maintenance budget.

Trademarks

The first step taken to determine a budget for trademarks is to determine the average costs for various stages. These are TrademarkDefaultForeignCost, TrademarkDefaultProsecutionCost, TrademarkDefaultIssuanceCost, and TrademarkDefaultMaintenanceCost. These are determined from a joining of the UTBMS table with Budget Matter table with the restriction that matter type equals Trademark and the submatter type equals the relevant submatter type. The average billing limit amount is taken from each as the average cost.

If any of the above calculated values is null, there are hard-coded defaults set of 1000, 1500, 200, and 400 for each default trademark cost respectively.

Filing

The filing cost is calculated from a joining of rgo_tt_171 and rgo_tt_103 on field_388 and objectid_103. This joining is restricted by the requirement that each selected record from rgo_tt_171 must come after the start of StrategyHistory and that field_1527 must be either In Prep or New Case. Here, the Date is taken with the year as the current calendar year and the month as the month of the selected record's creation. The Vendor is taken as field 1288. The MatterCount is taken as the count of all records divided by the StrategyInterval, the MatterCost is taken as TrademarkDefaultForeignCost, and the TotalBudgeted amount is the multiplication of the MatterCount and MatterCost.

Issuance

Issuance is calculated very similarly to filing except that field_1527 must equal Filed, the MatterCost is TrademarkDefaultIssuanceCost and the SubMatterType is entered as Issuance.

Maintenance

Issuance is also calculated very similarly except there is no restriction on field_1527, field_2597 must be in the current calendar year, the MatterCost is TrademarkDefaultMaintenanceCost and the SubMatterType is entered as Maintenance.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Embodiments of the present invention also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

Embodiments of the present invention are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for determining a status of an intellectual property case, the computer-implemented method comprising:
   obtaining, over a computer network from a plurality of customers, a plurality of file history action (FHA) designations for a plurality of cases manually specified by employees of the customers;
   identifying, over the computer network for each of the cases:
      a date for a most recent case event, and
      a set of document codes for the date, the document codes corresponding to documents associated with the date and indicating what corresponding documents represent;
   for each obtained FHA designation, forming a plurality of document code bit vectors based on the document codes identified for cases with the obtained FHA designation;
   training a model that receives, as input, a document code bit vector of document codes, and that produces, as output, a predicted FHA designation and a confidence score corresponding to the predicted FHA designation, the training comprising employing at least one of a hidden Markov model and a multiclass support vector machine;
   for each case in a portfolio of cases:
      determining, at least in part by performing screen-scraping of a website of a remote data provider, that the case has a case event;
      identifying, from the remote data provider, a plurality of document codes for a date of the case event;
      forming a document code bit vector of the document codes identified for the date of the case event;
      providing the document code bit vector as input to the trained model;
      obtaining a predicted FHA designation and a confidence score from the trained model;
      determining that the confidence score is above a given threshold; and
      responsive to the confidence score being above the given a threshold, predicting a remaining cost to completion of the case using the predicted FHA designation; and
   using the predicted costs to completion of the cases to predict a total cost to completion of the portfolio.

2. The computer-implemented method of claim 1, wherein determining, over the computer network, that a case has a case event comprises receiving an email.

3. The computer-implemented method of claim 1, further comprising identifying additional possible documents codes by analyzing document codes in web pages of the remote data provider.

4. The computer-implemented method of claim 3, further comprising retraining the model in response to identifying the additional possible document codes.

5. The computer-implemented method of claim 1, further comprising computing, based on a plurality of completed cases, statistical averages for costs to completion from an event corresponding to a predicted FHA designation.

6. The computer-implemented method of claim 5, further comprising predicting the remaining costs to completion of the cases using the computed statistical averages.

7. A computer-implemented method comprising:
   obtaining a plurality of file history action (FHA) designations for a plurality of cases;
   identifying a set of document codes corresponding to the obtained FHA designations;
   for each obtained FHA designation, forming a plurality of document code vectors based on the document codes identified for cases with the obtained FHA designation;
   training a model that receives, as input, a document code vector of document codes, and that produces, as output, an estimated status and a confidence score corresponding to the estimated status designation, the training comprising employing at least one of a hidden Markov model and a multiclass support vector machine;
   for each portfolio case in a portfolio:
      determining, at least in part by performing screen-scraping of a website of a remote data provider, that the portfolio case has a case event;

identifying a plurality of document codes for a date of the case event, the document codes corresponding to documents associated with the date and indicating what corresponding documents represent;

forming a document code bit vector of the document codes identified for the date of the case event;

providing the document code bit vector as input to the trained model;

obtaining a first predicted FHA designation from the trained model; and using the first predicted FHA designation, predicting a remaining cost to completion of the portfolio case; and using the predicted remaining costs to completion of the portfolio cases to predict a total cost to completion of the portfolio.

8. The computer-implemented method of claim 7, further comprising computing, based on a plurality of completed cases, statistical averages for costs to completion from an event corresponding to the first predicted FHA designation.

9. The computer-implemented method of claim 8, further comprising predicting the remaining cost to completion of the portfolio cases using the computed statistical averages.

10. The computer-implemented method of claim 7, further comprising identifying additional possible documents codes by analyzing document codes in web pages of a remote data provider from which the set of documents codes was identified.

11. The computer-implemented method of claim 10, further comprising retraining the model in response to identifying the additional possible documents codes.

12. The computer-implemented method of claim 7, wherein determining, over a computer network, that a case has a case event comprises receiving an email.

13. The computer-implemented method of claim 7, further comprising:

determining that the first confidence score is above a given a threshold; and responsive to the first confidence score being above a given a threshold:

identifying a docket item associated with the first predicted FHA designation, scheduling the first docket item in association with the first case, and notifying an owner of the first case of the first docket item.

* * * * *